(12) United States Patent
Francis

(10) Patent No.: US 10,902,504 B2
(45) Date of Patent: *Jan. 26, 2021

(54) TECHNIQUES FOR FILLING ORDERS

(71) Applicant: Thomas Francis, Dubuque, IA (US)

(72) Inventor: Thomas Francis, Dubuque, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/869,684

(22) Filed: May 8, 2020

(65) Prior Publication Data
US 2020/0265503 A1 Aug. 20, 2020

Related U.S. Application Data

(63) Continuation of application No. 16/443,053, filed on Jun. 17, 2019, now Pat. No. 10,650,439, which is a continuation of application No. 15/978,645, filed on May 14, 2018, now Pat. No. 10,325,308, which is a continuation of application No. 15/667,025, filed on Aug. 2, 2017, now Pat. No. 9,972,045, which is a continuation of application No. 15/297,404, filed on Oct. 19, 2016, now Pat. No. 9,741,070, which is a continuation of application No. 14/920,205, filed on Oct. 22, 2015, now Pat. No. 9,477,982, which is a
(Continued)

(51) Int. Cl.
G06Q 30/06 (2012.01)
G06Q 10/08 (2012.01)
H04W 4/33 (2018.01)

(52) U.S. Cl.
CPC ....... *G06Q 30/0635* (2013.01); *G06Q 10/087* (2013.01); *G06Q 10/0875* (2013.01); *G06Q 30/0639* (2013.01); *H04W 4/33* (2018.02)

(58) Field of Classification Search
CPC ......... G06F 19/00; G06F 17/00; G06Q 30/00; G06Q 90/00; G06K 19/00

USPC ........................................ 235/379, 375, 487
See application file for complete search history.

(56) References Cited

U.S. PATENT DOCUMENTS 4,275,385 A 6/1981 White
4,821,291 A 4/1989 Stevens et al.
(Continued)

FOREIGN PATENT DOCUMENTS

EP 2432284 A1 3/2012
EP 2887724 A1 6/2015

OTHER PUBLICATIONS

Article, "Fashion team wins second in national competition," University Wire (Carlsbad) published Apr. 7, 2015, retrieved from Dialog Solutions on Jul. 15, 2019, 2 pages.

*Primary Examiner* — Edwyn Labaze
(74) *Attorney, Agent, or Firm* — RMCK Law Group, PLC

(57) ABSTRACT

A system includes N location indicators and a mobile scanning device. The N location indicators are configured to be arranged throughout a store that includes a plurality of stocked items for picking according to one or more electronic customer orders. Each of the N location indicators is configured to transmit a different location signal. The mobile scanning device includes a display. The mobile scanning device is configured to wirelessly receive an electronic customer order comprising a plurality of ordered items indicating which of the stocked items are to be picked, detect at least one of the N location signals, and arrange at least some of the plurality of ordered items on the display based on which of the at least one of the N location signals is detected.

20 Claims, 39 Drawing Sheets

Related U.S. Application Data continuation of application No. 14/289,983, filed on May 29, 2014, now Pat. No. 9,171,281.

(60) Provisional application No. 61/830,082, filed on Jun. 1, 2013.

(56) References Cited

U.S. PATENT DOCUMENTS

| | | |
|---|---|---|
| 4,882,724 A | 11/1989 | Vela et al. |
| 5,287,266 A | 2/1994 | Malec et al. |
| 5,572,653 A | 11/1996 | Detemple et al. |
| 5,729,697 A | 3/1998 | Schkolnick et al. |
| 6,011,487 A | 1/2000 | Plocher |
| 6,123,259 A | 9/2000 | Ogasawara |
| 6,386,450 B1 | 5/2002 | Ogasawara |
| 6,434,530 B1 | 8/2002 | Sloane et al. |
| 6,587,835 B1 | 7/2003 | Treyz et al. |
| 6,854,656 B2 | 2/2005 | Matsumori |
| 6,986,463 B2 | 1/2006 | Ludtke |
| 7,010,498 B1 | 3/2006 | Berstis |
| 7,309,009 B2 | 12/2007 | Singer-Harter |
| 7,456,742 B2 | 11/2008 | Cato |
| 7,540,419 B2 | 6/2009 | Amitay et al. |
| 7,775,430 B2 | 8/2010 | Lin |
| 8,248,467 B1 | 8/2012 | Ganick et al. |
| 9,015,069 B2 | 4/2015 | Brantley et al. |
| 9,632,313 B1 | 4/2017 | Madan et al. |
| 2003/0061113 A1 | 3/2003 | Petrovich et al. |
| 2004/0188524 A1 | 9/2004 | Lunak et al. |
| 2005/0230472 A1 | 10/2005 | Chang |
| 2006/0022824 A1 | 2/2006 | Olsen et al. |
| 2006/0092072 A1 | 5/2006 | Steiner |
| 2008/0266092 A1 | 10/2008 | Campero et al. |
| 2009/0247225 A2 | 10/2009 | Callaghan et al. |
| 2010/0205000 A1 | 8/2010 | Cho |
| 2012/0259732 A1 | 10/2012 | Sasankan et al. |
| 2012/0316963 A1 | 12/2012 | Moshfeghi |
| 2013/0028475 A1 | 1/2013 | Ganick et al. |
| 2013/0029682 A1 | 1/2013 | Ganick et al. |
| 2013/0030931 A1 | 1/2013 | Moshfeghi |
| 2013/0080289 A1 | 3/2013 | Roy et al. |
| 2013/0179307 A1 | 7/2013 | Heil et al. |
| 2014/0027510 A1 | 1/2014 | Assouline et al. |
| 2014/0035724 A1 | 2/2014 | Rothschild |
| 2014/0086590 A1 | 3/2014 | Ganick et al. |
| 2014/0132963 A1 | 5/2014 | Diaz |
| 2014/0139744 A1 | 5/2014 | Ryan et al. |
| 2014/0201001 A1 | 7/2014 | Rellas et al. |
| 2014/0279294 A1 | 9/2014 | Field-Darragh et al. |
| 2015/0039462 A1 | 2/2015 | Shastry et al. |
| 2015/0120514 A1 | 4/2015 | Deshpande et al. |
| 2015/0142611 A1* | 5/2015 | Kaplan .............. G06Q 30/0635 705/26.81 |
| 2016/0148300 A1 | 5/2016 | Carr et al. |
| 2017/0024801 A1 | 1/2017 | Sinopoli et al. |
| 2018/0342007 A1* | 11/2018 | Brannigan .......... G06Q 30/0635 |
| 2019/0122323 A1* | 4/2019 | Millhouse ............ G06Q 50/28 |
| 2019/0325367 A1* | 10/2019 | Tovey ................ G06Q 30/0201 |

\* cited by examiner

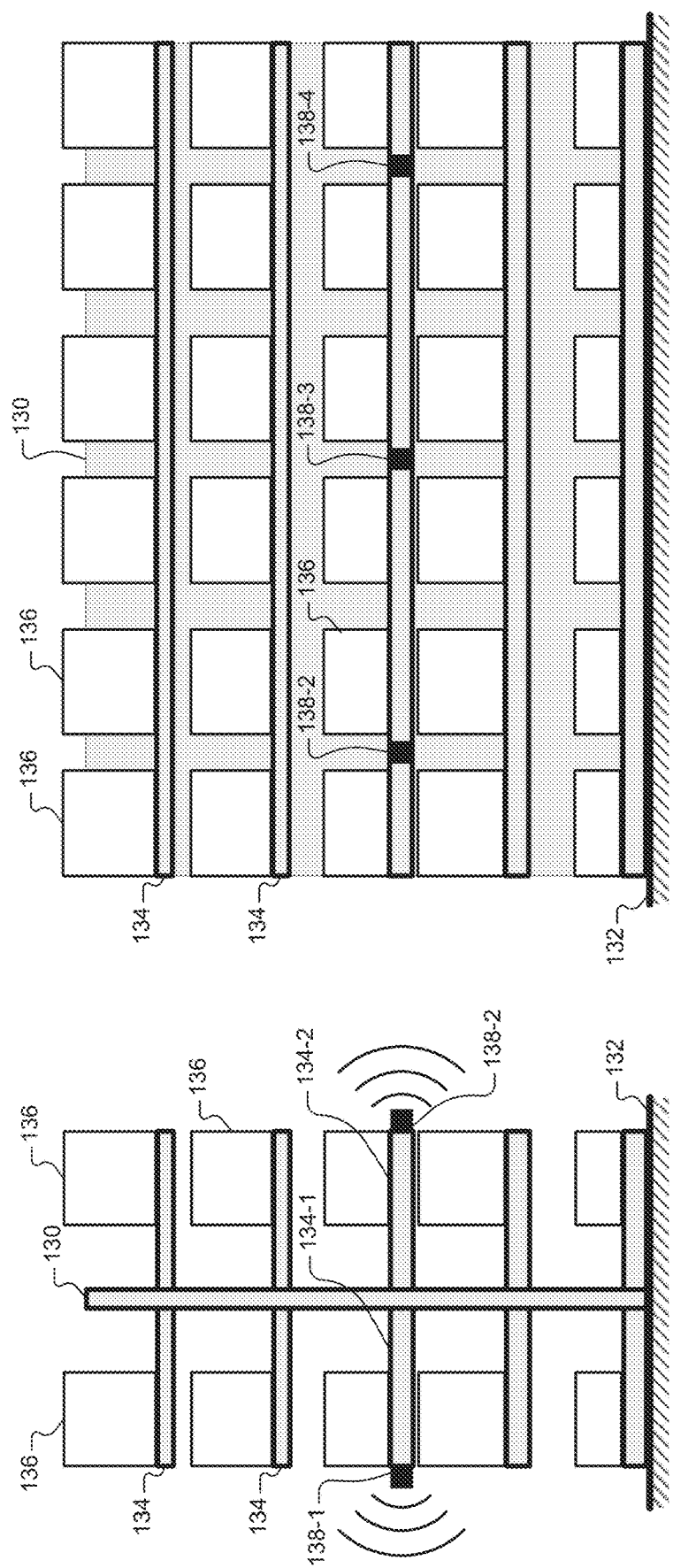

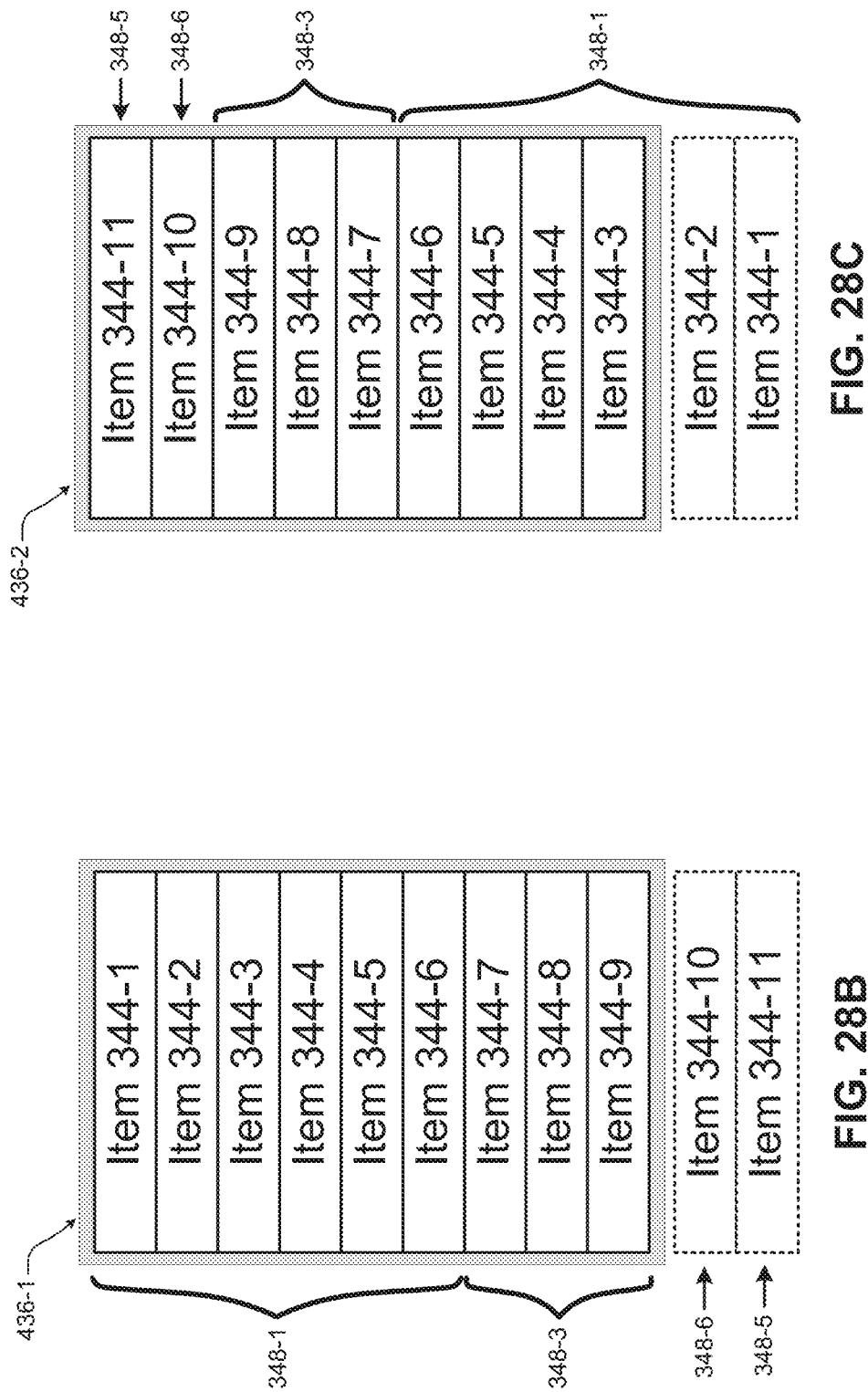

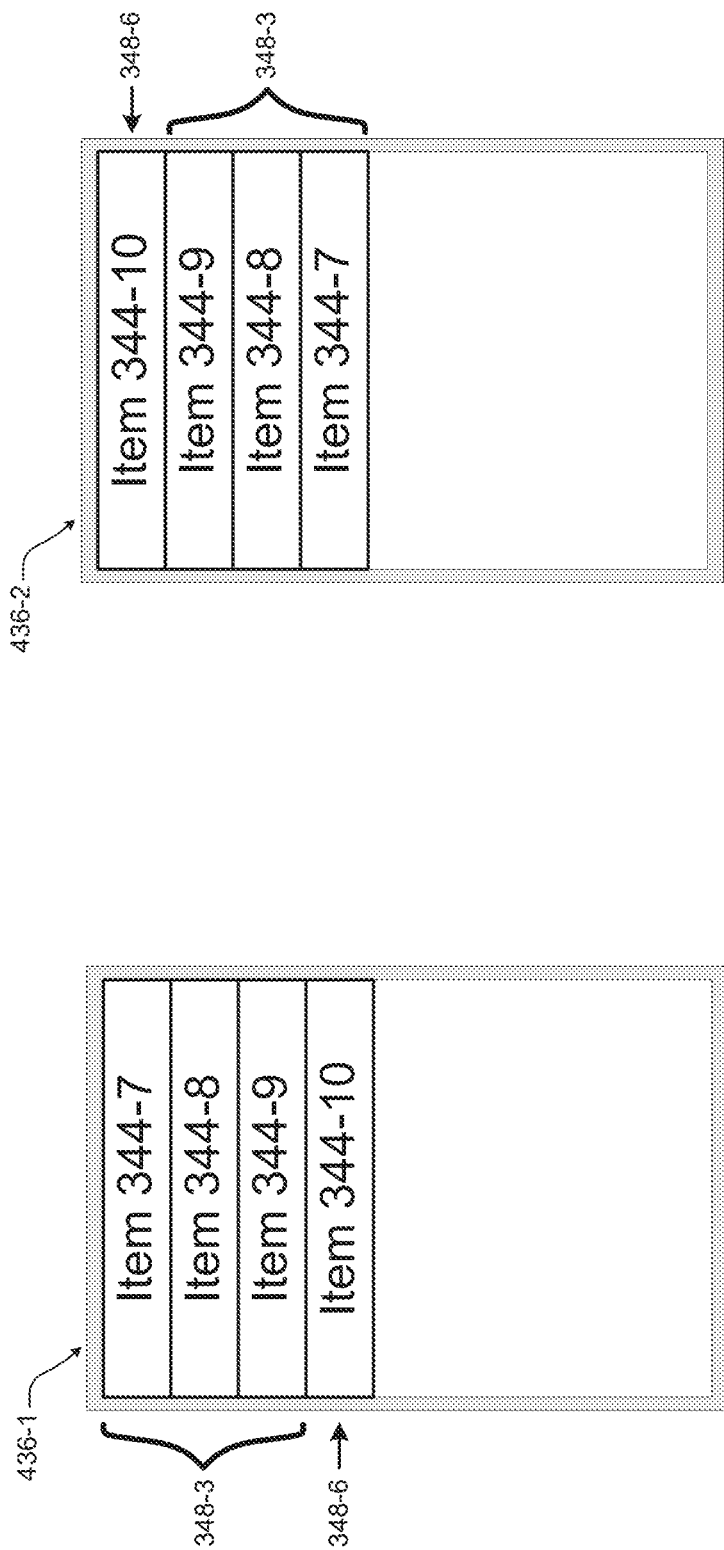

TECHNIQUES FOR FILLING ORDERS

CROSS-REFERENCE TO RELATED APPLICATIONS

This application is a continuation of U.S. application Ser. No. 16/443,053, filed Jun. 17, 2019, which is a continuation of U.S. application Ser. No. 15/978,645, filed May 14, 2018, now U.S. Pat. No. 10,325,308, issued Jun. 18, 2019, which is a continuation of Ser. No. 15/667,025, filed Aug. 2, 2017, now U.S. Pat. No. 9,972,045, issued May 15, 2018, which is a continuation of U.S. application Ser. No. 15/297,404, filed Oct. 19, 2016, now U.S. Pat. No. 9,741,070, issued Aug. 22, 2017, which is a continuation of U.S. application Ser. No. 14/920,205, filed on Oct. 22, 2015, now U.S. Pat. No. 9,477,982, issued Oct. 25, 2016, which is a continuation of U.S. application Ser. No. 14/289,983, filed on May 29, 2014, now U.S. Pat. No. 9,171,281, issued Oct. 27, 2015, which claims the benefit of U.S. Provisional Application No. 61/830,082, filed on Jun. 1, 2013. The disclosures of the above applications are incorporated herein by reference in their entirety.

TECHNICAL FIELD

The disclosure relates to techniques for filling orders, and more particularly, to techniques for filling orders using mobile computing devices.

BACKGROUND

Customers purchase products from a variety of different types of stores. Stores may sell a variety of different products or be limited to particular types of products. Example products include dry goods, grocery products, or any other items a customer may purchase. Different stores may have a variety of different sizes and layouts. Some stores may sell tens of thousands of products over a floor space covering tens of thousands of square feet. Stores may be referred to by different names, depending on the types of products sold at the store, the size of the store, the location of the store, and other factors. For example, a store may be referred to as a retail store, a grocery store, a supermarket, a hypermarket, a warehouse, a distribution facility, an outdoor market, or by another name.

Customers may interact with stores in a variety of different ways. In some scenarios, a customer may travel to the store and select products from within the store. Typically, the customer selects the desired products within the store and purchases the products at a checkout section of the store. In other scenarios, a customer may place an order for products from a location remote from the store (e.g., via the Internet or phone). In these scenarios, the purchased products may be shipped from the store to the customer's home.

SUMMARY

An order filling system of the present disclosure may be used to fill orders (e.g., customer orders) for a variety of different products. The order filling system may include a central computing system, one or more mobile scanning devices, and a plurality of location indicators. The mobile scanning devices, which may be transported throughout the store by users, may wirelessly receive customer orders from the central computing system and display the customer orders to users (e.g., store employees) so that the users may fill the customer orders. As described herein, the order filling system may provide for efficient picking of products included in customer orders. Although the order filling system may be used to provide for efficient picking of products for customers by employees of the store, in some implementations, a customer may use the order filling system in order to fill their own order. For example, the customer may place their order using a customer computing device (or a mobile scanning device) and subsequently pick products from their own order using the order filling system.

In some examples, a system according to the present disclosure comprises N location indicators and a mobile scanning device. The N location indicators are configured to be arranged throughout a store that includes a plurality of stocked items for picking according to one or more electronic customer orders. Each of the N location indicators is configured to transmit a different location signal. The mobile scanning device comprises a display. The mobile scanning device is configured to wirelessly receive an electronic customer order comprising a plurality of ordered items indicating which of the stocked items are to be picked, detect at least one of the N location signals, and arrange at least some of the plurality of ordered items on the display based on which of the at least one of the N location signals is detected.

In some examples, a system according to the present disclosure comprises N location indicators and a mobile scanning device. The N location indicators are configured to be arranged throughout a store that includes a plurality of stocked items for picking according to one or more electronic customer orders. Each of the N location indicators includes a different readable code. The mobile scanning device comprises a display. The mobile scanning device is configured to wirelessly receive an electronic customer order comprising a plurality of ordered items indicating which of the stocked items are to be picked, scan one of the N readable codes, and arrange at least some of the plurality of ordered items on the display based on the scanned readable code.

In some examples, a system according to the present disclosure comprises N mobile scanning devices and a central computing system. The N mobile scanning devices are configured to be moved throughout a store that includes a plurality of stocked items for picking according to one or more electronic customer orders. The central computing system is configured to receive a first electronic customer order comprising a plurality of ordered items indicating which of the stocked items are to be picked and wirelessly transmit the plurality of ordered items to each of the N mobile scanning devices. A first one of the N mobile scanning devices is configured to scan a first one of the plurality of ordered items and wirelessly transmit first data to the central computing system indicating that the first one of the plurality of ordered items has been scanned. The central computing system is configured to wirelessly transmit second data to a plurality of the N mobile scanning devices, the second data indicating that the first one of the plurality of ordered items has been scanned.

BRIEF DESCRIPTION OF THE DRAWINGS

FIGS. 4A-9 show example racks including location indicators in different locations.

FIGS. 28A-C show how multiple mobile scanning devices may display customer orders to users.

FIGS. 30A-30C show the store and the mobile scanning devices of FIGS. 28A-28C after the mobile scanning devices have moved through the store and some items have been picked.

DETAILED DESCRIPTION

Figure 1:
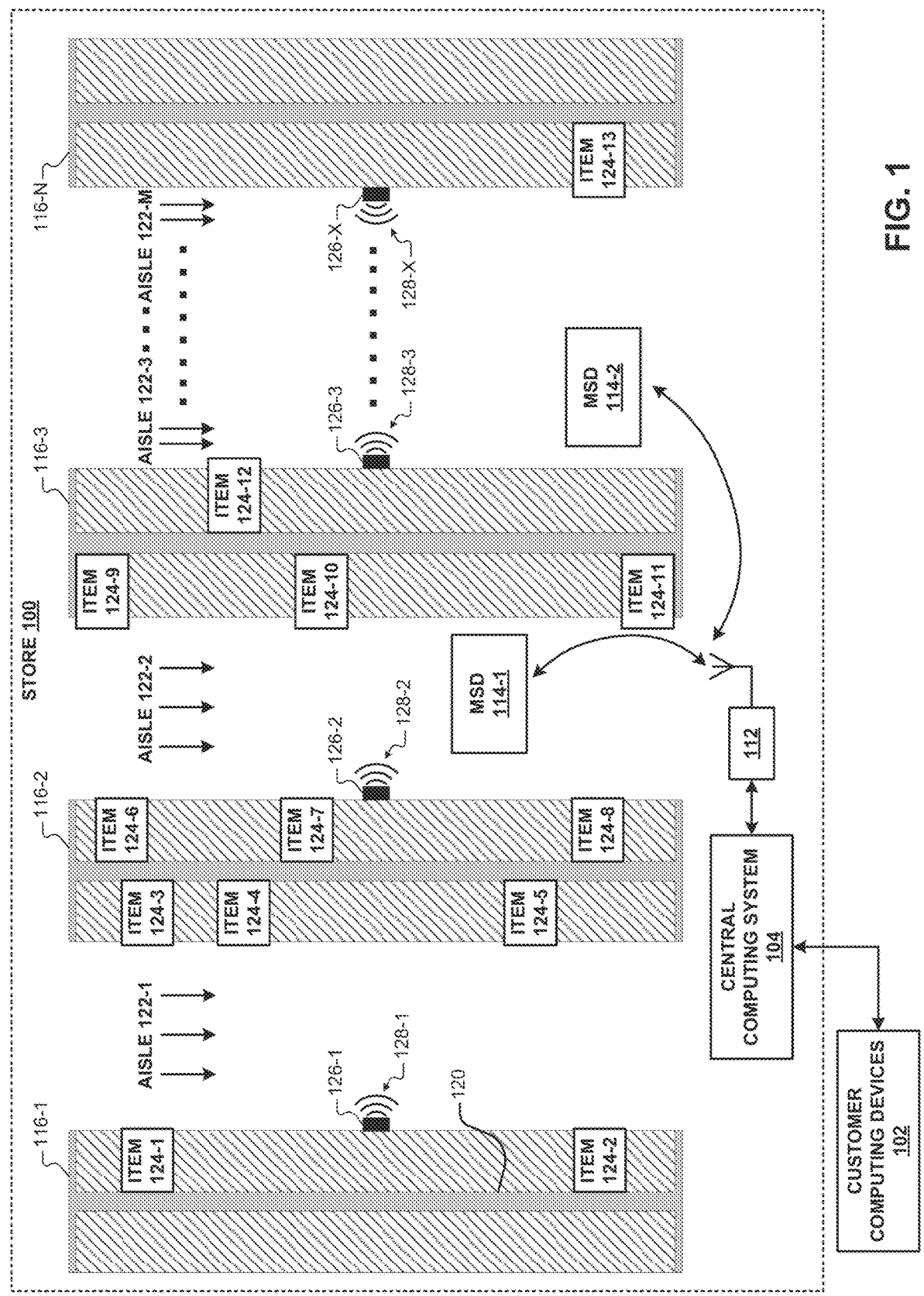
FIG. 1 shows an example implementation of an order filling system implemented in a store.

An order filling system of the present disclosure may be used to fill orders (e.g., customer orders) for a variety of different products. The order filling system may be implemented in a variety of different locations (e.g., a retail store, a warehouse, an outdoor market, etc.). Although the order filling system is generally described herein as being implemented in a store (e.g., a grocery store) to fill customer orders, the order filling system may be implemented in other locations to fill other types of orders. For example, the order filling system may be implemented in a warehouse or other building to fill warehouse orders. As used herein, a "store" may generally refer to any location (e.g., a retail store, grocery store, warehouse, outdoor market, etc.) in which the order filling system may be implemented.

The order filling system of the present disclosure may include a central computing system, one or more mobile scanning devices, and a plurality of location indicators. The central computing system may receive electronic customer orders from customer computing devices via a computer network, such as the Internet. Customer computing devices may include any type of computing device used by customers to place orders with the central computing system. For example, customer computing devices may include cell phones, tablet computers, laptop computers, desktop computers, or other computing devices. Each of the customer orders may include one or more items. An item may generally refer to any type of product that may be picked from the store. For example, an item may be a food product, a personal hygiene product, an electronic product, or any other product in inventory in the store.

The central computing system, which may be located within the store, may wirelessly transmit the customer orders to the one or more mobile scanning devices. For example, the central computing system may include wireless communication functionality (e.g., Bluetooth, IEEE 802.11, etc.) for wirelessly transmitting the customer orders to the mobile scanning devices. The mobile scanning devices, which may be transported throughout the store by users, may wirelessly receive the customer orders and display the customer orders to the users so that the users may fill the customer orders transmitted to the mobile scanning devices. In general, the users may be employees (e.g., store employees) that transport the mobile scanning devices around the store while filling the customer orders displayed on displays of the mobile scanning devices. In some examples, the mobile scanning devices may be configured to be held in the users' hands. In other examples, the mobile scanning devices may be placed in carts (e.g., a shopping cart, basket, or similar cart for carrying items) and may be pushed around the store by users while the users gather items to fill customer orders. In still other examples, the mobile scanning devices may be configured to attach to a user, e.g., around the forearm of a user or as a display worn on a user's head.

The users may begin filling the customer orders by gathering (i.e., picking) the items displayed on the mobile scanning devices. After gathering the items, one or more of the users may assemble (e.g., pack) the customer orders from the gathered items. Subsequently, the customer that placed the customer order with the central computing system may receive the filled customer order. In some examples, the customer may pick up the filled customer order at the store. In other examples, the filled customer order may be delivered to the customer (e.g., at the customer's home).

The location indicators may be arranged throughout the store. In general, the location indicators may be any object or device that indicates a location within the store. In some examples, the location indicators may generate location signals. For example, the location indicators may wirelessly transmit the location signals. The mobile scanning devices may receive the transmitted location signals and determine a location within the store based on the detected location signals. The location indicators may transmit location signals in a variety of different ways, and the mobile scanning devices may be configured to detect the transmitted location signals in a variety of different ways. Example location indicators, location signals, and detection of the location signals by a mobile scanning device are described hereinafter in more detail. Although location indicators may transmit location signals in some examples, in other examples, location indicators may be objects that may be read by the mobile scanning devices. For example, the location indicators may be barcodes attached to racks in the store. Although mobile scanning devices may determine a location within the store based on location signals generated by location indicators within the store, in other examples, the mobile scanning devices may determine a location within the store in response to signals generated outside of the store, e.g., in response to global positioning system (GPS) signals received from GPS satellites. In still other examples, mobile scanning devices may determine a location value within the store using other technologies. For example, mobile scanning devices may determine a location value using a WiFi signal transmitted within the store.

Mobile scanning devices may have a variety of different configurations. For example, mobile scanning devices may have a variety of different form factors and different functionalities, depending on how the order filling system is implemented in the store. As described above, the mobile scanning devices may have handheld form factors and/or be configured to be placed in carts and pushed by a user. Example form factors are illustrated and described in FIGS. 26A-26I.

The mobile scanning devices may include wireless communication functionality (e.g., IEEE 802.11, Bluetooth, etc.) for communicating with the central computing system, other mobile scanning devices, and other wireless devices. For example, the mobile scanning devices may receive customer orders wirelessly from the central computing system and indicate to the central computing system and/or other mobile scanning devices when items from the customer orders have been scanned.

A mobile scanning device may also include a display for displaying information to the user. In some examples, the display may be a liquid crystal display (LCD), an organic light-emitting diode (OLED) display, an electrophoretic display, or other display technology. For example, a mobile scanning device having a handheld form factor may include an LCD display. In other examples, a mobile scanning device having a head-mounted form factor may include a head-mounted display.

The display of a mobile scanning device may display the items of the customer orders to the users. Additionally, the display of a mobile scanning device may display other information to the users other than the customer orders. The users may view the items displayed on the displays and subsequently pick the items from racks or other containers in the store. The users may then scan the items (e.g., scan barcodes on the items) and take the items to an area in the store (e.g., a collection area) where the orders may be bagged for customer pickup or delivery.

The mobile scanning devices may be configured to detect the location signals transmitted from the location indicators and perform various operations in response to detection of the location signals. In one sense, the location signals received by a mobile scanning device may be thought of as indicating a location within the store. For example, assuming that a first aisle of the store includes a first location indicator that transmits a first location signal and a second aisle includes a second location indicator that transmits a second location signal, a mobile scanning device located in the first/second aisle may determine that it is located in the first/second aisle when the mobile scanning device detects the first/second location signal. The location signals may also be thought of as signals that indicate which items of the store are in proximity to a mobile scanning device. For example, since each of the items in the store may be associated with one or more location signals (i.e., a location value), a mobile scanning device may, upon detection of a location signal, determine which items are in the vicinity of the mobile scanning device.

A mobile scanning device may determine a location within, or outside of, the store. In some examples, a mobile scanning device may determine a location value based on detected location signals. A location value may generally refer to any value or plurality of values (e.g., alphanumeric values) determined by a mobile scanning device that indicate a location of the mobile scanning device within, or outside of, the store. The location values determined by a mobile scanning device may depend on the types of location indicators used in the store. A variety of example location indicators and example location signals are described herein. In examples where the location indicators do not transmit location signals, a mobile scanning device may determine location values in a different manner. For example, when location indicators are readable objects (e.g., barcodes), a mobile scanning device may determine a location value and a location within the store based on a code included on the readable object.

As described above, a customer order may include one or more items. For example, an item included in a customer order may be any product that a customer may purchase at the store. In some examples, the customer order may include a plurality of grocery items such as cereal, canned food, chicken, milk, ice cream, eggs, fruits, vegetables, etc. In some examples, a customer order may include other items available at a retail store such as personal hygiene items (e.g., shampoo, razor blades, and soap). A customer order may also include items such as movies, videogames, and electronic devices.

An item identification code (hereinafter "item ID code") may generally refer to any code (e.g., alphanumeric or other type of code) that may be associated with an item that serves to identify that item (e.g., uniquely identifies the item). Each item in the store may be identified by an item ID code. In some examples, an item ID code may be a barcode (e.g., 1 or 2 dimensional barcode) on an item. The barcode may be printed on packaging of the item or printed on a sticker attached to packaging of the item. In other examples, the item ID code may be a code retrieved from a radio-frequency identification (RFID) device (e.g., an RFID tag or other RFID form factor) attached to packaging of the item or included in packaging of the item. In still other examples, the item ID code may be a number (e.g., a product look-up code) attached to the item that may be entered manually by a user. Such a code may be used to identify produce items (e.g., fruits and vegetables), for example.

A mobile scanning device may acquire an item ID code in a variety of different ways, depending on the type of item ID code associated with the item. As described above, an item ID code may be acquired from a barcode, an RFID tag, or may be manually entered by a user. In some examples, a mobile scanning device may include a scanning module configured to scan barcodes to retrieve the item ID code. In some examples, a mobile scanning device may include a scanning module configured to acquire item ID codes from RFID tags. In some examples, a mobile scanning device may include a user interface (e.g., touchscreen and/or buttons) configured to receive user input, such as manually entered item ID codes. Although item ID codes may be a barcode, RFID, or a manually entered code in some examples, it is contemplated that other types of item ID codes may be implemented. It is also contemplated that a mobile scanning device may be configured to acquire other types of item ID codes.

A customer order may be identified by a customer order identification number (hereinafter "order ID number"). An order ID number may generally refer to any code (e.g., alphanumeric or other type of code) that may be associated with a customer order that serves to identify that customer order (e.g., uniquely identifies the customer order). In some examples, the central computing system may assign each customer order a different order ID number that may uniquely identify that customer order. Each of the items included in a customer order may also be associated with the order ID number.

A mobile scanning device may acquire location signals as the mobile scanning device is transported throughout the store by a user. The location indicators may be set up throughout the store in a variety of different configurations. In some examples, the location indicators may be set up in the store such that the mobile scanning device may pick up a location signal at any location within the store. In these examples, the location indicators may be set up such that the location signals generated by the location indicators overlap to varying degrees such that a mobile scanning device may acquire multiple location signals simultaneously in some locations. Additionally, or alternatively, the location indicators may be arranged such that the location signals do not quite overlap, but, instead, the location signals may abut one another or be separated by a short distance such that a mobile scanning device may detect a first location signal in a first location and then abruptly detect a second location signal upon moving out of range of the first location signal. In other examples, the location indicators may be set up such that a mobile scanning device may not pick up location signals at some locations within the store. In these examples, there may be "dead zones" in which a mobile scanning device may not acquire location signals because location signals may be absent in that location, or not be sufficiently strong in that location. Various configurations of location indicators within a store are illustrated and described herein.

A mobile scanning device may perform a variety of different operations based on the location value determined by the mobile scanning device. As described above, a mobile scanning device may receive customer orders from the central computing system as the mobile scanning device is being transported throughout the store. In some examples, a mobile scanning device may be configured to arrange the items of received customer orders on a display of the mobile scanning device based on the currently determined location value. For example, the mobile scanning device may be configured to place the items in proximity to the scanning device at the top of the display for the user to view.

The items in locations that are not in proximity to the user (i.e., more distant from the user) may be placed at a location lower down on the display (e.g., near the bottom of the display). In examples where a large number of items are ordered, the items that are more distant from the user may be omitted from the display. Accordingly, in some examples, the items that are in closer proximity to the user may be displayed at the top of the display while those items that are more distant from the user may be placed at the bottom of the display or not included on the display. Such an arrangement of items on a mobile scanning device display may prompt the user to pick items from the racks that are closest to the user. This may speed up the picking process by prompting a user to pick those items that may be picked the quickest and preventing the user from walking by items that are currently ordered by a customer.

The display of a mobile scanning device may be updated in real-time as the mobile scanning device is moved throughout the store. For example, the arrangement of the items listed on the display may be updated as the user moves the mobile scanning device from a first location where a first location signal is detected by the mobile scanning device to a second location where a second location signal is detected by the mobile scanning device. In this example, the items on the display may be rearranged in real-time to reflect which items are currently in proximity to the user after the user has moved to the second location. Since the displayed items may vary based on the location of the mobile scanning device, it follows that, in some examples, different mobile scanning devices in different locations of the store may display different arrangements of items to the different users.

In some examples, the display of a mobile scanning device may also be updated in real-time when new customer orders are received. For example, if a newly received customer order includes items that are in the store at the current location of a mobile scanning device, the display of that mobile scanning device may be updated to include the items of the newly received order at or near the top of the display of the mobile scanning device. This may prevent a user from walking past an item that has just been ordered (e.g., ordered within the past few seconds).

In some examples, the display of a mobile scanning device may also be updated in real-time when items are scanned by the mobile scanning device. For example, an item may be removed from the display of the mobile scanning device when the mobile scanning device scans the item. In some examples, the displays of multiple mobile scanning devices may be updated in real-time when items are scanned by any one of the multiple mobile scanning devices. For example, when an item is scanned by any one of the multiple mobile scanning devices, the item may be removed from the displays of all of the mobile scanning devices in the store. In these examples, all of the mobile scanning devices may be updated each time any of the mobile scanning devices in the store scans an ordered item. This may allow multiple users located throughout the store to scan and pick different items of a single customer order. In some circumstances this may allow customer orders to be picked more quickly than if a single user was picking the entire order.

FIG. 1 shows an example implementation of an order filling system implemented in a store 100. Store 100 is illustrated as a dotted box. Store 100 may represent any building structure that may house the items described herein. Although store 100 is generally described herein as a grocery store, supermarket, big-box store, hypermarket, etc., it is contemplated that the systems and methods for filling orders described herein may be applicable to other types of businesses and buildings, such as warehouses (e.g., a manufacturer or retailer warehouse), factories, distribution centers (e.g., a manufacturing or retail company distribution center), convenience stores, shopping plazas, or outdoor markets.

Customers may place customer orders to have filled at store 100 using customer computing devices 102. A central computing system 104 may receive the customer orders from customer computing devices 102. A customer computing device 102 may include any electronic device that a customer may use to place a customer order. For example, a customer computing device 102 may include a desktop computer or a mobile computing device such as a laptop computer, smart phone, or tablet computer. In some examples, customer computing devices 102 may be devices that are located external to store 100. In these examples, central computing system 104 may be configured to receive the customer orders from customer computing devices 102 via the Internet, or other computer network. In other examples, customer computing devices 102 may be located in store 100. For example, customer computing devices 102 may be mobile computing devices that customers have brought into store 100. As an additional example, store 100 may include customer computing devices 102 (e.g., desktops or kiosks) that may be used by the customers to place customer orders.

Central computing system 104 may implement a variety of different functions. In general, central computing system 104 may refer to one or more of a variety of computing devices configured to provide the functionality described herein. For example, central computing system 104 may include computer networks, servers (e.g., web servers), data stores, routers, software, etc. Although central computing system 104 is illustrated as included in store 100 (e.g., FIG. 1), a portion of central computing system 104, or all of central computing system 104, may be located outside of store 100 in some examples. Put another way, central computing system 104 may include one or more different computing devices that are located at one or more locations within or outside of store 100.

Figure 2:
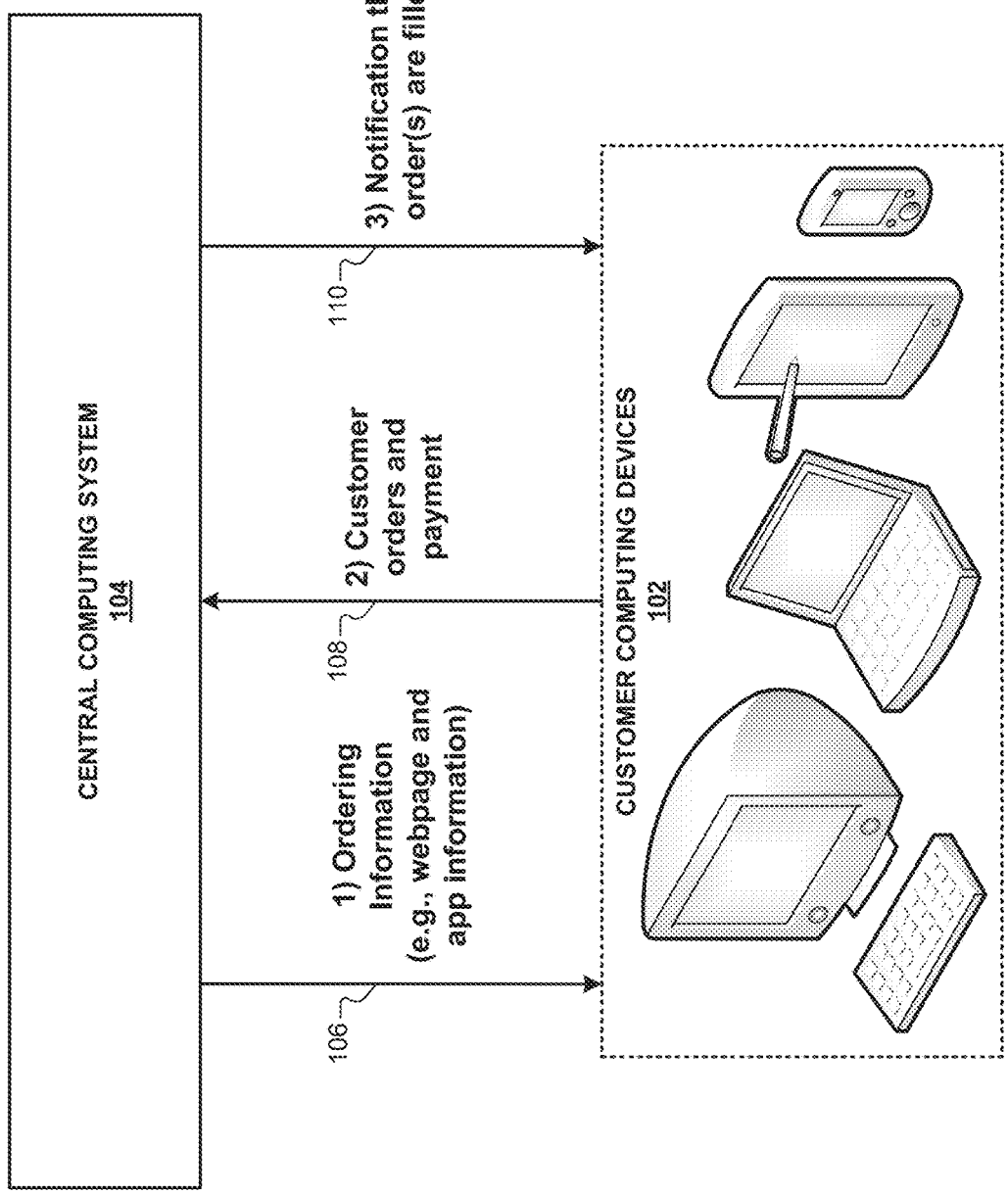
FIG. 2 shows a central computing system communicating with a plurality of customer computing devices via a computer network.

Referring now to FIG. 2, central computing system 104 may be configured to communicate with a plurality of customer computing devices 102 via a computer network (e.g., the Internet). Central computing system 104 may provide electronic commerce (i.e., ecommerce) functionality so that customers may use customer computing devices 102 to place customer orders with store 100. In some examples, central computing system 104 may provide online shopping functionality. For example, central computing system 104 may provide a shopping website to customer computing devices 102 or provide other data to an application running on customer computing devices 102 so that customers may place electronic customer orders with store 100 using customer computing devices 102. The shopping website or other data provided to customer computing devices 102, indicated at 106, may include information related to items the customer may order at store 100, such as item names, prices, availability, and reviews.

A customer may place an electronic customer order that includes one or more items. Placing a customer order is indicated at 108. In some examples, the customer may place a customer order via a website accessed using a customer computing device 102. In other examples, a customer may place a customer order via a dedicated software application (e.g., an "app") running on a customer computing device 102, such as a mobile phone or a tablet computer. Central computing system 104 may be configured to accept payment for the customer order, e.g., using a credit card, as indicated at 108. Additionally, or alternatively, a customer may pay for the customer order in store 100, e.g., using a credit card, check, or cash.

After a customer order is placed, central computing system 104 may transmit (e.g., wirelessly transmit) the customer order to one or more mobile scanning devices. The users in store 100 may then pick each of the items of the customer order and pack the items of the customer order for customer pickup or delivery. In some examples, central computing system 104 may notify the customer that the customer order has been picked by sending a notification to a customer computing device 102, as indicated at 110.

Referring back to FIG. 1, the order filling system may include a wireless communication system 112 (hereinafter "communication system 112") configured to provide wireless communication functionality within store 100. Communication system 112 may represent electronic hardware and software that provides wireless communication functionality with a plurality of wireless devices within store 100. For example, communication system 112 may include one or more wireless routers, antennas, and other devices that facilitate communication with wireless devices in the store 100. In some examples, communication system 112 may provide wireless communication using Bluetooth, IEEE 802.11, and/or another wireless communication technology.

The order filling system includes one or more mobile scanning devices (e.g., mobile scanning device (MSD) 114-1 and/or mobile scanning device 114-2). Mobile scanning device 114-1 and mobile scanning device 114-2 may be referred to collectively as "mobile scanning devices 114." Mobile scanning devices 114 may be transported throughout store 100 by users. Although two mobile scanning devices 114 are illustrated in FIG. 1, it is contemplated that more than two mobile scanning devices may be included in the order filling system of the present disclosure. It is also contemplated that only a single mobile scanning device may be used in some implementations of the order filling system of the present disclosure.

Communication system 112 may communicate with mobile scanning devices 114. For example, communication system 112 may transmit data (e.g., customer orders) to mobile scanning devices 114 and receive data from mobile scanning devices 114. Communication system 112 may also communicate with central computing system 104. For example, communication system 112 may receive data from central computing system 104 and transmit the received data to mobile scanning devices 114. As another example, communication system 112 may receive data from mobile scanning devices 114 and transmit data to central computing system 104. Accordingly, mobile scanning devices 114 may communicate (e.g., transmit/receive data) with central computing system 104 via communication system 112.

Figure 3B:
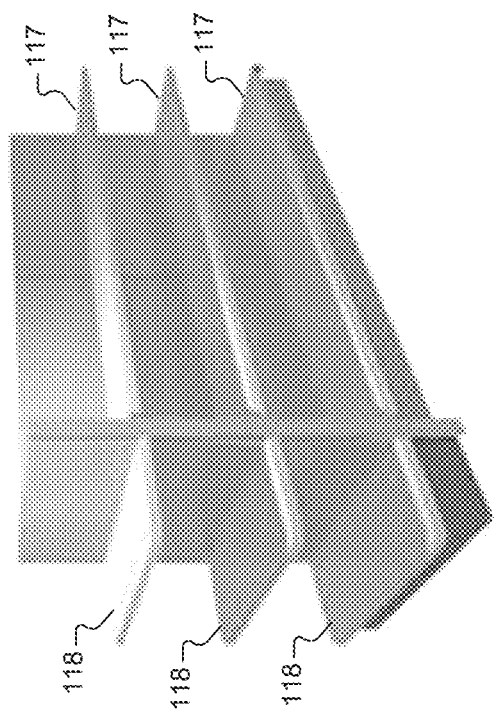
FIGS. 3A-3B show perspective views of example racks of a store.
Figure 3A:
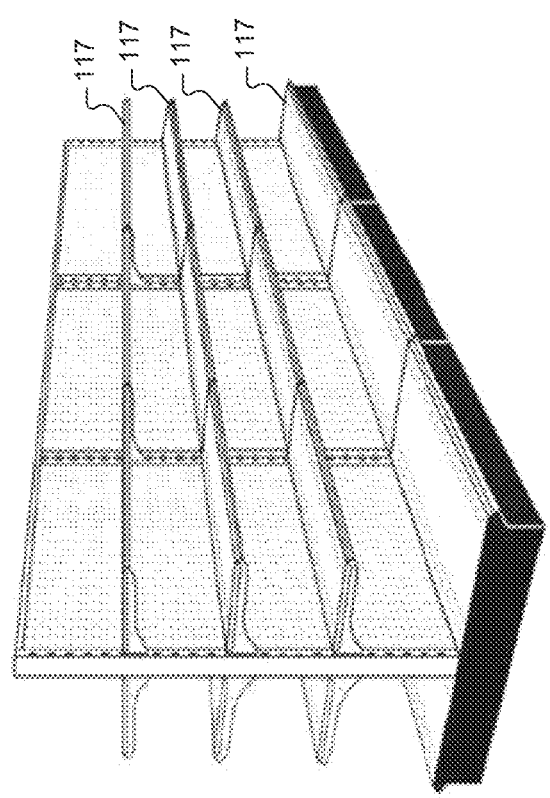

Store 100 includes racks 116-1, 116-2, 116-3, . . . , and 116-N (collectively "racks 116"). Racks 116 may represent any type of structure used to hold items. Racks 116 in FIG. 1 are illustrated from a top down perspective. The material (e.g., metal) that forms racks 116 is represented by gray shaded areas. Space on racks 116 for the storage of items is illustrated as hashed regions. In some figures (e.g., FIG. 1), specific items included in customer orders are illustrated and labeled (e.g., items 124-1 to 124-13 in FIG. 1). Illustrations of racks 116 herein are meant to represent a top down view of racks/shelving that are typically found in retail and grocery stores. Example 3D perspective views of racks 116 are shown in FIG. 3A and FIG. 3B. FIG. 3A shows a perspective view of racks 116 illustrated in FIG. 1 that include space on shelves 117 for storage of items. FIG. 3B shows a similar rack that includes shelves 117 and an end portion 118. The rack shown in FIG. 3B is illustrated in a top down perspective in FIG. 17, for example.

Racks (e.g., racks 116) described herein are not limited to the types of racks illustrated in FIG. 3A and FIG. 3B. Instead, racks 116 may represent any type of structure used to hold items, such as shelving, bins, baskets, pallets, and hooks. Racks 116 may also represent refrigerated storage units including, but not limited to, beverage refrigerators, display coolers/freezers, and walk-in refrigerators/freezers. In some examples, racks 116 may be mobile. For example, racks 116 may include pallets or carts having wheels.

Each of racks 116 illustrated in FIG. 1 include space for items (hashed regions) and a dividing portion (e.g., dividing portion 120 of rack 116-1) that divides the spaces for items. The hashed regions of racks 116 represent one or more shelves on which items may be placed. The number of shelves included on a rack may vary. In some examples, racks may include a single shelf. In other examples, racks may include a plurality of shelves which may be spaced evenly from one another or may be variably spaced. The dividing portions (e.g., portion 120) of racks may separate the shelves. Typically, when items on one side of a rack are accessible to a user, items on the other side of the rack are out of reach of the user due to the dividing portion.

Store 100 may include open floor space where a user (e.g., store employee and/or store customer) may move. In some examples, open floor space between racks may be referred to as aisles, e.g., aisles 122-1, 122-2, . . . , and 122-M (collectively "aisles 122"). Although FIG. 1 illustrates racks 116 as linear and illustrates aisles 122 as linear portions of open floor space defined by racks 116, it is contemplated that store 100 may include racks and aisles having a variety of different geometries. The techniques of the present disclosure are not limited to any specific type of rack and aisle layout, but instead, the techniques may be implemented in any variety of different rack and aisle layouts.

As described above, the hashed regions on racks 116 illustrate space on racks where items are stored. Some portions of the hashed regions on racks 116 include white boxes labeled with item numbers. For example, racks 116 include items 124-1 to 124-13. The boxes labeled as items 124-1 to 124-13 illustrate the location of items on shelves. For example, items 124-1, 124-2, 124-3, 124-4, 124-5 are included on rack 116-1 and rack 116-2. Items 124-1, 124-2, 124-3, 124-4, 124-5 are accessible by a user that is located in aisle 122-1. Similarly, items 124-6, 124-7, . . . , 124-11 are accessible by a user that is located in aisle 122-2.

Similar types of items may be grouped together along an aisle in a typical store. For example, the items located along aisle 122-1, i.e., the items accessible in aisle 122-1 from rack 116-1 and rack 116-2, may be items of a similar type. In one example, the items along aisle 122-1 may be cereal items (e.g., bags or boxes of cereal). In another example, items along aisle 122-1 may be beverage items such as soft drinks and water. In another example, items along aisle 122-1 may be frozen items such as frozen entrees, pizzas, and ice cream. In examples where items along aisle 122-1 are frozen items, rack 116-1 and rack 116-2 may be refrigerated storage units (e.g., display coolers/freezers). Although the techniques of the present disclosure may be implemented in stores in which similar types of items are grouped together (e.g., in a typical grocery store), the techniques of the present disclosure do not require that similar types of items be grouped along the same aisle.

Store 100 includes location indicators 126-1, 126-2, 126-3, . . . , and 126-X (collectively "location indicators 126"). Location indicators 126 may include any device or object that indicates a location in store 100. In some examples, location indicators 126 may indicate a location within store 100 by transmitting location signals that indicate the location within store 100. For example, location indicator 126-1 may transmit location signal 128-1 that may indicate a location within aisle 122-1. Similarly, location indicator 126-2 may transmit location signal 128-2 that may indicate a location within aisle 122-2. Although location signals (e.g., 128-1, 128-2) are illustrated as transmitted in a cone radiation pattern having approximately a 90 degree angle, the illustration of location signals (e.g., 128-1, 128-2) in this manner is merely meant to indicate that location indicators of the present disclosure are transmitting signals. It is contemplated that the location signals may be transmitted in a variety of different radiation patterns and distances. Additionally, it is contemplated that the location indicators described herein may be mounted to racks, or other structures (e.g., walls, floors, ceilings), at different angles in order to direct the transmission of location signals in different directions.

In other examples, location indicators may be objects (e.g., printed barcodes) including codes that indicate a location within a store. For example, location indicator 126-1 may be replaced by a location indicator including a code (e.g., a printed barcode) indicating a location within aisle 122-1. Similarly, location indicator 126-2 may be replaced by a location indicator including a code (e.g., a printed barcode) indicating a location within aisle 122-2. Such location indicators including codes (e.g., barcodes) may be scanned by mobile scanning devices, e.g., using barcode scanners included in the mobile scanning devices.

Mobile scanning devices 114 may be configured to determine a location within store 100 in a variety of different ways, depending on the type of device or object used as a location indicator. In examples where location indicators 126 wirelessly transmit location signals that indicate a location within store 100, mobile scanning devices 114 may be configured to acquire the location signals and determine locations within store 100 based on the acquired location signals. In examples where location indicators are objects that include codes (e.g., barcodes), mobile scanning devices 114 may be configured to scan the codes on the location indicators and determine a location within store 100 based on the scanned codes.

Location indicators 126 may be configured to transmit location signals using any type of wireless transmission technology. In some examples, location indicators 126 may include an antenna (e.g., a metal antenna) that transmits location signals. In some examples, location indicators 126 may include a light emitting device (e.g., an LED or other photonic devices) that transmit location signals. In some examples, location indicators 126 may include an acoustic device that transmits location signals (e.g., sound waves).

The distance over which location indicators 126 transmit location signals 128, and the area covered by location signals 128, may vary depending on a variety of different factors including, but not limited to, the amount of power used to generate location signals 128, the location of location indicators 126 within store 100, and the technology included in location indicators 126 (e.g., an antenna, an LED, or acoustic device). In some examples, location indicators 126 may be configured to transmit location signals 128 over a relatively short distance and a small area within store 100. In other examples, location indicators 126 may be configured to transmit location signals 128 over longer distances and larger areas within store 100. For example, location indicators 126 may be configured to transmit location signals 128 from a few centimeters up to distances of tens of meters (e.g., 100 meters). In some examples, location indicators 126 may transmit location signals 128 along the length of an aisle or even across the length of store 100.

Location indicators 126 may transmit location signals 128 in a variety of different patterns which are described hereinafter with respect to location indicator 126-1. In some examples, location indicator 126-1 may transmit a location signal 128-1 along a line. For example, location indicator 126-1 may include a laser that transmits a laser beam along a straight line. In other examples, location indicator 126-1 may include an antenna that radiates location signal 128-1 in a directional manner. For example, location indicator 126-1 may include an antenna that radiates location signals having lobes and nulls. In other examples, location indicator 126-1 may transmit location signal 128-1 in nearly all directions. For example, location indicator 126-1 may include an antenna that generally radiates in all directions, or an LED that emits light in nearly all directions. It is contemplated that the directionality and power of the location signals may be adjusted to adjust the area of store 100 covered by the location signals. For example, the amount of power used to generate a location signal may be increased in order to transmit the location signal a greater distance.

The location of location indicators 126 within store 100 may affect the distance and area covered by location signals 128. As described herein, location indicators 126 may be placed in a variety of different locations in store 100. For example, location indicators 126 may be attached to the walls of store 100, mounted on shelves (e.g., near the floor or head height), placed on the floor, mounted overhead of the users, connected to the ceiling, or located at any other location within store 100.

Referring to FIG. 1, location indicator 126-1 transmits location signal 128-1 into aisle 122-1. Location indicator 126-1 is illustrated as connected to rack 116-1. Location indicator 126-1 may be connected to rack 116-1 in a variety of different locations. In some examples, location indicator 126-1 may be attached to, or placed on, any one of a plurality of shelves of rack 116-1. In some examples, location indicator 126-1 may be placed where rack 116-1 meets the floor. In other examples, location indicator 126-1 may be connected to rack 116-1 overhead of users. For example, rack 116-1 may include a piece that overhangs aisle 122-1. Although location indicators 126 are illustrated as connected to racks 116 in FIG. 1, location indicators 126 may be placed in other locations, e.g., on the floor, attached to the ceiling, etc.

The area covered by location signals 128 may depend on the location of location indicators 126. With respect to FIG. 1, if location indicator 126-2 is attached to a shelf of rack 116-2, location signal 128-2 may be transmitted throughout aisle 122-2. In other words, if location indicator 126-2 is attached to a shelf of rack 116-2, location signal 128-2 may cover some or all of aisle 122-2. Depending on the directionality and power of location signal 128-2, location signal 128-2 may cover only a portion of aisle 122-2, or may cover all of aisle 122-2 and even spill outside of aisle 122-2 to floor space adjacent to aisle 122-2. If location indicator 126-2 is attached to a shelf of rack 116-2, location signal 128-2 may not penetrate racks 116-2, 116-3 and/or the items on racks 116-2, 116-3 in some examples. In these examples, location signal 128-2 may not cover floor space in aisles 122-1 and 122-3, and, therefore, location signal 128-2 may not be detectable in these areas in some examples. In other examples, location signal 128-2 may be detectable in aisles 122-1, 122-3. For example, location signal 128-2 may penetrate racks 116-2, 116-3 and items on racks 116-2, 116-3 such that location signal 128-2 covers some area in aisles 122-1, 122-3. As an additional example, location signal 128-2 may be detectable by mobile scanning devices 114 in aisles 122-1, 122-3 if gaps exist in racks 116-2, 116-3 and between items on racks 116-2, 116-3. Furthermore, in some examples, location signal 128-2 may be detectable by mobile scanning devices 114 in aisles 122-1, 122-3 if location signal 128-2 exits aisle 122-2 and reflects back into aisles 122-1, 122-3.

FIGS. 4A-9 show example racks including location indicators in different locations. FIGS. 4A-4B show an example rack 130 on floor 132. Rack 130 includes shelves 134. Items 136 (illustrated as white boxes) are arranged on shelves 134. In general, rack 130 may be approximately 6 feet high. Shelves 134 may be approximately 1-2 feet apart. FIG. 4A shows a view of rack 130 from the end of rack 130 such that rack 130 would extend into and out of the page. FIG. 4B shows a view of rack 130 as would be viewed from an aisle.

In FIGS. 4A-4B, location indicators 138-1, 138-2, 138-3, 138-4 are attached to shelves 134-1, 134-2. Shelves 134-1, 134-2 may be approximately waist height (e.g., approximately 3 feet from floor 132). Accordingly, location indicators 138-1, 138-2 are located at approximately waist height and may transmit location signals from approximately waist height.

Location indicators of the present disclosure may be arranged along racks at a variety of different distances. With respect to FIG. 4B, location indicators 138-2, 138-3, 138-4 are evenly separated along rack 130. Although location indicators 138-2, 138-3, 138-4 are evenly separated in FIG. 4B, in other examples, location indicators 138-2, 138-3, 138-4 may be separated by varying distances. Although 3 location indicators 138-2, 138-3, 138-4 are illustrated in FIG. 4B, in some examples, more or less than 3 location indicators may be arranged along rack 130.

Figure 5B:
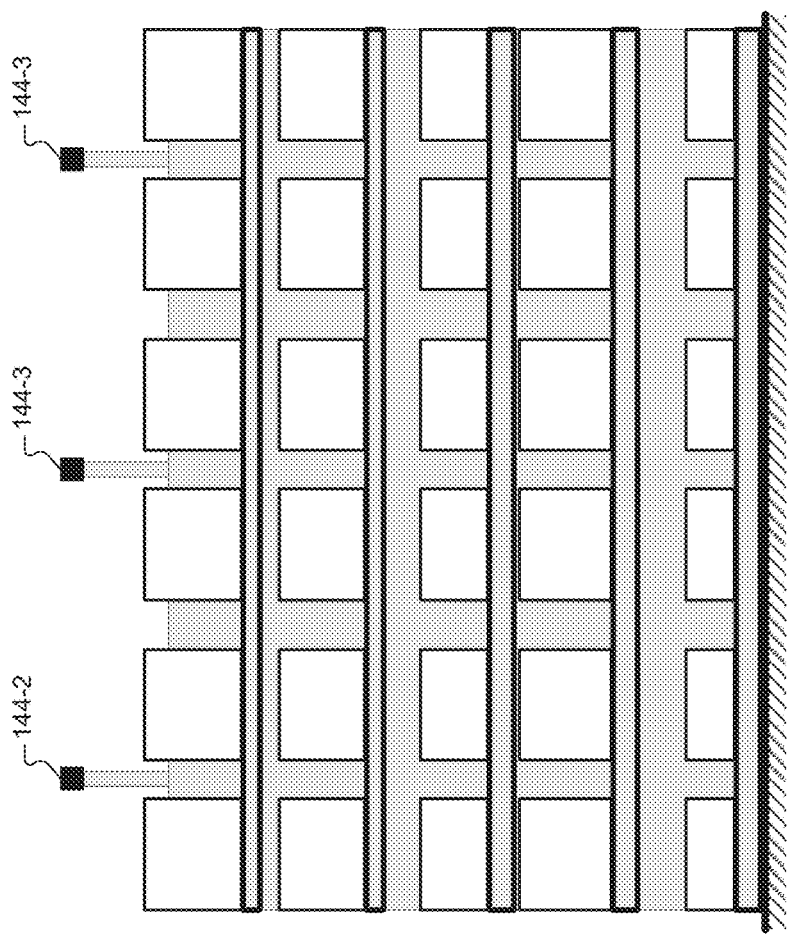
Figure 5A:
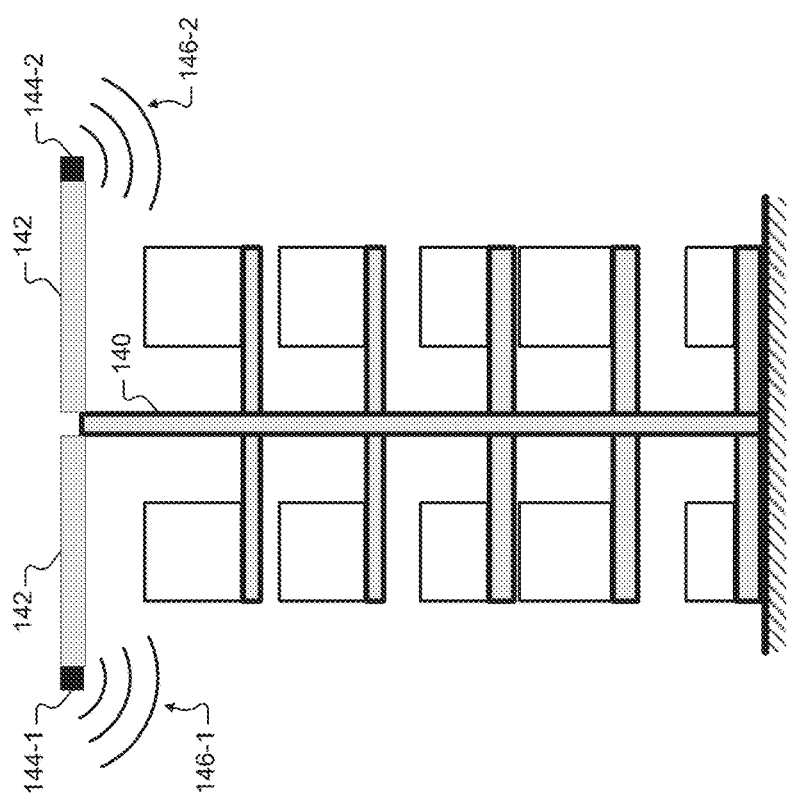

FIGS. 5A-5B show another example arrangement of location indicators along a rack. In FIGS. 5A-5B, rack 140 includes supporting members 142 configured to hold location indicators 144-1, 144-2, 144-3, 144-4 above rack 140 (e.g., over customer heads). In some examples, supporting members 142 may include metal rods that may be connected (e.g., clamped) to rack 140. Supporting members 142 may also be used to hold other objects, such as signs indicating what items are included in the aisle. Location indicators 144-1, 144-2, 144-3, 144-4 are connected to supporting members 142 and configured to generate location signals (e.g., 146-1, 146-2) that cover areas of the store adjacent to rack 140. For example, location indicators 144-1, 144-2, 144-3, 144-4 may be configured to point downward toward areas adjacent to rack 140 such that a mobile scanning device located in the aisle adjacent to rack 140 may detect one of location signals 146-1, 146-2.

Figure 6:
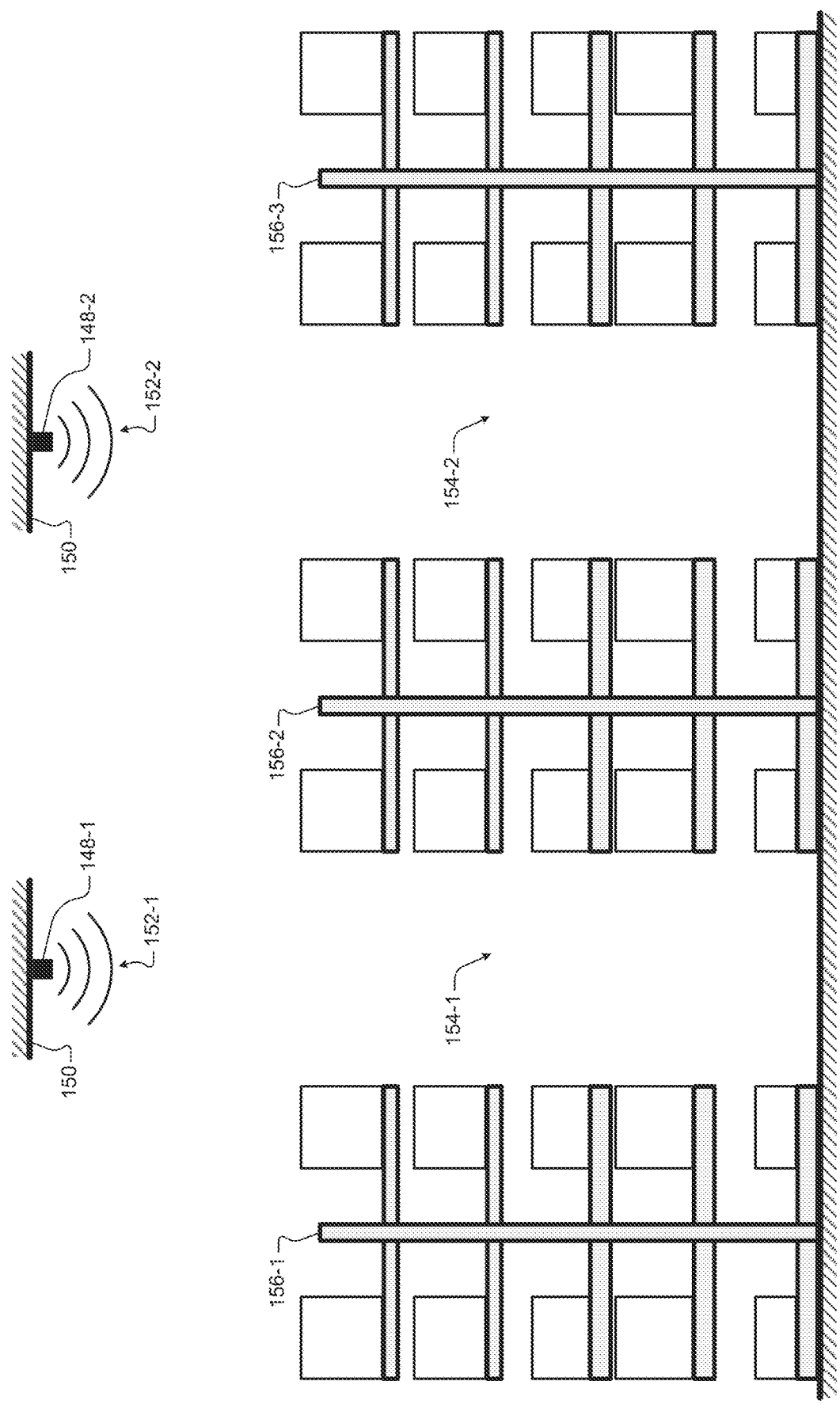

FIG. 6 shows another example arrangement of location indicators in which location indicators are located above racks. For example, location indicators 148-1, 148-2 may be attached to ceiling 150 (e.g., rafters) of the store. In this example, location indicators 148-1, 148-2 may transmit location signals 152-1, 152-2 into aisles 154-1, 154-2 between racks 156-1, 156-2, 156-3.

Figure 7B:
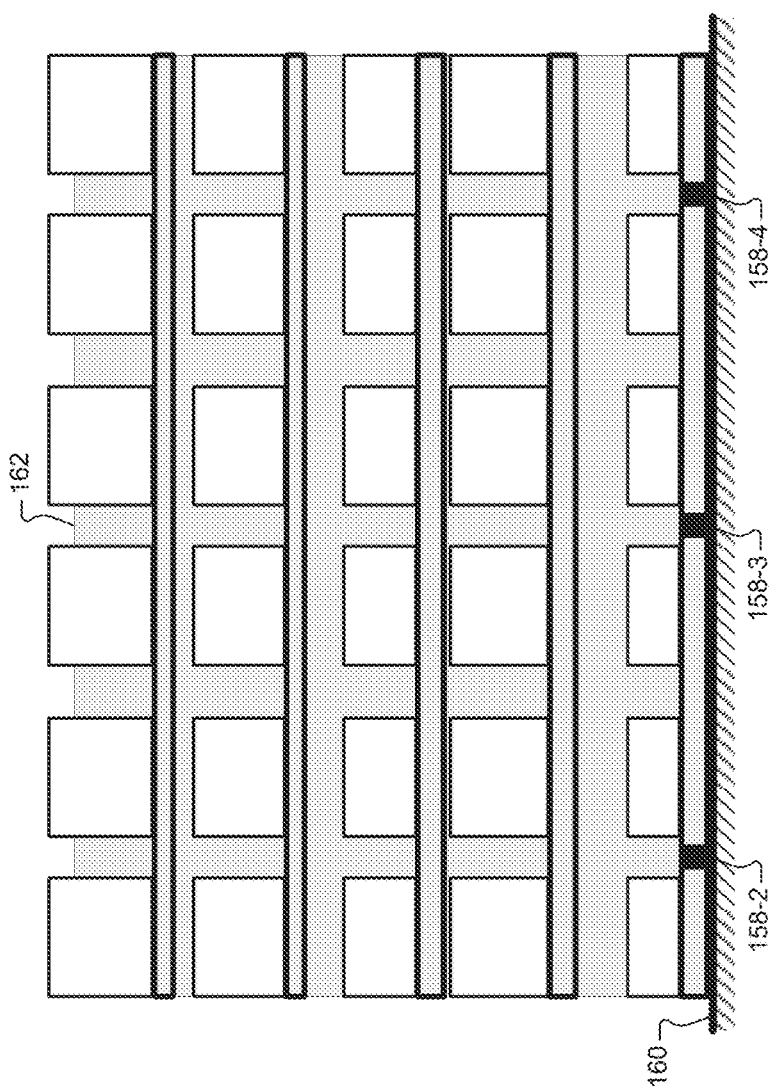
Figure 7A:
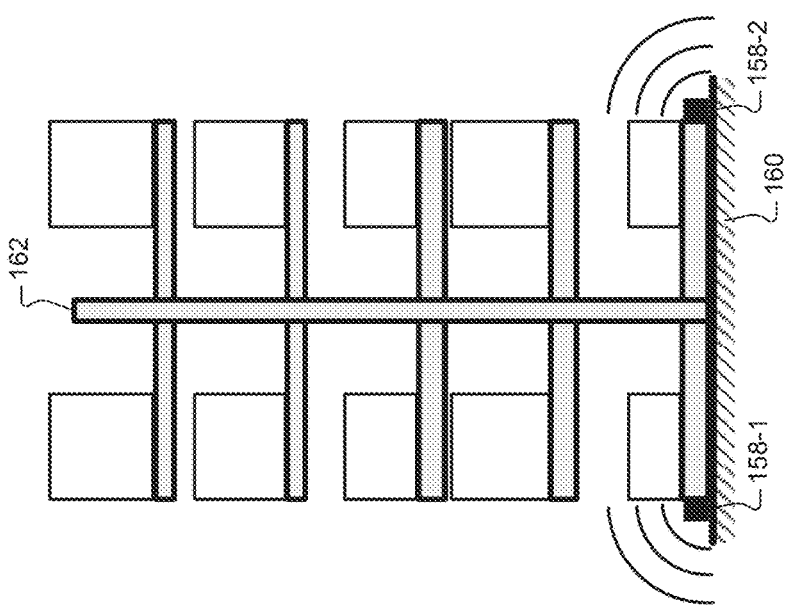

FIGS. 7A-7B show another example arrangement of location indicators. In FIGS. 7A-7B, location indicators 158-1, 158-2, 158-3, 158-4 are located near floor 160. For example, location indicators 158-1, 158-2, 158-3, 158-4 may be attached to the bottom shelves of rack 162 or connected to floor 160 near the bottom of rack 162. In some examples, location indicators 158-1, 158-2, 158-3, 158-4 may be embedded in floor 160. Although location indicators 158-2, 158-3, 158-4 are evenly separated in FIG. 7B, in other examples, location indicators 158-2, 158-3, 158-4 may be separated by varying distances. Although 3 location indicators 158-2, 158-3, 158-4 are illustrated in FIG. 7B, in some examples, more or less than 3 location indicators may be arranged along rack 162.

Figure 8:
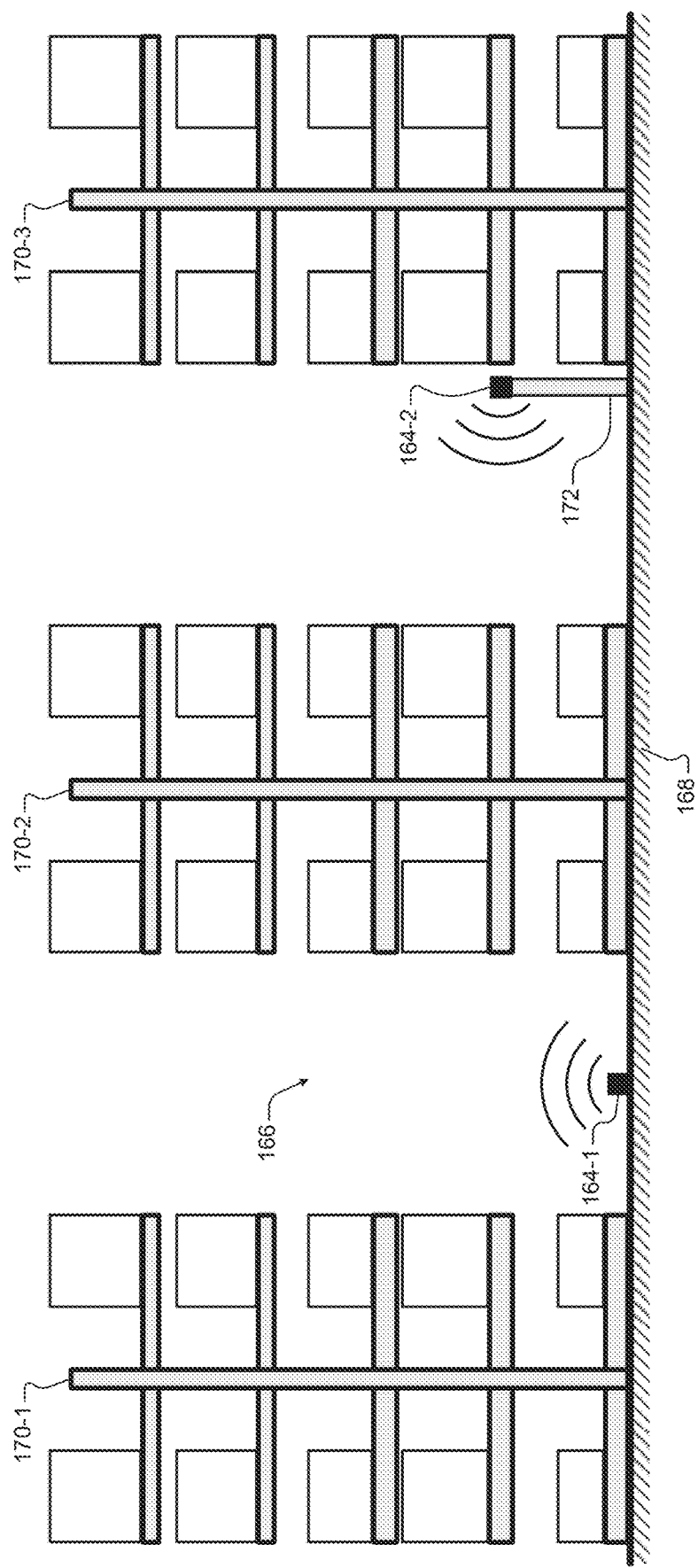

FIG. 8 shows other example arrangements of location indicators. In FIG. 8, location indicator 164-1 is located in aisle 166 on floor 168. Although location indicator 164-1 is illustrated as centrally located in aisle 166, location indicator 164-1 may instead be located nearer to one of racks 170-1, 170-2. Location indicator 164-1 may be attached to the surface of floor 168 in some examples. In other examples, location indicator 164-1 may be embedded in floor 168. For example, location indicator 164-1 may be embedded flush with floor 168 or embedded under floor 168 such that location indicator 164-1 is not visible.

In FIG. 8, location indicator 164-2 is connected to a supporting member 172. Supporting member 172 may rest on floor 168 or be connected to floor 168. Supporting member 172 may be a pole, tripod, or other device configured to hold location indicator 164-2. Accordingly, supporting member 172 may be configured to hold location indicator 164-2 at one end and connect to floor 168, or rest on floor 168, at the other end. Using supporting member 172 to hold location indicator 164-2 may allow placement of location indicator 164-2 in any location within the store, regardless of the location of racks, walls, or other structures in the store that may also be used for mounting location indicator 164-2.

Figure 9:
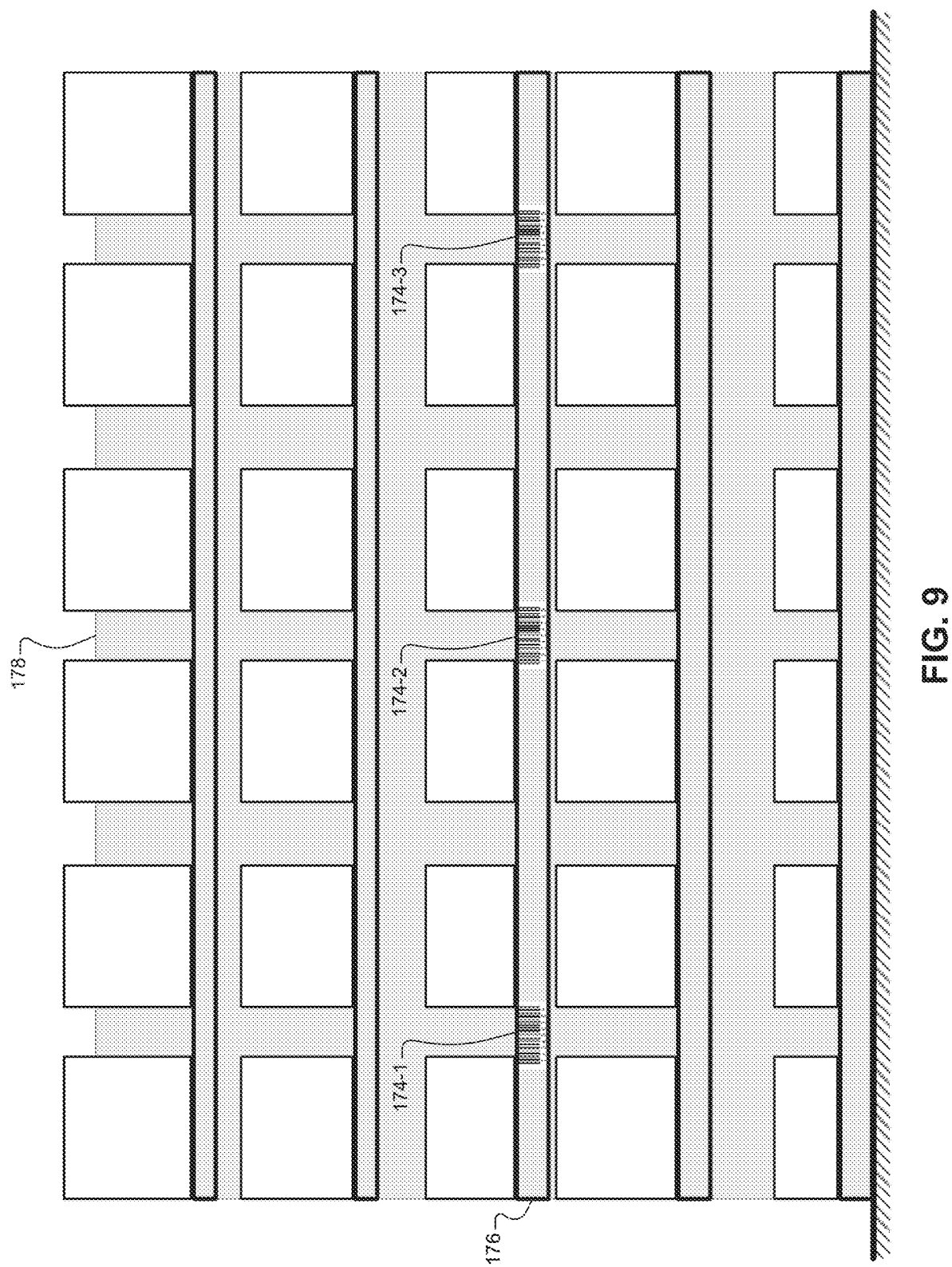

FIG. 9 shows an example arrangement of location indicators that include readable codes (e.g., printed barcodes). In FIG. 9, location indicators 174-1, 174-2, 174-3 are barcodes that are attached to shelf 176 of rack 178. Since location indicators 174-1, 174-2, 174-3 are barcodes, location indicators 174-1, 174-2, 174-3 may not transmit location signals. Instead, as described hereinafter, a user may use a mobile scanning device to scan location indicators 174-1, 174-2, 174-3 using a barcode scanner to determine a current location. Location indicators 174-1, 174-2, 174-3 may include different barcode values that indicate different locations to mobile scanning devices. In some examples, a store may include only location indicators that have readable codes (e.g., barcodes). In other words, in these examples, the store may not include location indicators that transmit location signals. In other examples, a store may not include location indicators with readable codes. Instead, in these examples, the store may include only location indicators that transmit location signals. In still other examples, a store may include both location indicators that have readable codes and location indicators that transmit location signals.

Although location indicators 174-1, 174-2, 174-3 are illustrated as attached to a shelf in FIG. 9, other arrangements of readable location indicators are contemplated. For example, readable location indicators may be attached to lower shelves or higher shelves, the wall of a store, the ceiling of the store, and/or attached to the floor. In general, readable location indicators may be attached in any location in a store that may be read by a mobile scanning device. It is contemplated that a store may include location indicators in any of the locations described with respect to FIGS. 4A-9. Additionally, it is contemplated that a store may include location indicators in other locations which may not be explicitly illustrated in FIGS. 4A-9.

The number of location indicators and the arrangement of location indicators in a store may vary. In some examples, a larger store may include more location indicators to cover the larger area of the store. The density of location indicators (e.g., the number of location indicators per area of the store) may also vary. In some examples, a greater number of location indicators per area of store may create more locations per area of store, which may result in smaller zones (i.e., a higher location resolution).

Example location indicators are described hereinafter with reference to FIGS. 10A-10C. Location indicators may include one or more different technologies for wirelessly transmitting location signals. For example, location indicators 180, 182, 184 of FIGS. 10A-10C may transmit location signals via an antenna, an LED, or an acoustic device. Additionally, location indicators of the present disclosure may encode location signals in a variety of different formats. In general, location indicators may be configured so that each location indicator transmits a different location signal. For example, when location indicators encode location signals using different frequency content, each location indicator may transmit a location signal having different frequency content. Mobile scanning devices may be configured to acquire the different location signals and discriminate between the different location signals.

Location indicators may include a variety of different technologies. FIGS. 10A-10C illustrate some example technologies that may be used in location indicators that transmit location signals. FIG. 10A shows an example location indicator 180 that includes an antenna 186 for transmitting location signal 188. FIG. 10B shows an example location indicator 182 that includes an LED 190 for emitting location signal 192. FIG. 10C shows an example location indicator 184 that includes an acoustic device 194 for emitting location signal 196. Although FIGS. 10A-10C illustrate location indicators 180, 182, 184 using an antenna 186, LED 190, and acoustic device 194, it is contemplated that other types of devices may be used to transmit location signals within a store.

As described hereinafter, mobile scanning devices may include location detection modules (e.g., location detection modules 372, 422 of FIGS. 24-25) that are configured to acquire location signals transmitted by location indicators. For example, when location indicators transmit location signals via an antenna, location detection modules of mobile scanning devices may include antennas configured to receive the transmitted location signals. As an additional example, when location indicators transmit location signals from an LED, location detection modules of mobile scanning devices may include devices configured to detect the transmitted light (e.g., an LED, or other light detection circuit). In still other examples, when location indicators transmit location signals from an acoustic device (e.g., sound waves), location detection modules of mobile scanning devices may include devices configured to detect the sound waves (e.g., a sound detection device). Although location indicators may include antennas, light emitting devices, and acoustic devices for transmitting location signals, other types of technologies may be included in location indicators for transmitting location signals. Accordingly, mobile scanning devices may include other types of location detection modules that are configured to detect location signals transmitted by other types of technologies used in location indicators.

In some examples, a single type of location indicator technology may be implemented in a store. For example, all location indicators may include light emitting devices (e.g., LEDs) and all mobile scanning devices may include light detection devices for detecting location signals. As an additional example, all location indicators may include an antenna for transmitting location signals and all mobile scanning devices may include antennas for receiving the transmitted location signals. In other examples, different location indicators may include different technologies within the store. For example, some of the location indicators may include light emitting devices, while other ones of the location indicators may include antennas. In still other examples, some of the location indicators may include multiple different technologies. For example, a location indicator may include both an antenna and a light emitting device.

Location indicators 180, 182, 184 include indicator control modules 198-1, 198-2, 198-3 that are configured to control operation of location indicators 180, 182, 184. In general, indicator control modules 198-1, 198-2, 198-3 may represent electronic hardware and software/firmware included in location indicators 180, 182, 184 that controls the transmission of location signals 188, 192, 196. Location indicators 180, 182, 184 may also include an indicator power module 200 configured to provide power to location indicators 180, 182, 184. Indicator power module 200 may include a variety of different electronic components that provide power to location indicators 180, 182, 184.

In some examples, location indicators 180, 182, 184 may be powered by mains power systems. In these examples, indicator power module 200 may include a connector to receive mains power (e.g., a three pronged plug or other connector) and power supply electronics for receiving mains power and delivering power to the electronics of location indicators 180, 182, 184 (e.g., indicator control modules 198-1, 198-2, 198-3). In other examples, location indicators 180, 182, 184 may be powered by batteries. In these examples, indicator power module 200 may include sockets for holding batteries and/or connectors for receiving battery power via wires. Additionally, in these examples, indicator power module 200 may include electronics for receiving power from batteries and delivering power to electronics of location indicators 180, 182, 184 (e.g., indicator control modules 198-1, 198-2, 198-3). In other examples, indicator power module 200 may include other power sources such as solar panels or a capacitor used for energy storage. In other examples, location indicators may receive power from mobile scanning devices. For example, a location indicator (e.g., an RFID tag) may include an antenna that receives energy transmitted by a mobile scanning device.

Figure 10A:
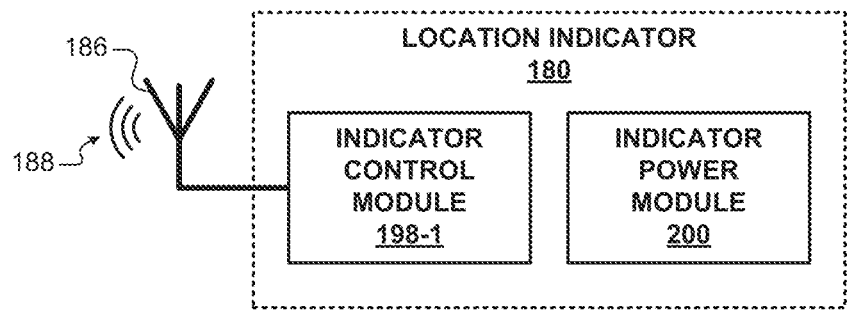
FIGS. 10A-10C show example location indicators that transmit location signals.

FIG. 10A shows an example location indicator 180 that includes an antenna 186. Indicator control module 198-1 may transmit location signal 188 via antenna 186. It is contemplated that antenna 186 may be implemented using a variety of different antenna structures. In some examples, antenna 186 may include a metal wire (e.g., monopole antenna, dipole antenna, a helical antenna, etc.) mounted to a printed circuit board (PCB) of location indicator 180. In other examples, antenna 186 may be included on traces of the PCB of location indicator 180. Although a single antenna is illustrated in FIG. 10A, it is contemplated that location indicators described herein may include more than one antenna in some examples.

As described above, location indicator 180 includes an indicator control module 198-1 (e.g., electronic hardware, firmware, and/or software) configured to transmit location signal 188 via antenna 186. Indicator control module 198-1 may also include memory that includes instructions that, when executed by indicator control module 198-1, cause indicator control module 198-1 to perform various functions attributed to indicator control module 198-1 described herein. Memory of indicator control module 198-1 may store programs and other operating parameters that define properties (e.g., codes, frequency parameters, etc.) of location signal 188.

The components of location indicator 180 may be enclosed in a housing. For example, the housing may enclose a PCB, antenna 186, indicator control module 198-1, and indicator power module 200, along with other components. The housing may have a variety of different form factors, depending on where location indicator 180 is to be located within a store. For example, the housing may be configured for resting or mounting on a shelf or wall, mounting on the floor, mounting on the ceiling, or embedding in the floor.

Location indicator 180 may encode location signal 188 in a variety of different formats. For example, location signal 188 may include one or more frequency components over a range of frequencies from approximately DC frequencies up to GHz frequencies. In some examples, indicator control module 198-1 may be configured to transmit one or more waveforms via antenna 186, such as on/off signals, sine waves, triangle waves, square waves, etc. In some examples, indicator control module 198-1 may be configured to generate carrier signals and modulate the carrier signal using analog modulation techniques (e.g., amplitude modulation) and/or digital modulation techniques (e.g., amplitude-shift keying). In some examples, indicator control module 198-1 may encode digital data (e.g., multiple bits) using modulation techniques.

Mobile scanning devices may be configured to receive location signal 188 (e.g., via an antenna) and differentiate location signal 188 from location signals transmitted by other location indicators. For example, mobile scanning devices may be configured to detect parameters (e.g., frequency content) of location signal 188 and/or the digital data encoded by location signal 188. As described hereinafter, mobile scanning devices may detect location signal 188 and determine a location value based on location signal 188. In some examples, the location values may be unique. In other examples, some location values determined throughout the store may be the same.

Location indicator 180 of FIG. 10A may represent an RFID tag in some examples, e.g., an active RFID tag, a passive RFID tag, or other type of RFID tag. If location indicator 180 is an RFID tag, antenna 186 may represent one or more antennas of the RFID tag that transmit signals to a mobile scanning device and/or wirelessly receives energy from a mobile scanning device. Indicator power module 200 may include circuits that receive energy via an antenna in some examples. In other examples, indicator power module 200 may represent a battery included in the RFID tag. Indicator control module 198-1 may represent circuits that transmit RFID data via antenna 186. For example, indicator control module 198-1 may include an identification number that is transmitted via antenna 186 when the RFID tag is interrogated by a mobile scanning device. In some examples, an RFID tag may include a power source and be configured to transmit location signal 188. In other examples, an RFID tag may be "awoken" by a mobile scanning device and may transmit a location signal in response to being awoken by the mobile scanning device. In examples where RFID tags harvest power from mobile scanning devices, the location indicators may not require mains or battery power.

Figure 10B:
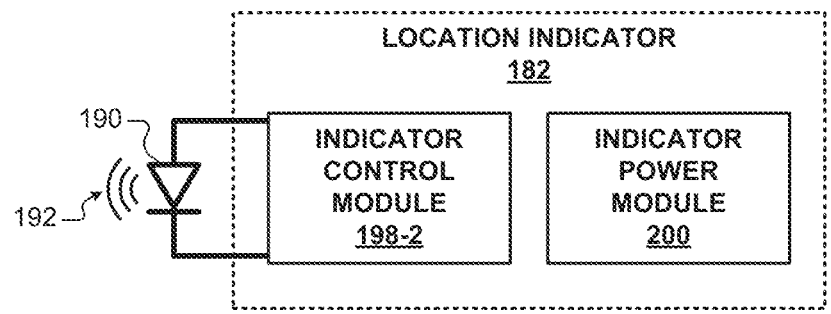

FIG. 10B shows an example location indicator 182 that includes a light emitting device 190 (e.g., one or more LEDs or other photonic devices). Location indicator 182 includes an indicator control module 198-2 (e.g., electronic hardware, software, and/or firmware) configured to transmit location signal 192 via light emitting device 190. Indicator control module 198-2 may also include memory that includes instructions that cause indicator control module 198-2 to perform various functions attributed to indicator control module 198-2 described herein. Memory of indicator control module 198-2 may store programs and other operating parameters that define properties (e.g., codes, frequency parameters, etc.) of location signal 192.

The components of location indicator 182 may be enclosed in a housing. For example, the housing may enclose a PCB, light emitting device 190, indicator control module 198-2, and indicator power module 200, along with other components. The housing may have a variety of different form factors, depending on where location indicator 182 is to be located within a store. For example, the housing may be configured for resting or mounting on a shelf or wall, mounting on the floor, mounting on the ceiling, or embedding in the floor.

Location indicator 182 may encode location signal 182 in a variety of different formats. For example, location signal 192 may include one or more frequency components over a range of frequencies from approximately DC frequencies up to GHz frequencies. In some examples, indicator control module 198-2 may be configured to transmit one or more waveforms via light emitting device 190, such as sine waves, triangle waves, square waves, etc. In some examples, indicator control module 198-2 may be configured to generate carrier signals and modulate the carrier signal using analog modulation techniques (e.g., amplitude modulation) and/or digital modulation techniques (e.g., amplitude-shift keying). In some examples, indicator control module 198-2 may encode digital data (e.g., multiple bits) using modulation techniques.

Mobile scanning devices may be configured to receive location signal 192 (e.g., via a light detection device such as a photodiode, phototransistor, or other device) and differentiate location signal 192 from location signals transmitted by other location indicators. For example, mobile scanning devices may be configured to detect parameters (e.g., frequency content) of location signal 192 and/or the digital data encoded by location signal 192. As described hereinafter, mobile scanning devices may detect location signal 192 and determine a location value based on location signal 192.

Figure 10C:
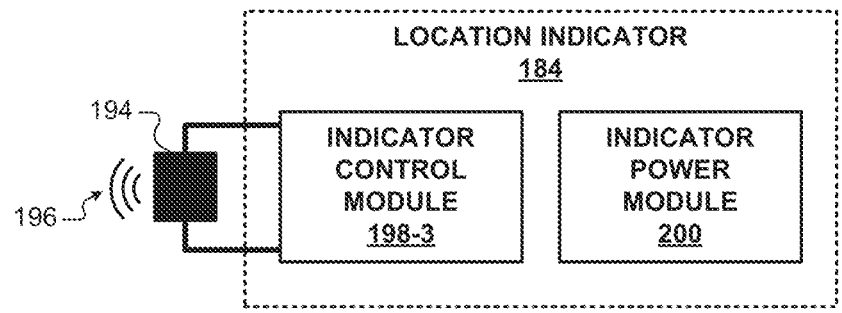

FIG. 10C shows an example location indicator 184 that includes an acoustic device 194 that transmits location signal 196 by transmitting sound waves. Location indicator 184 includes an indicator control module 198-3 (e.g., electronic hardware, software, and/or firmware) configured to transmit location signal 196 via acoustic device 194. Indicator control module 198-3 may also include memory that includes instructions that cause indicator control module 198-3 to perform various functions attributed to indicator control module 198-3 described herein. Memory of indicator control module 198-3 may store programs and other operating parameters that define properties (e.g., codes, frequency parameters, etc.) of location signal 196.

The components of location indicator 184 may be enclosed in a housing. For example, the housing may enclose a PCB, acoustic device 194, indicator control module 198-3, and indicator power module 200, along with other components. The housing may have a variety of different form factors, depending on where location indicator 184 is to be located within a store. For example, the housing may be configured for resting or mounting on a shelf or wall, mounting on the floor, mounting on the ceiling, or embedding in the floor.

Location indicator 184 may encode location signal 196 in a variety of different formats. For example, location signal 196 may include one or more frequency components over a range of frequencies (e.g., audible to inaudible frequencies). In some examples, indicator control module 198-3 may be configured to transmit one or more waveforms via acoustic device 194, such as sine waves, triangle waves, square waves, etc. In some examples, indicator control module 198-3 may be configured to generate carrier signals and modulate the carrier signal using analog modulation techniques (e.g., amplitude modulation) and/or digital modulation techniques (e.g., amplitude-shift keying). In some examples, indicator control module 198-3 may encode digital data (e.g., multiple bits) using modulation techniques.

Mobile scanning devices may be configured to receive location signal 196 (e.g., via an acoustic detection device) and differentiate location signal 196 from location signals transmitted by other location indicators. For example, mobile scanning devices may be configured to detect parameters (e.g., frequency content) of location signal 196 and/or the digital data encoded by location signal 196. As described hereinafter, mobile scanning devices may detect location signal 196 and determine a location value based on location signal 196.

Figure 11A:
FIGS. 11A-11C show different example readable codes which may be used as location indicators.
Figure 11B:
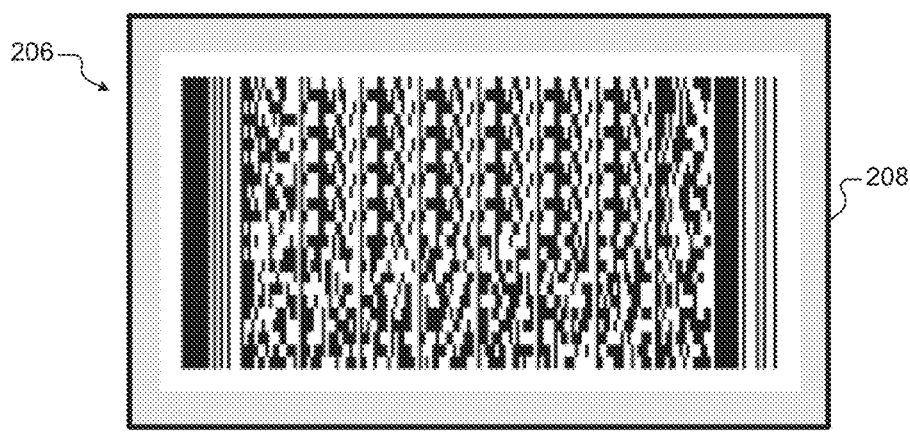
Figure 11C:

In some examples, location indicators may include readable codes. For example, the readable codes may be printed onto objects (e.g., labels) and attached to shelves, walls, the floor, etc. FIGS. 11A-11C show different example readable codes which may be used as location indicators. FIG. 11A shows a location indicator 202 that includes a bar code (e.g., a UPC-A barcode) attached to a label 204. Label 204 may be a paper label including an adhesive for attaching label 204 to shelves, walls, etc. In other examples, label 204 may be a metal tab that may be attached to shelves, walls, etc. FIG. 11B shows a location indicator 206 that includes a different type of readable code (e.g., a PDF417) attached to a label 208. FIG. 11C shows a location indicator 210 that includes a different type of readable code (e.g., a QR code) attached to a label 212.

Readable codes on location indicators (e.g., 202, 206, 210) may encode a variety of different data. For example, the readable codes may represent alphanumeric codes. Different location indicators in a store may have different codes. In examples where location indicators include readable codes, each location indicator within a store may have a different readable code. Mobile scanning devices may scan the readable codes on the location indicators to determine a location within the store. Since each location indicator may have a different readable code, the mobile scanning devices may uniquely identify a location within the store based on the readable code that is scanned from the location indicator.

Mobile scanning devices (e.g., mobile scanning devices 114 of FIG. 1) may be configured to determine a location value based on one or more received location signals (e.g., location signals 128 of FIG. 1) and/or scanned readable codes (e.g., readable codes 174-1, 174-2, 174-3). In general, a location value may refer to any value or plurality of values (e.g., alphanumeric values) determined by a mobile scanning device that indicate a location of the mobile scanning device within, or outside of, a store. The location values determined by the mobile scanning devices may depend on the types of location indicators used in a store. In examples where location indicators transmit location signals, mobile scanning devices may determine a location value based on one or more received location signals. In examples where location indicators include readable codes (e.g., barcodes), mobile scanning devices may scan the readable codes and determine a location value based on the scanned readable codes.

As describe above, a location value may refer to any value or plurality of values that indicate a location of the mobile scanning device within, or outside of, a store. In some examples, a mobile scanning device may determine a location value based on a location signal that was transmitted by a location indicator in proximity to the mobile scanning device. In other examples, a mobile scanning device may determine a location value by scanning a location indicator (e.g., a readable code) in proximity to the mobile scanning device. Accordingly, a mobile scanning device may determine a location value in an area of the store in proximity to the location indicator that indicates that location value. In a sense, an area in a store adjacent to a location indicator may be associated with that location indicator and the location value associated with that location indicator. An area of a store (i.e., the floor space) associated with a location value may also be referred to herein as a "zone" of the store.

Figure 12:
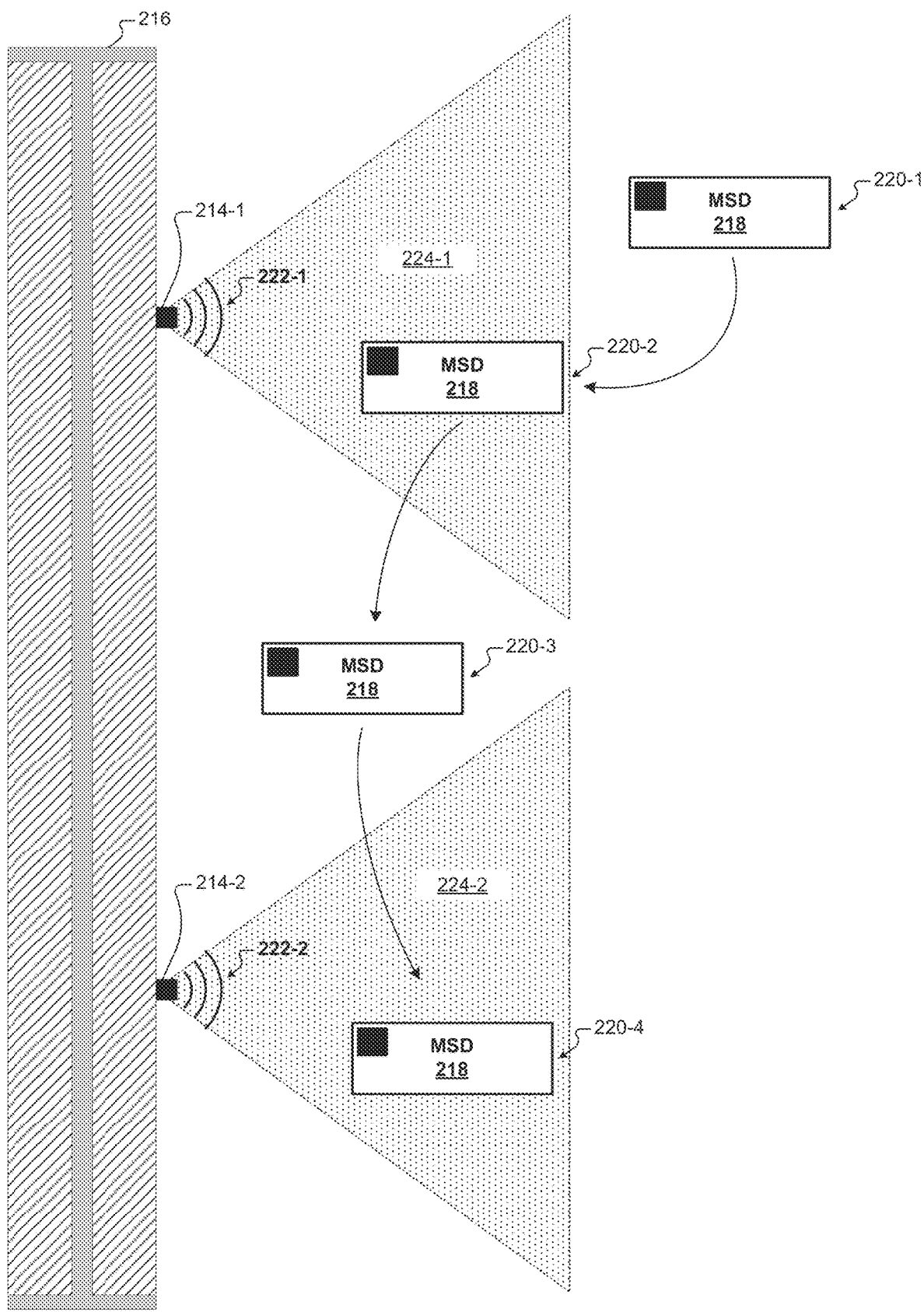
FIGS. 12-18 illustrate example arrangements of location indicators and associated location values that are associated with different areas of a store.

FIGS. 12-18 illustrate example arrangements of location indicators and associated location values that are associated with different areas of a store. Referring now to FIG. 12, location indicators 214-1, 214-2 are connected to rack 216. Mobile scanning device 218 is moved along rack 216. The movement of mobile scanning device 218 is indicated by callouts 220-1, 220-2, 220-3, 220-4. As described hereinafter, mobile scanning device 218 includes a location detection module that is configured to acquire location signals 222-1, 222-2. The location detection module of mobile scanning device 218 is represented as a black box on mobile scanning device 218 in FIG. 12.

Initially, mobile scanning device 218 is located at position 220-1. At position 220-1, mobile scanning device 218 is outside of the range of location signal 222-1. Accordingly, mobile scanning device 218 may not be detecting a location signal at position 220-1. As described herein, an area in which a mobile scanning device does not acquire a location signal may be referred to as a "dead zone." The areas covered by location signals 222-1, 222-2 are illustrated in FIG. 12 as shaded areas (e.g., shaded triangular areas). Mobile scanning devices may acquire location signals within the areas covered by the location signals. In another example, the areas covered by location signals are illustrated as dotted rectangles (e.g., in FIG. 17).

Mobile scanning device 218 is moved from position 220-1 to position 220-2. Mobile scanning device 218 begins acquiring location signal 222-1 as mobile scanning device 218 is moved to position 220-2. Mobile scanning device 218 may determine a location value of 224-1 based on received location signal 222-1. A convention used herein is to assign the same reference numbers for location values and the areas in which mobile scanning devices determine the location values. For example, in FIG. 12, mobile scanning device 218 receives location signal 222-1 and determines a location value 224-1 in area 224-1 (i.e., zone 224-1). Similarly, mobile scanning device 218 receives location signal 222-2 and determines location value 224-2 in area 224-2 (i.e., zone 224-2) in FIG. 12. As an additional example, mobile scanning device 226 receives location signals 230-1, 230-2 and determines location value "232-1+232-2" in area "232-1+232-2" in FIG. 13.

Referring back to FIG. 12, mobile scanning device 218 is moved from position 220-2 to position 220-3. Mobile scanning device 218 does not detect a location signal at position 220-3 (i.e., position 220-3 is a "dead zone"). Accordingly, when moving from position 220-2 to position 220-3, mobile scanning device 218 moves from a position in which a location signal is detected to a position in which location signals are not detected. Mobile scanning device 218 is then moved from position 220-3 to position 220-4. Mobile scanning device 218 acquires location signal 222-2 in position 220-4. Mobile scanning device 218 may determine a location value of 224-2 in area 224-2 based on received location signal 222-2.

Figure 13:
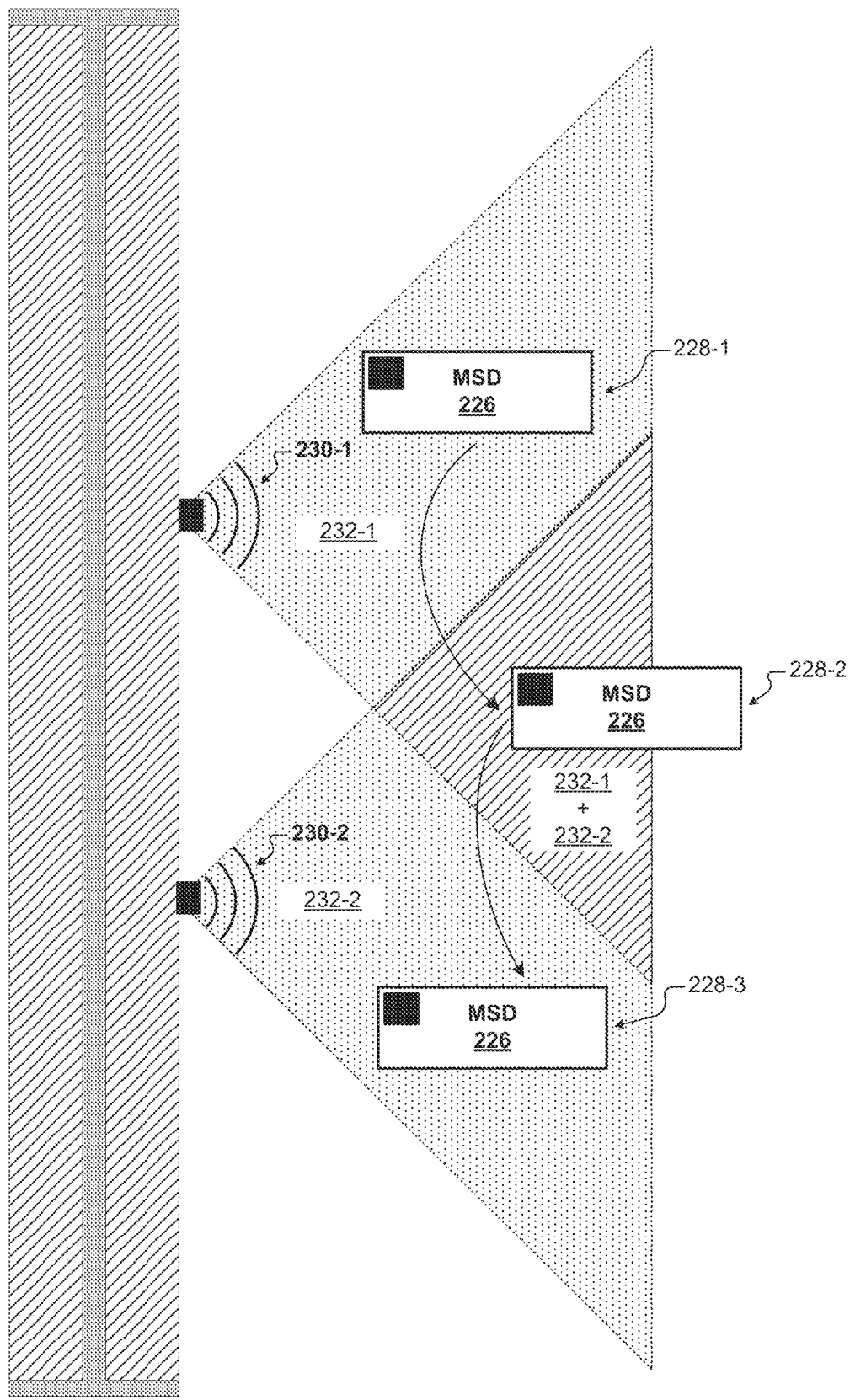

FIG. 13 shows an example in which a mobile scanning device is moved through a portion of a store in which location signals overlap in some regions. Initially, mobile scanning device 226 is located at position 228-1. Mobile scanning device 226 detects location signal 230-1 at position 228-1. Mobile scanning device 226 may determine a location value of 232-1 in area 232-1 based on detected location signal 230-1. Mobile scanning device 226 is then moved from position 228-1 to position 228-2. When moving from position 228-1 to position 228-2, mobile scanning device 226 moves from a position in which a single location signal is detected to a position in which multiple location signals are detected.

Location signal 230-1 overlaps with location signal 230-2 at position 228-2 (as indicated by the triangular hashed region). Put another way, location signals 230-1, 230-2 cover the same area such that mobile scanning device 226 may detect multiple location signals at position 228-2. In areas where mobile scanning devices detect multiple location signals, the location values and the areas are illustrated in the figures and described in the text as a sum of values. For example, at position 228-2, mobile scanning device 226 may detect location signals 230-1, 230-2 and determine a location value of "232-1+232-2" in area "232-1+232-2" based on detected location signals 230-1, 230-2. Mobile scanning device 226 is then moved from position 228-2 to position 228-3. Mobile scanning device 226 acquires location signal 230-2 in position 228-3. Mobile scanning device 226 may determine a location value of 232-2 in area 232-2 based on received location signal 230-2.

Figure 14:
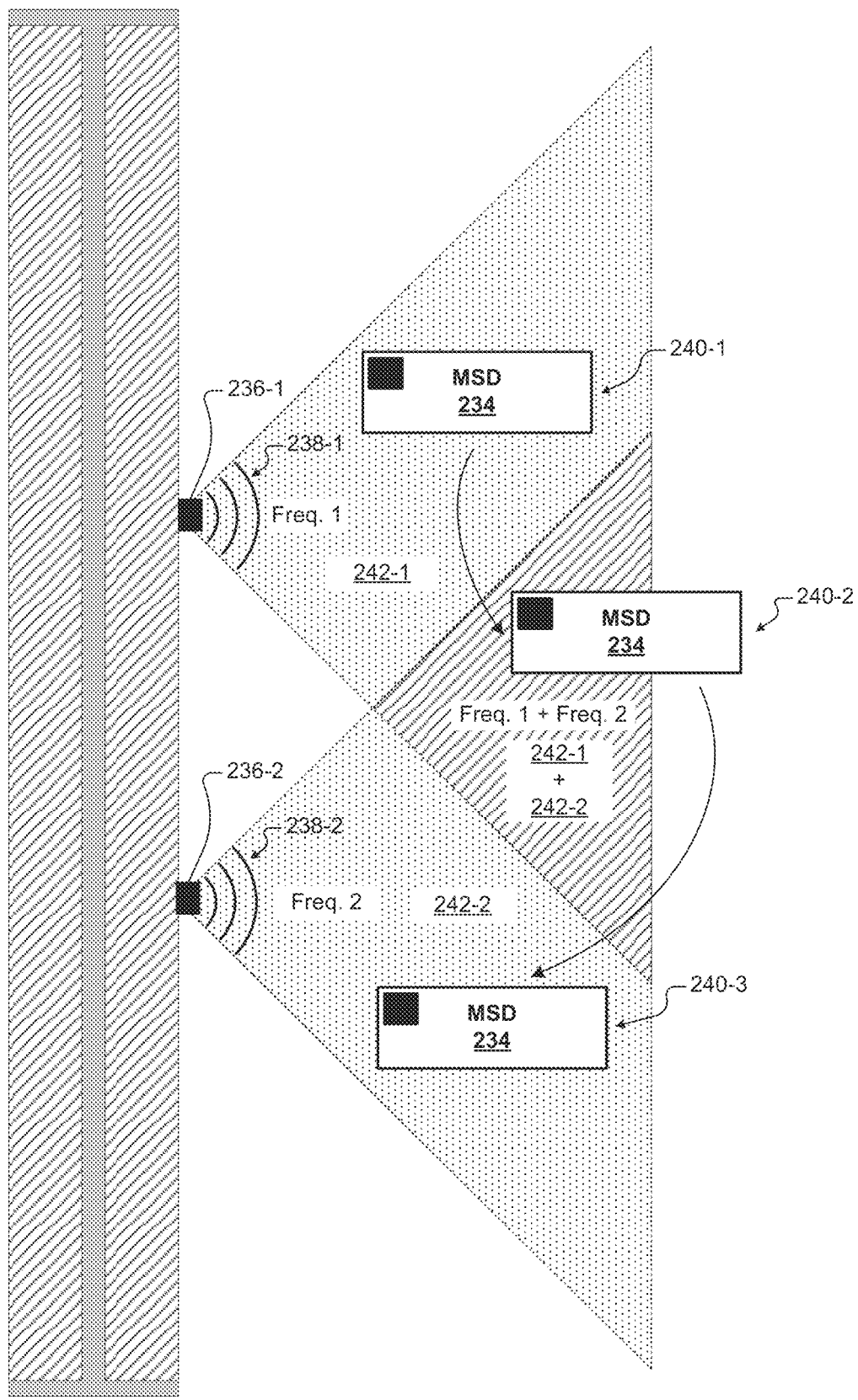

FIG. 14 shows an example in which a mobile scanning device 234 is moved through a portion of a store in which location indicators 236-1, 236-2 transmit location signals 238-1, 238-2 having different frequency content. For example, location indicator 236-1 may transmit a location signal 238-1 having a first frequency component ("Freq. 1" in FIG. 14) that is different from a frequency component included in location signal 238-2. Similarly, location indicator 236-2 may transmit a location signal 238-2 having a second frequency component ("Freq. 2" in FIG. 14) that is different from a frequency component included in location signal 238-1.

In one example, location signal 238-1 and location signal 238-2 may be sine wave signals having first and second frequencies, respectively. In this example, the first frequency may be different than the second frequency. For example, location signal 238-1 may be a sine wave having a frequency of 1 kHz and location signal 238-2 may be a sine wave having a frequency of 2 kHz. Mobile scanning device 238 may detect the different frequencies and differentiate between location signals 238-1, 238-2 based on the different frequencies. In examples where a store includes an additional plurality of location indicators, each of the location indicators may transmit sine waves having different frequencies. In these examples, mobile scanning device 234 be configured to detect the different frequencies and differentiate between the different frequencies of sine waves transmitted by the additional location indicators.

Initially, mobile scanning device 234 is located at position 240-1. Mobile scanning device 234 detects location signal 238-1 having a first frequency component at position 240-1. Mobile scanning device 234 may determine a location value of 242-1 in area 242-1 based on detected location signal 238-1 having the first frequency component. Mobile scanning device 234 is then moved from position 240-1 to position 240-2. When moving from position 240-1 to position 240-2, mobile scanning device 234 moves from a position in which only a first frequency component is detected to a position in which first and second frequency components are detected.

Location signal 238-1 overlaps with location signal 238-2 at position 240-2 such that mobile scanning device 234 may detect first and second frequency components at position 240-2. Accordingly, at position 240-2, mobile scanning device 234 may detect first and second frequency components of location signals 238-1, 238-2 and determine a location value of "242-1+242-2" in area "242-1+242-2" based on the detected frequency components of location signals 238-1, 238-2. Mobile scanning device 234 is then moved from position 240-2 to position 240-3. Mobile scanning device 234 acquires the second frequency component of location signal 238-2 in position 240-3, but may not detect the first frequency component of location signal 238-1. Accordingly, mobile scanning device 234 may determine a location value of 242-2 in area 242-2 based on the detected second frequency component of location signal 238-2.

Figure 15:
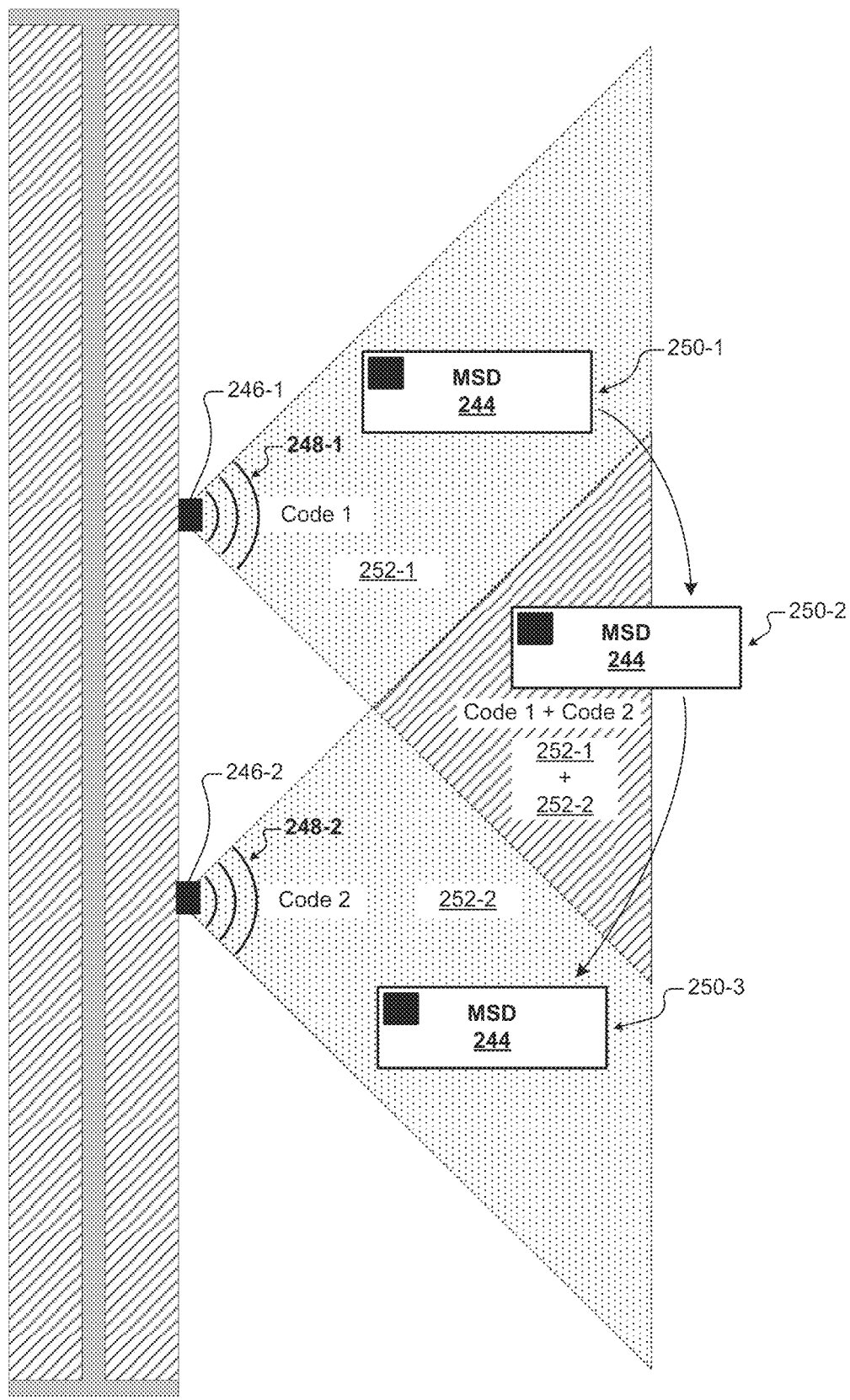

FIG. 15 shows an example in which a mobile scanning device 244 is moved through a portion of a store in which location indicators 246-1, 246-2 transmit location signals 248-1, 248-2 including different coded values. For example, location indicator 246-1 may transmit a location signal 248-1 including a first code ("Code 1" in FIG. 15) that is different from a second code included in location signal 248-2. Similarly, location indicator 246-2 may transmit a location signal 248-2 having a second code ("Code 2" in FIG. 15) that is different from the first code included in location signal 248-1. The codes transmitted by location indicators 246-1, 246-2 may be digital codes (e.g., alphanumeric codes) in some examples.

Mobile scanning device 244 may detect the different codes and differentiate between location signals 248-1, 248-2 based on the different codes. In examples where a store includes an additional plurality of location indicators, each of the location indicators may transmit different codes. In these examples, mobile scanning device 244 may be configured to detect the different codes and differentiate between the different codes transmitted by the additional location indicators.

Initially, mobile scanning device 244 is located at position 250-1. Mobile scanning device 244 detects location signal 248-1 including a first code at position 250-1. Mobile scanning device 244 may determine a location value of 252-1 in area 252-1 based on detected location signal 248-1 having the first code. Mobile scanning device 244 is then moved from position 250-1 to position 250-2. When moving from position 250-1 to position 250-2, mobile scanning device 244 moves from a position in which only the first code is detected to a position in which first and second codes are detected.

Location signal 248-1 overlaps with location signal 248-2 at position 250-2 such that mobile scanning device 244 may detect first and second codes at position 250-2. Accordingly, at position 250-2, mobile scanning device 244 may detect first and second codes and determine a location value of "252-1+252-2" in area "252-1+252-2" based on the detected codes of location signals 248-1, 248-2. Mobile scanning device 244 is then moved from position 250-2 to position 250-3. Mobile scanning device 244 acquires the second code in position 250-3, but may not detect the first code. Accordingly, mobile scanning device 244 may determine a location value of 252-2 in area 252-2 based on the detected second code.

As described herein, location values may be associated with stocked items. For example, each stocked item in the store may be associated with a location value. Each location value may be associated with multiple different stocked items. In general, a stocked item may be associated with a location value that may be determined by a mobile scanning device in proximity to that stocked item. In the case where a first location indicator generates a first location signal including a first location value, items in proximity to the first location signal may be associated with the first location value. In the case where a first location indicator includes a first readable code including a first location value, items in proximity to the first location indicator including the readable code may be associated with the first location value. The associations between location values and items may be generated manually by a user in some examples. In other examples, the associations between location values and items may be generated automatically (e.g., by one or more mobile scanning devices and/or the central computing system). The associations between location values and stocked items may be stored in one or more mobile scanning devices and/or the central computing system.

Figure 16:
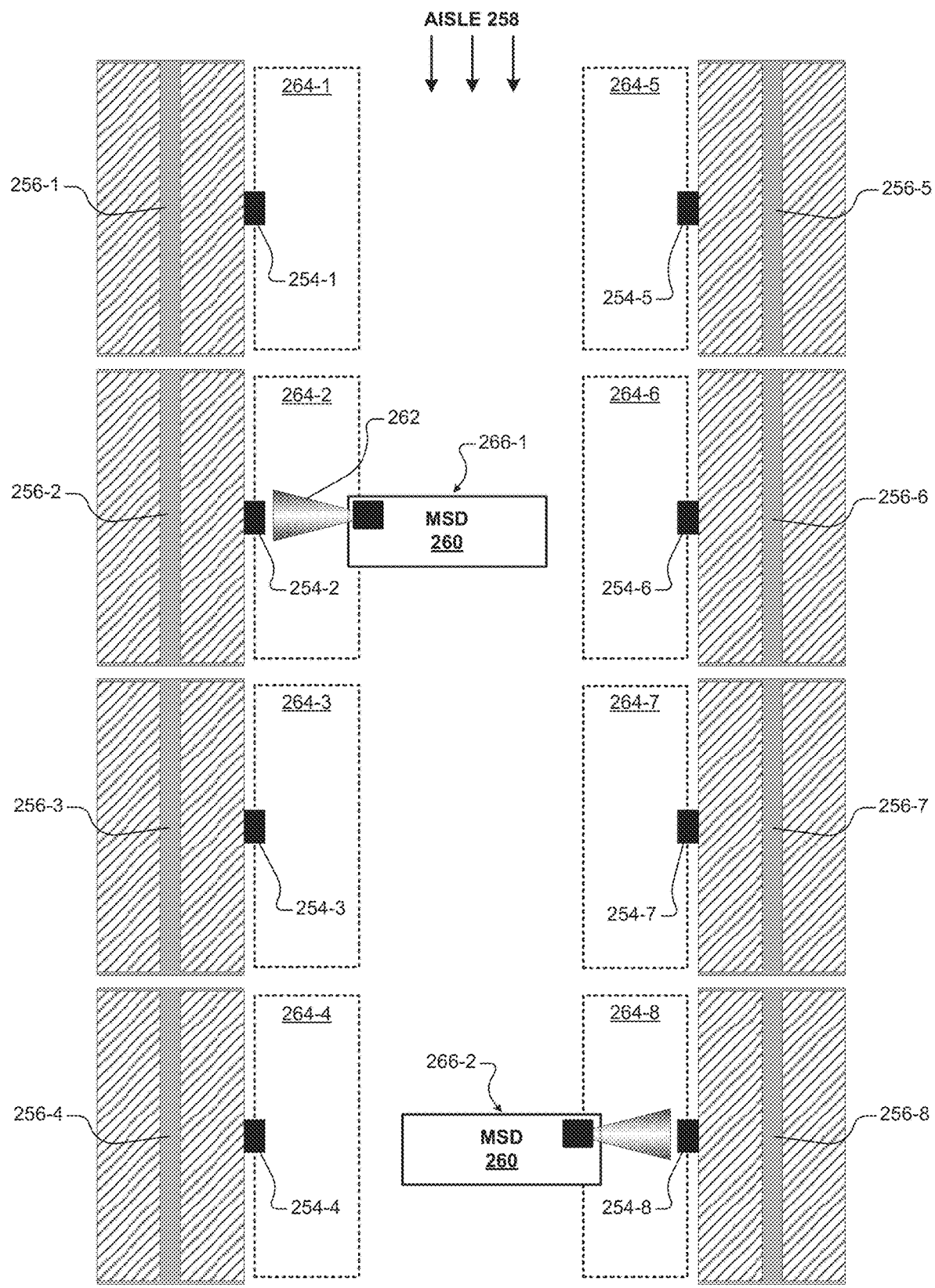

FIG. 16 illustrates example arrangements of location indicators and associated location values that are associated with different areas of a store. Location indicators 254-1, 254-2, ..., 254-8 (hereinafter "location indicators 254") may include readable codes. For example, location indicators 254 may be readable codes printed onto objects (e.g., labels) and attached to racks 256-1, 256-2, ..., 256-8 along aisle 258. The readable codes may represent a variety of different data, such as alphanumeric codes.

Mobile scanning device 260 may scan readable codes on location indicators 254 to determine location values associated with location indicators 254. As described hereinafter, mobile scanning device 260 includes a location detection module (e.g., location detection module 422 of FIG. 25) that is configured to scan readable codes of location indicators 254. Scanning by mobile scanning device 260 is illustrated as a shaded cone 262. Each of location indicators 254 may have different readable codes such that mobile scanning device 260 determines different location values for each of location indicators 254. Since each of location indicators 254 may have a different readable codes, mobile scanning device 260 may uniquely identify a location within the store based on the readable code that is scanned from the location indicator.

The area of the store associated with a location value of a readable code may be the area of the store in proximity to the readable code. For example, in FIG. 16, each of racks 256 includes a single location indicator (i.e., a single location value) that may be associated with the areas in front of racks 256. The areas associated with location indicators 254 are illustrated as dotted rectangles in FIG. 16. In one example, mobile scanning device 260 may scan location indicator 254-1 to determine location value 264-1 for area 264-1. Similarly, mobile scanning device 260 may scan location indicator 254-7 to determine location value 264-7 for area 264-7.

Initially, mobile scanning device 260 is located at position 266-1. At position 266-1, mobile scanning device 260 scans location indicator 254-2 and determines location value 264-2 in area 264-2. Mobile scanning device 260 is moved from position 266-1 to position 266-2. At position 266-2, mobile scanning device 260 scans location indicator 254-8 and determines location value 264-8 in area 264-8. As described hereinafter, location value 264-2 may be associated with items on rack 256-2 that may be accessible in area 264-2. Similarly, location value 264-8 may be associated with items on rack 256-8 that may be accessible in area 264-8.

Figure 17:
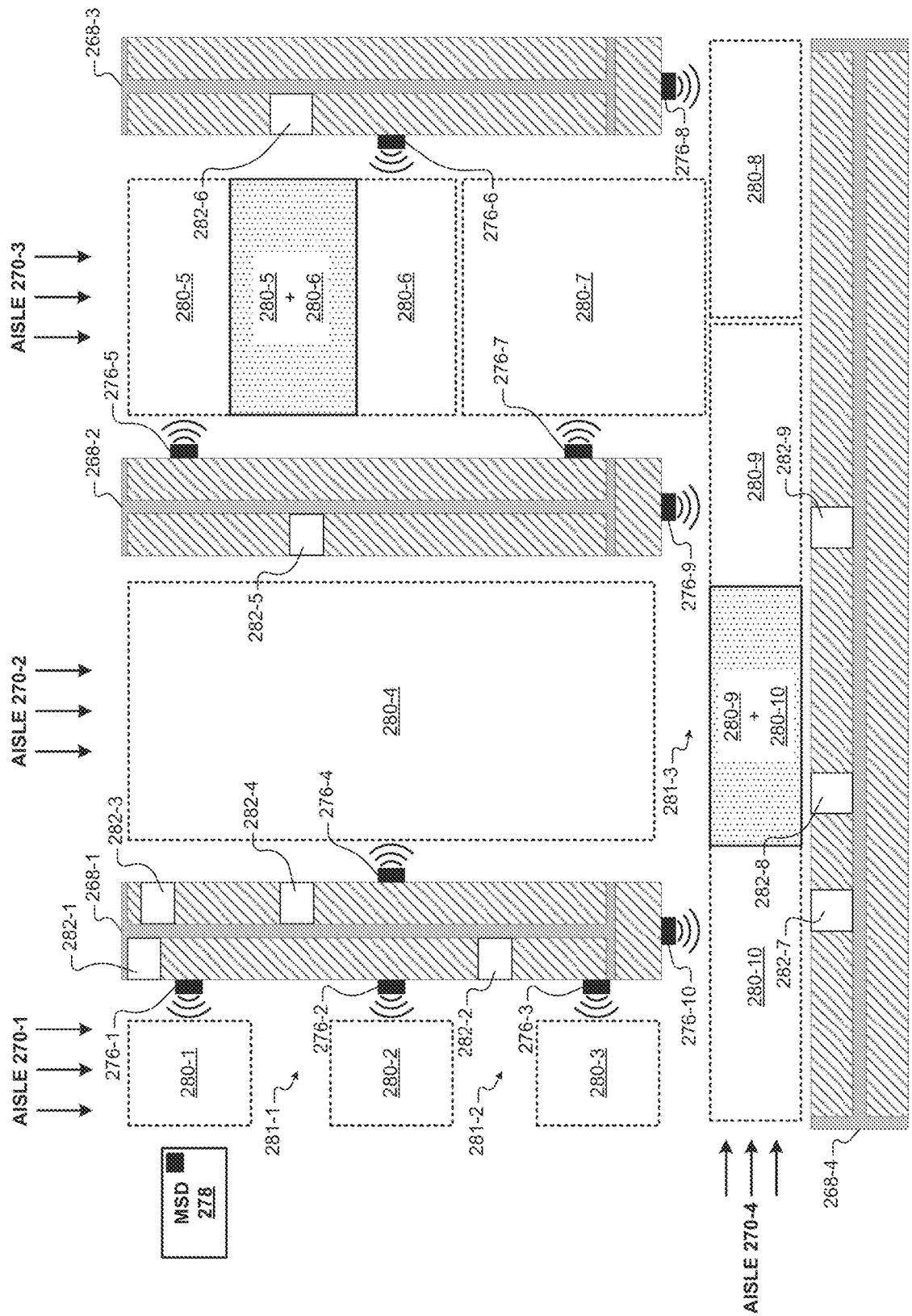
Figure 18:
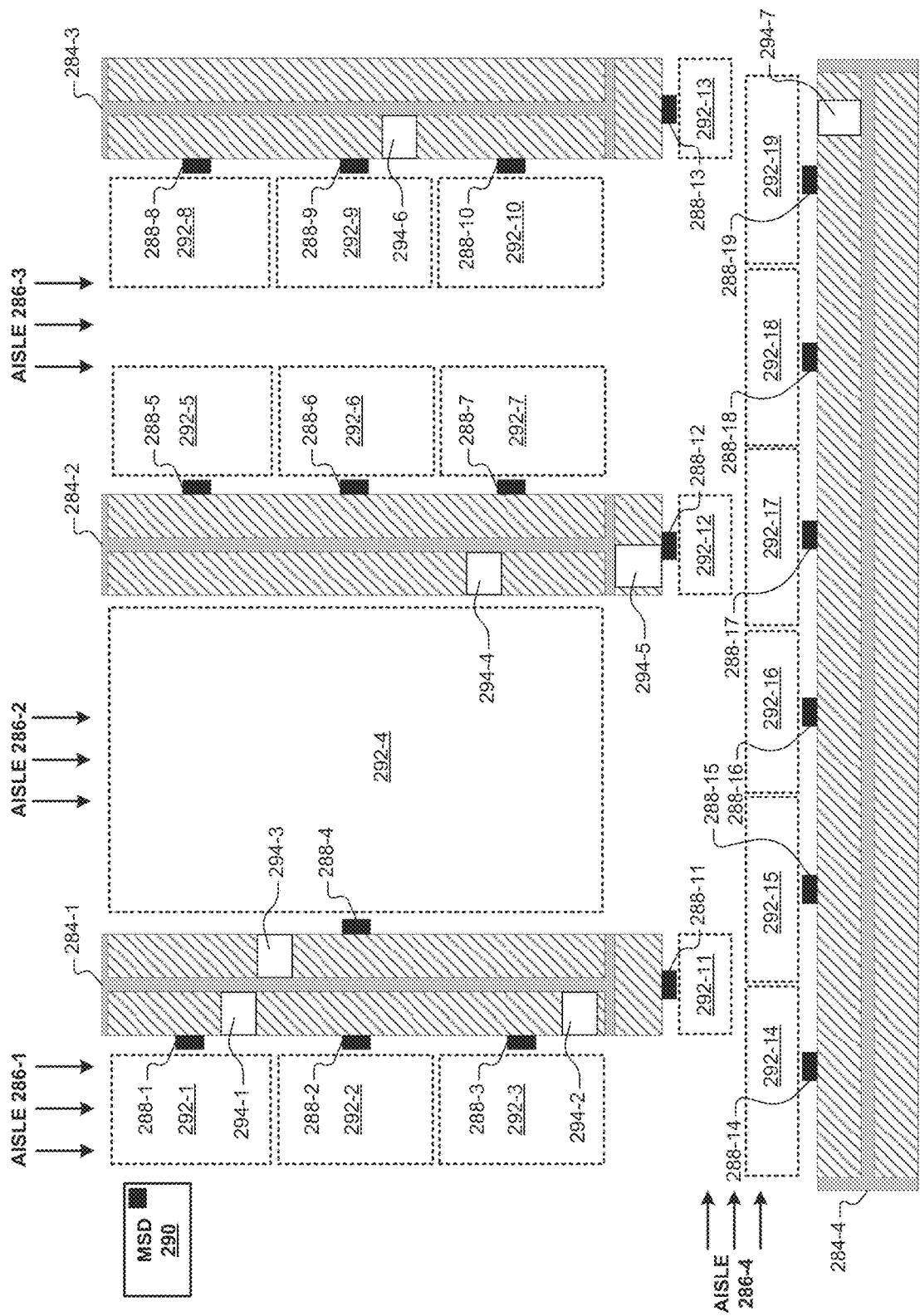

FIGS. 17-18 show example store layouts including a variety of location indicators and items. As described herein, items may be associated with location values. For example, the central computing system, mobile scanning devices, and/or other computing devices may store associations between items and location values. In general, when the mobile scanning device determines a location value, items associated with that location value may be in proximity to the mobile scanning device. Put another way, an item may be associated with a location value that would be determined by a mobile scanning device in proximity to that item. In some examples, the associations between the items and the location values may be entered manually by a user. In other examples, the associations between the items and the location values may be automatically generated.

FIG. 17 shows a store layout including four racks 268-1, 268-2, 268-3, 268-4 (collectively "racks 268") that define four aisles 270-1, 270-2, 270-3, 270-4 (collectively "aisles 274"). The store of FIG. 17 includes location indicators 276-1, 276-2, ..., 276-10 (collectively "location indicators 276") that transmit location signals. Mobile scanning device 278 may determine location values 280-1, 280-2, ...,

280-10, "280-5+280-6", "280-9+280-10" (collectively "location values 280") based on detected location signals. The areas covered by location signals are illustrated in FIG. 17 as dotted rectangles. Areas in which multiple location signals are detected are illustrated as shaded rectangles in FIG. 17. The store of FIG. 17 also includes dead zones 281-1, 281-2, 281-3.

The store of FIG. 17 includes items 282-1, 282-2, . . . , 282-9 (collectively "items 282"). Items 282 are associated with location values 280 (i.e., areas) of the store. The associations between items 282 and location values 280 may be stored in the central computing system, one or more mobile scanning devices, and/or other computing devices. In general, items are associated with location signals (i.e., areas) in proximity to the items. For example, item 282-1 may be associated with location value 280-1. Items 282-3, 282-4, 282-5 may be associated with location value 280-4. Item 282-6 may be associated with location value "280-5+280-6". Item 282-7 and item 282-9 may be associated with location value 280-10 and location value 280-9, respectively. Item 282-8 may be associated with location value "280-9+280-10".

In FIG. 17, it may be assumed that mobile scanning device 278 has received a customer order including items 282. As described hereinafter in greater detail, mobile scanning device 278 may include a display that displays some, or all, of items 282 to a user. Mobile scanning device 278 may arrange the displayed items based on which of location signals are detected. In general, mobile scanning device 278 may arrange the displayed items such that the items in proximity to mobile scanning device 278 (i.e., in proximity to the user) are viewable by the user on the display. In one example, mobile scanning device 278 may arrange items on the display such that those items in proximity to the user are more prominently displayed than those items that are farther away from mobile scanning device 278. For example, mobile scanning device 278 may display items in the current area at the top of the display. Additionally, or alternatively, mobile scanning device 278 may display the items in bold and/or colored text to indicate those items that are in proximity to the user. Displaying of items based on the currently determined location value is described hereinafter in greater detail.

FIG. 18 shows a store layout including four racks 284-1, 284-2, 284-3, 284-4 (collectively "racks 284") that define four aisles 286-1, 286-2, 286-3, 286-4 (collectively "aisles 286"). The store of FIG. 18 includes location indicators 288-1, 288-2, . . . , 288-19 (collectively "location indicators 288") that include readable codes. Mobile scanning device 290 may scan location indicators 288 to determine location values 292-1, 292-2, . . . , 292-19 in areas 292-1, 292-2, . . . , 292-19 (collectively "areas 292"). Areas 292 in proximity to location indicators 288 are illustrated as dotted rectangles. For example, mobile scanning device 290 may scan location indicator 288-1 to determine location value 292-1 for area 292-1. Similarly, mobile scanning device 290 may scan location indicator 288-19 to determine location value 292-19 for area 292-19.

The store of FIG. 18 includes items 294-1, 294-2, . . . , 294-7 (collectively "items 294"). Items 294 are associated with location values 292 (i.e., areas) of the store. The associations between items 294 and location values 292 may be stored in the central computing system, one or more mobile scanning devices, and/or other computing devices. In general, items are associated with location values (i.e., areas) in proximity to the items. For example, item 294-1 and item 294-2 may be associated with location value 292-1 and location value 292-3, respectively. Similarly, items 294-3, 294-4 may be associated with location value 292-4. As another example, item 294-5 may be associated with location value 292-12.

In FIG. 18, it may be assumed that mobile scanning device 290 has received a customer order including items 294. As described hereinafter in greater detail, mobile scanning device 290 may include a display that displays some, or all, of items 294 to a user. Mobile scanning device 290 may arrange the displayed items based on which of location values 292 are determined. In general, mobile scanning device 290 may arrange the displayed items such that the items in proximity to mobile scanning device 290 (i.e., in proximity to the user) are viewable by the user on the display. In one example, mobile scanning device 290 may arrange items on the display such that those items in proximity to the user are more prominently displayed than those items that are farther away from mobile scanning device 290. For example, mobile scanning device 290 may display items in the current area at the top of the display. Additionally, or alternatively, mobile scanning device 290 may display the items in bold and/or colored text to indicate those items that are in proximity to the user.

One or more computing devices may store a location map that defines the spatial relationships between different areas of the store. For example, a location map may define the relative distances between different areas of the store. In some examples, two areas may be adjacent to one another. For example, the two areas may be touching one another. In other examples, two areas may not be adjacent to one another. Instead, one or more additional areas may be located between the two areas.

Example location maps are illustrated and described with respect to FIGS. 19A-22B. Location maps are graphically represented herein using boxes to represent different areas in the store. The boxes are connected to one another using one or more junctions (e.g., 308-1, 308-2 of FIG. 19B). The areas that are adjacent to one another may be connected using a single junction. For example, in FIG. 19B, area 304-1 is connected to area 304-2 by junction 308-1. Areas that are separated from one another (e.g., by another junction) may be connected via one or more junctions. For example, area 304-1 is connected to area 304-3 via junction 308-1 and junction 308-2 in FIG. 19B because area 304-2 is located between area 304-1 and area 304-3 in FIG. 19A. Location maps may be generated manually by a user in some examples. In other examples, the location maps may be generated automatically (e.g., by one or more mobile scanning devices and/or the central computing system). The location maps may be stored in one or more mobile scanning devices and/or the central computing system.

In general, location maps may define the spatial relationships between different areas of the store. In examples where location indicators transmit location signals, the location map may define how the areas of the store covered by the location signals are arranged relative to one another. For example, the location map may define the distances between the areas of the store covered by the location signals. In examples where the location indicators include readable codes, the location map may define the location of each of the location indicators (i.e., readable codes) relative to one another. For example, the location map may define the distances between different readable codes.

Since items may be associated with location values, and the location map may indicate the distance between areas in which the location values are determined by a mobile scanning device, a mobile scanning device may determine the distance between items using the location map. After a mobile scanning device determines the distance between ordered items using the location map, the mobile scanning device may arrange the items on the display based on the distance of each of the items from the current location of the mobile scanning device (i.e., the user).

Figure 19A:
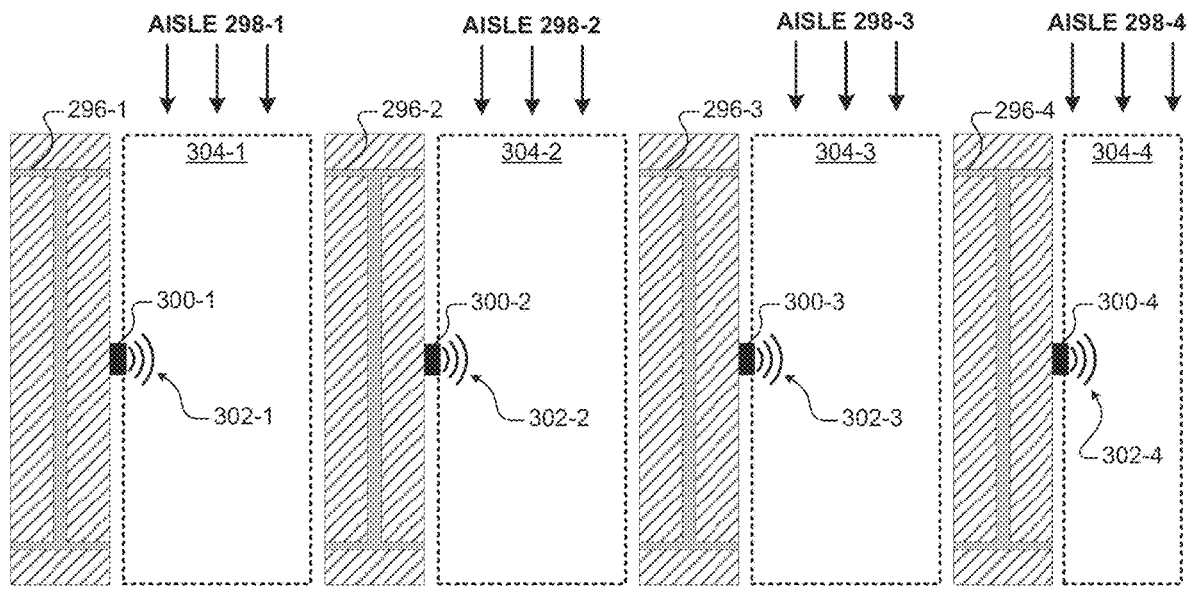
FIGS. 19A-22B show example stores and associated location maps.
Figure 19B:
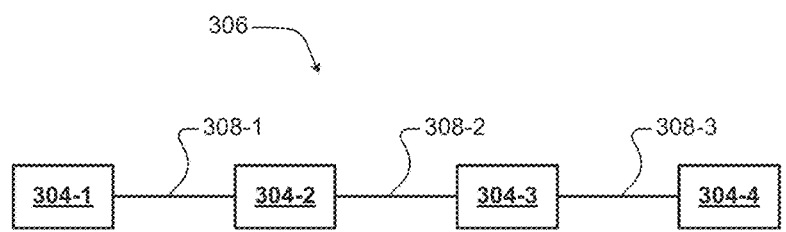

Referring now to FIGS. 19A-19B, the store of FIG. 19A includes four racks 296-1, 296-2, 296-3, 296-4 (collectively "racks 296") that define four aisles 298-1, 298-2, 298-3, 298-4 (collectively "aisles 298"). The store of FIG. 19A includes location indicators 300-1, 300-2, 300-3, 300-4 (collectively "location indicators 300") that transmit location signals 302-1, 302-2, 302-3, 302-4 (collectively "location signals 302"). A mobile scanning device may determine location values 304-1, 304-2, 304-3, 304-4 based on detected location signals 302-1, 302-2, 302-3, 302-4, respectively. Areas 304-1, 304-2, 304-3, 304-4 (collectively "areas 304") covered by location signals 302 are illustrated in FIG. 19A as dotted rectangles.

In FIG. 19A, area 304-1 is adjacent to area 304-2. Area 304-2 is adjacent to area 304-1 and area 304-3. Area 304-3 is adjacent to area 304-2 and area 304-4. Area 304-4 is adjacent to area 304-3. Location map 306 of FIG. 19B may represent the relative distances between areas 304. For example, area 304-1 is connected to area 304-2 by a single junction 308-1 to represent that area 304-1 is adjacent to area 304-2. Similarly, area 304-2 is connected to area 304-3 by a single junction 308-2 to represent that area 304-2 is adjacent to area 304-3. Area 304-1 and area 304-4 are the areas of FIG. 19A that are farthest apart. The distance between area 304-1 and area 304-4 may be represented by the three junctions 308-1, 308-2, 308-3 that separate area 304-1 and area 304-4 in location map 306.

Figure 20A:
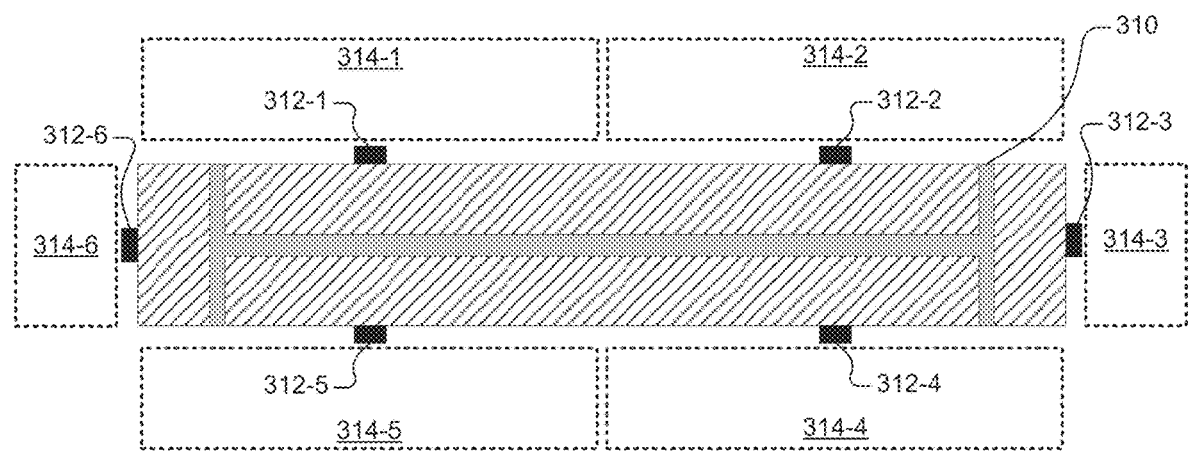
Figure 20B:
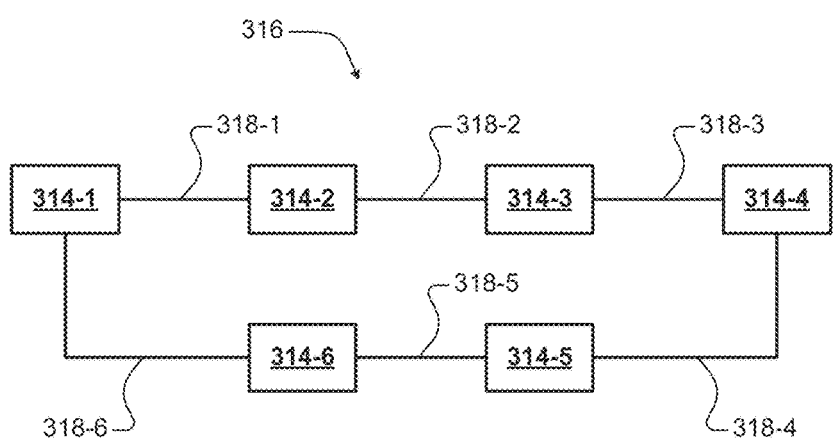

FIGS. 20A-20B show another example location indicator layout. FIG. 20A includes rack 310 that may be accessed from all sides. Rack 310 includes location indicators 312-1, 312-2, . . . , 312-6 (collectively "location indicators 312") having readable codes. A mobile scanning device may scan location indicators 312 to determine location values 314-1, 314-2, . . . , 314-6. Areas 314-1, 314-2, . . . , 314-6 (collectively "areas 314") surround rack 310 such that the location indicator layout in FIG. 20A results in a location map 316 in which each of areas 314 are adjacent to two other areas.

Junctions 318-1, 318-2, . . . , 318-6 may represent the relative distances between areas 314. For example, area 314-1 is connected to area 314-2 by a single junction 318-1 to represent that area 314-1 is adjacent to area 314-2. Similarly, area 314-2 is connected to area 314-3 by a single junction 318-2 to represent that area 314-2 is adjacent to area 314-3. The distance between area 314-1 and area 314-4, which are not adjacent, may be represented by the three junctions 318-1, 318-2, 318-3 that separate area 314-1 and area 314-4 in location map 316. Similarly, the distance between area 314-3 and area 314-6 may be represented by the three junctions 318-3, 318-4, 318-5 that separate area 314-3 and area 314-6 in location map 316. Alternatively, a user may travel from area 314-3 to area 314-6 via areas 314-1, 314-2. The distance between area 314-3 and area 314-6 via areas 314-1, 314-2 may be represented by three junctions 318-1, 318-2, 318-6 that separate area 314-3 and area 314-6.

FIGS. 21A-22B illustrate location indicator layouts which are more elaborate than those layouts illustrated in FIGS. 19A-20B. The store of FIG. 21A includes racks 320-1, 320-2. The store of FIG. 21A includes location indicators 322-1, 322-2, . . . , 322-7 (collectively "location indicators 322") that transmit location signals 324-1, 324-2, . . . , 324-7 (collectively "location signals 324"). A mobile scanning device may determine location values 326-1, 326-2, . . . , 326-7 based on detected location signals 324 in areas 326-1, 326-2, . . . , 326-7 (collectively "areas 326").

Figure 21A:
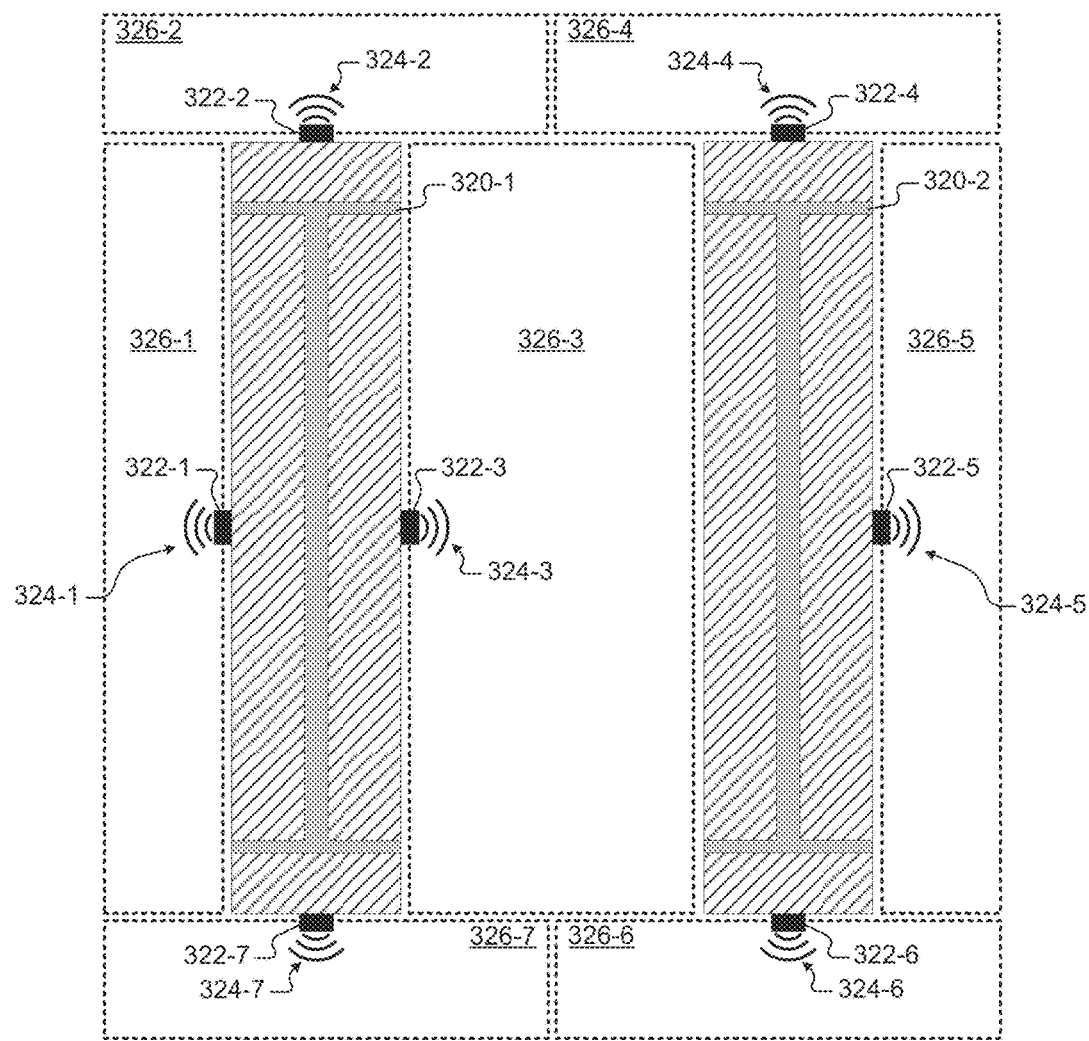
Figure 21B:
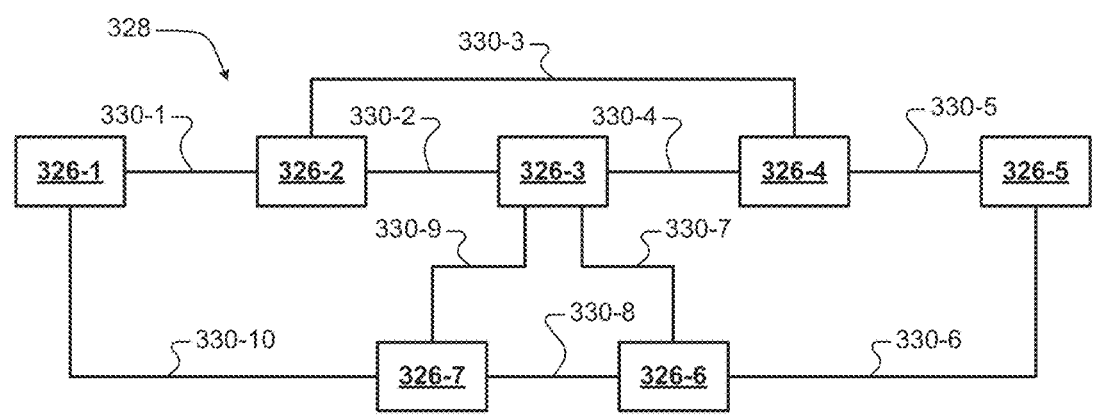

The layout of location indicators in FIG. 21A may be considered to be more elaborate than the layout of location indicators in FIGS. 19A-20B in that the store of FIG. 21A includes a greater number of areas. Furthermore, areas 326 in FIG. 21A may be adjacent to up to four other areas. For example, area 326-3 is adjacent to areas 326-2, 326-4, 326-6, 326-7. Multiple other areas are also adjacent to three other areas. For example, area 326-2 is adjacent to areas 326-1, 326-3, 326-4.

Location map 328 includes junctions 330-1, 330-2, . . . , 330-10 (collectively "junctions 330"). Junctions 330 may represent distances between areas 326. For example, adjacent areas (i.e., those connected by one junction) may be closer to one another than non-adjacent areas. However, since areas 326 are not all of equal size, all of junctions 330 may not represent equal distances. For example, areas 326-1, 326-3, 326-5 are slightly larger than areas 326-2, 326-4, 326-6, 326-7. Therefore, any path through location map 328 including areas 326-1, 326-3, 326-5 may represent a slightly longer distance than paths that do not include areas 326-1, 326-3, 326-5. For example, a path from area 326-6 to area 326-4 via area 326-5 (i.e., via junctions 330-6, 330-5) may represent a slightly greater distance than a path from area 326-5 to area 326-7 via area 326-6 (i.e., via junctions 330-6, 330-8).

As described above with respect to FIGS. 21A-21B, the number of junctions between areas may generally represent the distance between areas. However, in some examples, the distance represented by a junction may vary depending on the amount of area covered by a location indicator. Accordingly, it follows that the arrangement of location indicators and the areas covered by location signals may be adjusted in order to adjust the information conveyed by a location map stored within a computing device. For example, when location indicators are arranged at approximately equal distances from one another, the junctions of a location map may represent approximately equal distances between different areas of the store.

Figure 22A:
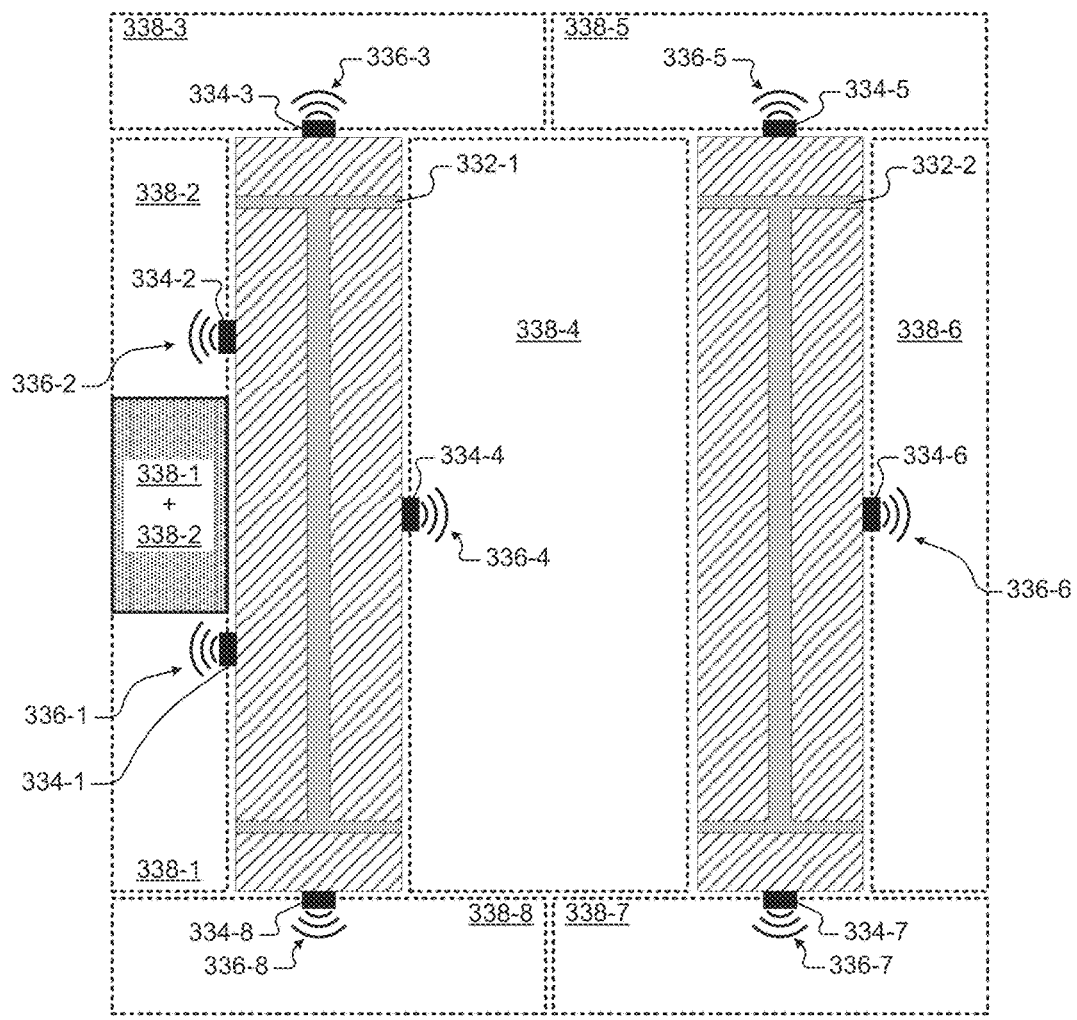
Figure 22B:
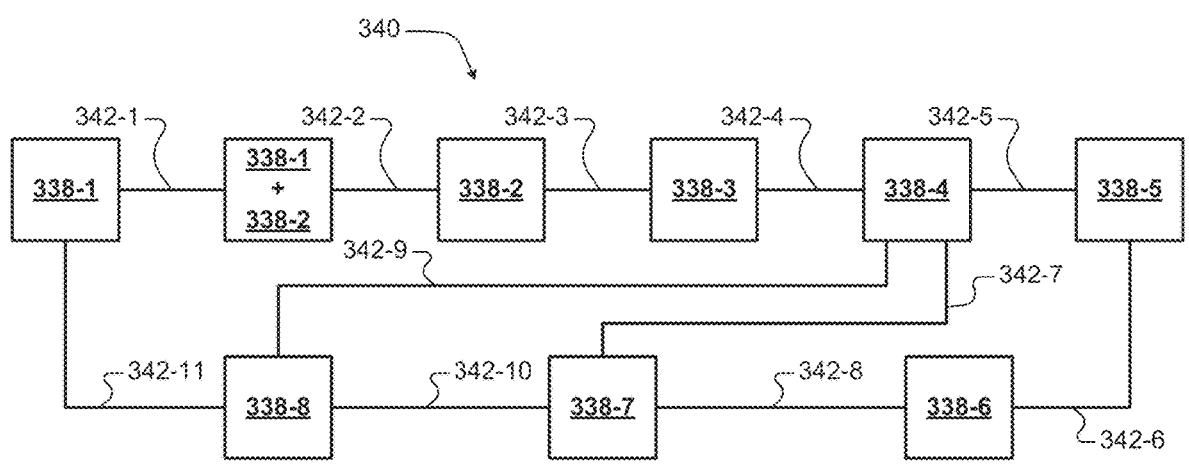

FIGS. 22A-22B illustrate a location indicator layout in which two location signals overlap to form an area of the store in which a mobile scanning device detects multiple location signals. The store of FIG. 22A includes racks 332-1, 332-2. The store of FIG. 22A includes location indicators 334-1, 334-2, . . . , 334-8 (collectively "location indicators 334") that transmit location signals 336-1, 336-2, . . . , 336-8 (collectively "location signals 336"). A mobile scanning device may determine location values 338-1, 338-2, . . . , 338-8, and "338-1+338-2" based on detected location signals 336 in areas 338-1, 338-2, . . . , 338-8, and "338-1+ 338-2" (collectively "areas 338"). Note that location map 340 of FIG. 22B includes an area "338-1+338-2" in which two location signals 336-1, 336-2 are detected by a mobile scanning device. In this example, area "338-1+338-2" is mapped as an area that is adjacent to area 338-1 and area 338-2. Location map 340 includes junctions 342-1, 342-2, . . . , 342-11 (collectively "junctions 342"). Junctions 342 may represent distances between areas 338. Each of junctions 342 may not represent equal distances, as described above with respect to FIGS. 21A-21B.

Figure 23A:
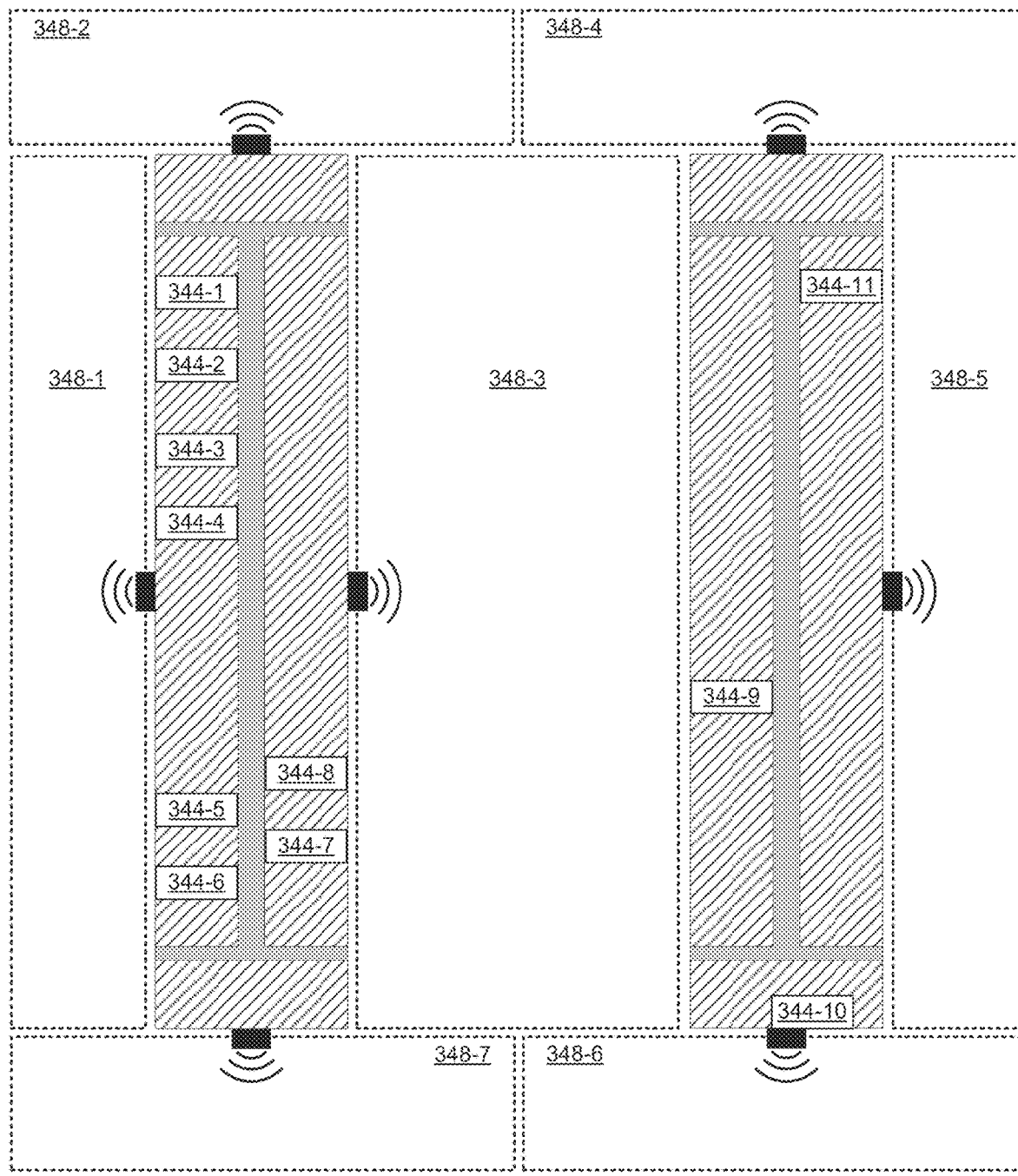
FIGS. 23A-23B show an example store and an associated location map including items.
Figure 23B:
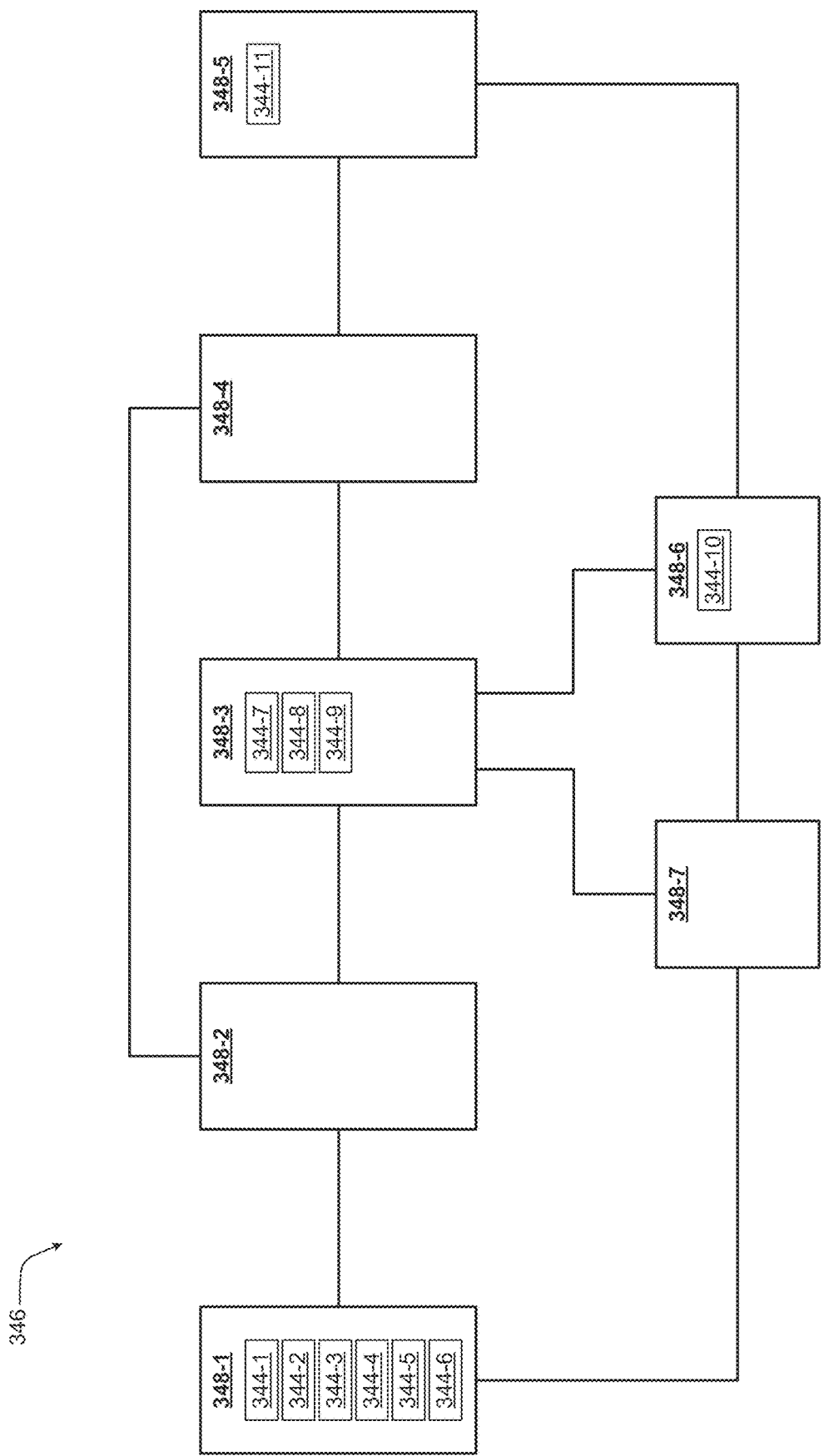

FIG. 23A shows an example store including items 344-1, 344-2, . . . , 344-11 (collectively "items 344"). FIG. 23B shows a location map 346 including items 344. Location map 346 illustrates the association between location values 348 and items 344. Note that the layout of the location indicators and the location map 346 of FIGS. 23A-23B have been described with reference to FIGS. 21A-21B.

Each of items 344 is associated with a location value. For example, items 344-1, 344-2, . . . , 344-6 are proximate to area 348-1 and associated with location value 348-1. Items 344-7, 344-8, 344-9 are proximate to area 348-3 and associated with location value 348-3. Item 344-10 is proximate to area 348-6 and associated with location value 348-6. Item 344-11 is proximate to area 348-5 and associated with location value 348-5. As described hereinafter, items may be displayed on a mobile scanning device based on a location map and a currently determined location value. For example, a mobile scanning device may include a location map which the mobile scanning device may use to arrange ordered items on the display of the mobile scanning device.

Figure 24:
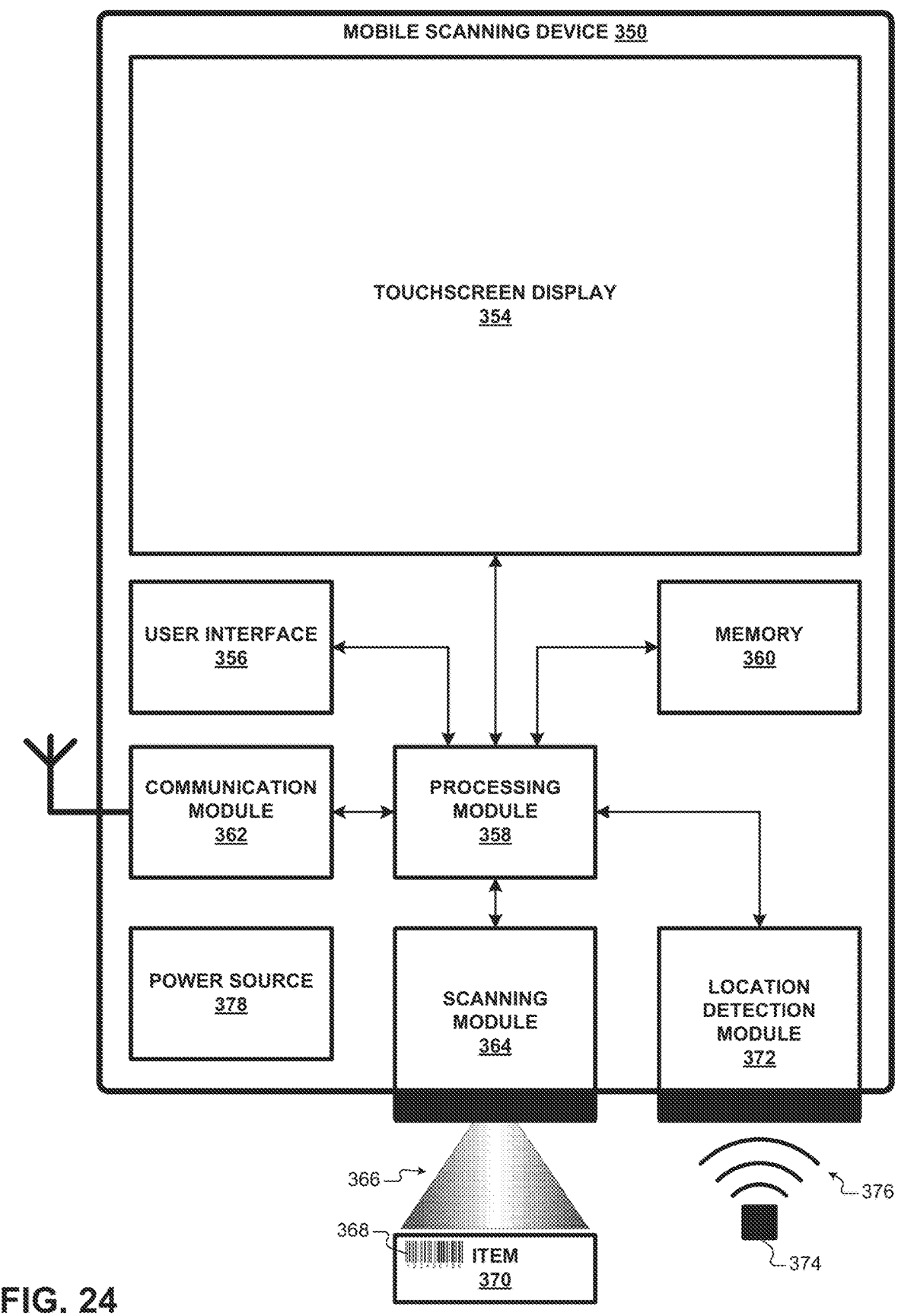
FIGS. 24-25 show functional block diagrams of example mobile scanning devices.
Figure 25:
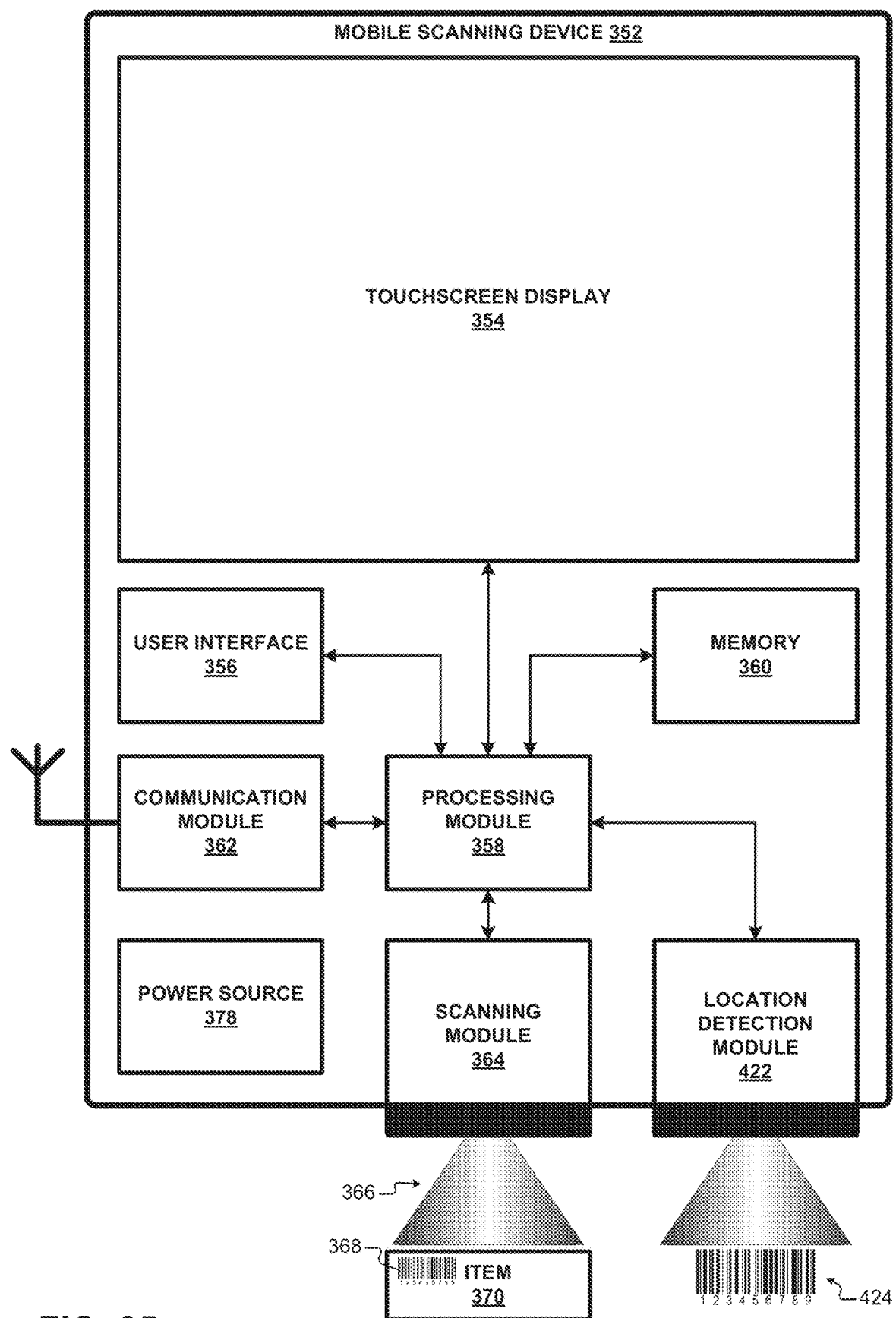

FIGS. 24-25 show functional block diagrams of example mobile scanning devices. Mobile scanning device 350 of FIG. 24 is configured to receive location signals and determine location values based on received location signals. Mobile scanning device 352 of FIG. 25 is configured to scan location indicators that include readable objects and determine location values based on the scanned readable objects. Mobile scanning devices 350, 352 may be implemented using a variety of different form factors.

Referring now to FIG. 24, mobile scanning device 350 includes a touchscreen display 354 and a user interface 356. Touchscreen display 354 may include a combination display (e.g., an LCD or OLED display) and a touchscreen. Touchscreen display 354 may display information (e.g., ordered items) to a user. Touchscreen display 354 may also receive user touch input, such as tapping, swiping, and multi-finger input. Although mobile scanning devices 350, 352 include touchscreen display 354, in other examples, the display of a mobile scanning device may not include touchscreen capabilities.

User interface 356 may represent user interface components, other than touchscreen display 354, which may provide a user interface experience. A user may interact with mobile scanning device 350 using user interface 356. User interface 356 may include input components which a user may use to input information into mobile scanning device 350, such as touch controls (e.g., capacitive touch buttons, a touchpad, and/or a touch wheel), a keypad (e.g., alphanumeric keys), buttons, a directional pad, an analog stick, switches, a scroll wheel, a track ball, accelerometers, a microphone, or other user interface components. User interface 356 may also include one or more feedback components that provide feedback to a user. Feedback components may include a speaker that provides audible feedback, a vibrating device that provides tactile feedback, and/or visual feedback devices (e.g., LEDs).

A user may interact with mobile scanning device 350 using touchscreen display 354 and/or user interface 356. For example, a user may view items included in customer orders along with other information on touchscreen display 354. A user may also swipe their finger across touchscreen display 354 to scroll through the items displayed on touchscreen display 354. As described herein, the items displayed on touchscreen display 354 may be arranged based on a current location of mobile scanning device 350.

Mobile scanning device 350 includes a processing module 358 and memory 360. Processing module 358 may take the form of one or more microprocessors, microcontrollers, digital signal processors (DSPs), application-specific integrated circuits (ASICs), field-programmable gate arrays (FPGAs), programmable logic circuitry, or the like. The functions attributed to processing module 358 herein may be embodied as hardware, firmware, software or any combination thereof. Processing module 358 may provide any of the functionality ascribed herein to mobile scanning device 350, or otherwise perform any of the methods described herein.

Memory 360 may store instructions that cause processing module 358 to provide the functionality ascribed to mobile scanning device 350 herein. Memory 360 may include any fixed or removable media. For example, memory 360 may include magnetic or electrical media, such as RAM, ROM, magnetic disks, EEPROM, or the like. Memory 360 may also include a removable memory portion that may be used to provide memory updates or increases in memory capacities.

Mobile scanning device 350 includes a communication module 362 that may provide wireless communication functionality. Mobile scanning device 350 may communicate with other computing devices using communication module 362, which may be coupled to an internal antenna or an external antenna. For example, mobile scanning device 350 may send data to other computing devices using communication module 362. Additionally, mobile scanning device 350 may receive data from other computing devices using communication module 362. Examples of wireless communication techniques that may be employed to facilitate communication between mobile scanning device 350 and other computing devices using communication module 362 may include communication according to 802.11 or Bluetooth specification sets, infrared communication, e.g., according to the IrDA standard, near-field communication (NFC), or other standard or proprietary communication protocols.

In some examples, mobile scanning device 350 may communicate directly with other mobile scanning devices. For example, mobile scanning device 350 may transmit data from communication module 362 to a communication module of another mobile scanning device. Similarly, mobile scanning device 350 may receive data from one or more mobile scanning devices via communication module 362. In other examples, mobile scanning device 350 may communicate with other mobile scanning devices via a communication system of a store (e.g., communication system 112 of FIG. 1). In these examples, mobile scanning device 350 may transmit data to the communication system from communication module 362. The transmitted data may then be sent from the communication system to other mobile scanning devices.

In some examples, mobile scanning device 350 may communicate with a central computing system of a store (e.g., central computing system 104 of FIG. 1) via a communication system (e.g., communication system 112 of FIG. 1) of the store. For example, mobile scanning device 350 may transmit data from communication module 362 to the communication system. The communication system may then send the data to the central computing system. Mobile scanning device 350 may also receive data from the communication system. For example, the central computing system may send data to the communication system which then wirelessly transmits the data to communication module 362.

Mobile scanning device 350 includes a scanning module 364 that may represent any devices (e.g., electronic hardware, software/firmware) configured to scan item ID codes. For example, scanning module 364 may be configured to scan printed codes, such as barcodes (e.g., linear, 2D, or QR barcodes). Scanning module 364 may include one or more types of technology for scanning item ID codes. In some examples, scanning module 364 may include one or more photodiodes and associated electronics/software for reading light and dark portions of an item ID code on the item. In some examples, scanning module 364 may include one or more lasers and associated electronics/software for scanning back and forth across an item ID code to read the item ID code. In some examples, scanning module 364 may include one or more CCD readers and associated electronics/software for reading light and dark portions of an item ID code on the item. In some examples, scanning module 364 may include a small camera (e.g., CCD or CMOS imaging) and associated image processing electronics/software for interpreting the item ID code. Shading 366 included in FIGS. 24-25 is meant to illustrate the scanning of item ID code 368 (e.g., a barcode) on item 370, e.g., using a photodiode, one or more lasers, or other technology.

Scanning module 364 may be configured to scan item ID codes in response to user input. For example, a user may press a key (e.g., pull a trigger) on user interface 356 to cause scanning module 364 to scan an item ID code. Example form factors of mobile scanning device 350 including a key (e.g., a trigger) which may be pressed by a user to initiate an item scan are illustrated in FIGS. 26A, 26B, 26D, 26F. In other examples, scanning module 364 may not require user input to operate. Instead, scanning module 364 may constantly operate. In these examples, a laser, or other technology included in scanning module 364 may constantly operate and may scan an item ID code when the user places the item including the item ID code in front of scanning module 364.

In some examples, item ID codes may not be included on items as printed codes. Instead, items may include RFID tags that include the item ID codes. It is contemplated that scanning module 364 may include an RFID tag reader in addition to, or instead of, optical scanning technology in order to allow scanning module 364 to scan RFID tags. Accordingly, scanning module 364 may also represent RFID reader electronics/software for scanning RFID tags.

Mobile scanning device 350 includes a location detection module 372 that receives a location signal and determines a location value based on the received location signal. A location indicator 374 that transmits location signal 376 is included in FIG. 24 to indicate that location detection module 372 is configured to receive location signals. Location detection module 372 may generally represent any devices (e.g., electronic hardware and software) capable of receiving location signals and generating location values described herein. In some examples, location detection module 372 may include an antenna for receiving location signals transmitted by antennas included on location indicators. In other examples, location detection module 372 may include a light detection device for receiving location signals transmitted by light emitting devices (e.g., LEDs or other photonic devices). In other examples, location detection module 372 may include an acoustic device for receiving location signals (e.g., sound waves) transmitted by an acoustic device. In other examples, where location indicators in the store include RFID tags, location detection module 372 may be configured to scan the RFID tags and determine a location value based on the data retrieved from the RFID tags. Additionally, in some examples, location detection module 372 may be configured to transmit energy to energize RFID tags so that the RFID tags may transmit data to location detection module 372.

Mobile scanning device 350 includes a power source 378 that delivers operating power to the components of mobile scanning device 350. Power source 378 may include a fixed or removable battery in some examples. In some examples, power source 378 may include an adapter for charging the battery.

Processing module 358 may receive input and data from various components of mobile scanning device 350. For example, processing module 358 may receive user input from user interface 356 and touchscreen display 354. Additionally, processing module 358 may receive data from communication module 362 (e.g., received wireless data and customer orders), scanning module 364 (e.g., item IDs), and location detection module 372 (e.g., location values). Processing module 358 may also receive data from memory 360 (e.g., a location map and associations between items and location values).

Processing module 358 may also send data to components of mobile scanning device 350. For example, processing module 358 may store a list of items in memory 360 from the customer orders that have been placed. Processing module 358 may store the items of customer orders in memory 360 as follows. When a customer order is placed, a communication system (e.g., communication system 112) may transmit the customer order to communication module 362. Processing module 358 may then store the received customer order in memory 360. Processing module 358 may then update the customer orders in memory 360 as new customer orders are placed.

Processing module 358 may also control components of mobile scanning device 350, such as touchscreen display 354 and scanning module 364. For example, processing module 358 may control the image (e.g., the ordered items) displayed on touchscreen display 354. Additionally, processing module 358 may control when scanning module 364 scans an item. For example, when processing module 358 detects a user pushing a scan button (e.g., a trigger) of user interface 356, processing module 358 may instruct scanning module 364 to scan an item ID code. After scanning module 364 scans an item ID code, scanning module 364 may send the item ID code to processing module 358. As described hereinafter, processing module 358 may keep track of which items have been scanned by mobile scanning device 350 and other mobile scanning devices. For example, processing module 358 may remove the item ID code from the list of currently ordered items in memory 360 after the item has been scanned.

Although the mobile scanning devices are illustrated in FIGS. 24-25 as rectangular, mobile scanning device 350 may be configured into a variety of different form factors. In general, mobile scanning device 350 may have a form factor that may be transported by a user throughout the store. In some examples, mobile scanning device 350 may have a handheld form factor. In other examples, mobile scanning device 350 may be configured to be placed in, or attached to, a cart and moved around the store by a user.

In some examples, components of mobile scanning device 350 may be included in a single housing (e.g., a molded plastic housing). For example, touchscreen display 354, user interface 356, memory 360, communication module 362, processing module 358, scanning module 364, location detection module 372, and power source 378 may be housed in a single housing. When housed in the single housing, in some examples, mobile scanning device 350 may be embodied as a hand-held computing device that a user may easily transport throughout the store.

Although the mobile scanning devices in FIGS. 24-25 are illustrated as included in a single rectangular housing, it is contemplated that components of mobile scanning devices may be housed in multiple different housings. In these examples, the different components of mobile scanning devices may be wired together or may wirelessly communicate with one another. Example mobile scanning device form factors are illustrated in FIGS. 26A-I.

Figure 26A:
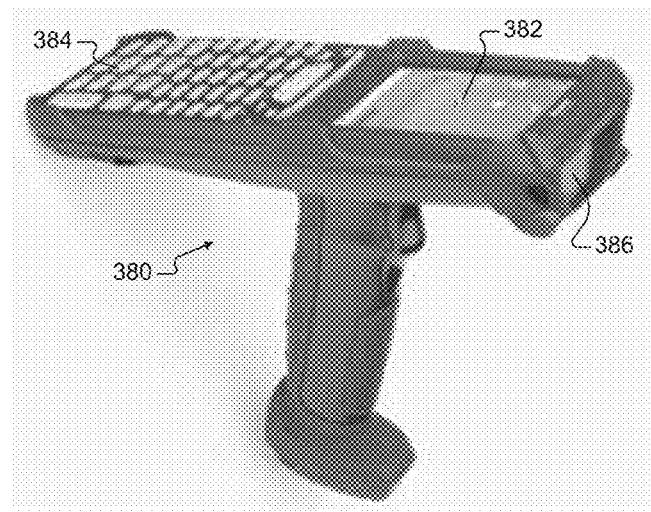
FIGS. 26A-26I show example mobile scanning device form factors.

FIG. 26A shows an example from factor 380 in which a mobile scanning device of the present disclosure may be implemented. The example device pictured in FIG. 26A is an XG100 W mobile computer available from Janam Technologies LLC. Form factor 380 includes a display 382, keypad 384, and an example scanning module 386 (e.g., barcode reader). Although not shown in FIG. 26A, form factor 380 may be configured to include an internal communication module, memory, processing module, and power source according to the present disclosure. In examples where a store includes location indicators that have readable codes, scanning module 386 may also act as a location detection module. In examples where location indicators transmit location signals, additional components may be added to form factor 380 so that form factor 380 is configured to receive transmitted location signals. For example, an antenna, a light detection device, an acoustic device, and/or an RFID reader may be added to the form factor to receive transmitted location signals.

Figure 26B:
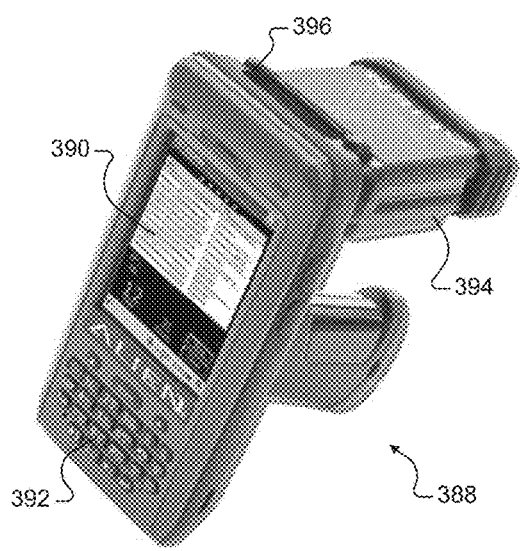

FIG. 26B shows an example from factor 388 in which a mobile scanning device of the present disclosure may be implemented. The example device of FIG. 26B is an Alien ALH-9000 handheld RFID reader available from Alien Technology. Form factor 388 includes a display 390, keypad 392, an example location detection module 394 (e.g., an RFID reader), and an example scanning module 396 (e.g., a barcode reader). Although not shown in FIG. 26B, form factor 388 may be configured to include an internal communication module, memory, processing module, and power source according to the present disclosure.

Figure 26C:

FIG. 26C shows an example from factor 398 in which a mobile scanning device of the present disclosure may be implemented. The example device of FIG. 26C is an MC55A0 handheld terminal available from Motorola, Inc. Form factor 398 includes a display 400, keypad 402, and an example scanning module (not shown) (e.g., barcode reader). Although not shown in FIG. 26C, form factor 398 may be configured to include an internal communication module, memory, processing module, and power source according to the present disclosure. In examples where a store includes location indicators that have readable codes, the scanning module may also act as a location detection module. In examples where location indicators transmit location signals, additional components may be added to form factor 398 so that form factor 398 is configured to receive transmitted location signals. For example, an antenna, a light detection device, an acoustic device, and/or an RFID reader may be added to the form factor to receive transmitted location signals.

Figure 26D:
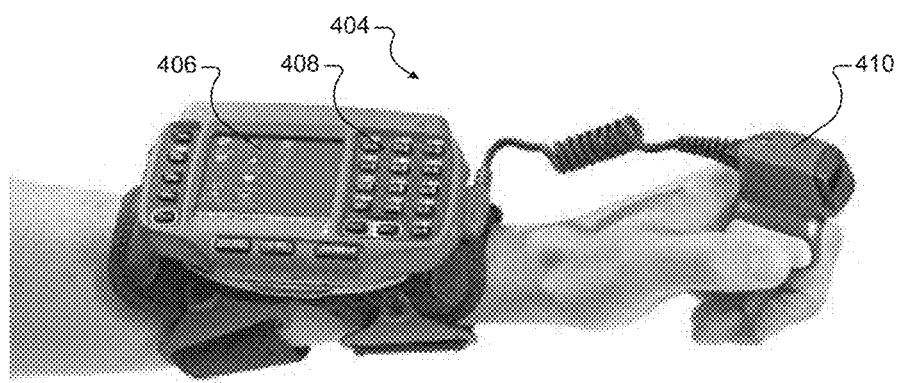

FIG. 26D shows an example from factor 404 in which a mobile scanning device of the present disclosure may be implemented. The example device of FIG. 26D is a WT4090 wearable terminal available from Motorola, Inc. Form factor 404 includes a display 406, keypad 408, and an example scanning module 410 (e.g., barcode reader). Although not shown in FIG. 26D, form factor 404 may be configured to include an internal communication module, memory, processing module, and power source according to the present disclosure. In examples where a store includes location indicators that have readable codes, scanning module 410 may also act as a location detection module. In examples where location indicators transmit location signals, additional components may be added to form factor 404 so that form factor 404 is configured to receive transmitted location signals. For example, an antenna, a light detection device, an acoustic device, and/or an RFID reader may be added to the form factor to receive transmitted location signals.

Figure 26E:
Figure 26F:
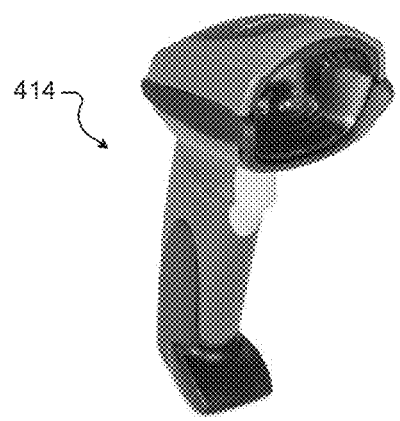

FIGS. 26E-26I show example components that may be included in mobile scanning devices according to the present disclosure. FIGS. 26E-26F show example scanning modules 412, 414 (e.g., barcode scanners) that may be included in a mobile scanning device. For example, scanning modules 412, 414 may be connected to (e.g., wired/wirelessly) other components of a mobile scanning device of the present disclosure. The example devices of FIG. 26E-26F represent typical barcode scanners.

Figure 26G:
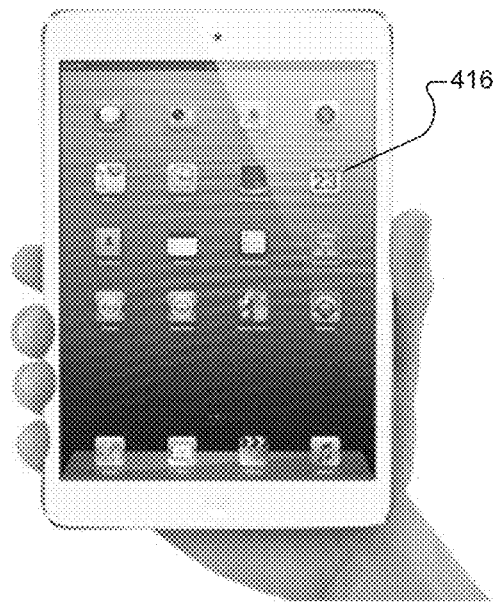
Figure 26H:
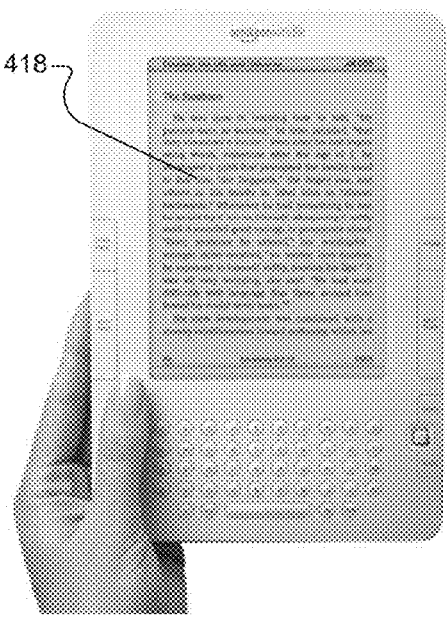
Figure 26I:
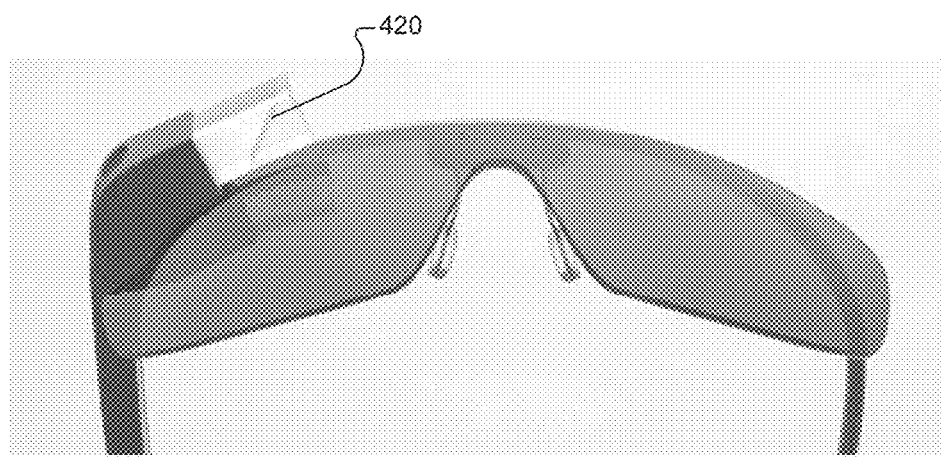

FIG. 26G shows an example touchscreen display 416 that may be included in a mobile scanning device. For example, such a touchscreen display 416 may be connected to (e.g., wired/wirelessly) other components of a mobile scanning device of the present disclosure. The example device of FIG. 26G is an iPad mini available from Apple, inc. FIG. 26H shows an example display 418 (e.g., an electrophoretic display) that may be included in a mobile scanning device. For example, such a display 418 may be connected to (e.g., wired/wirelessly) other components of a mobile scanning device of the present disclosure. The example device of FIG. 26H is a Kindle available from Amazon.com, Inc. FIG. 26I shows another example display 420 that may be included in a mobile scanning device. Display 420 is a heads-up display that may be worn on a user's head, e.g., as a pair of glasses. Display 420 may be connected to (e.g., wired/wirelessly) other components of a mobile scanning device of the present disclosure. The example device of FIG. 26I is a Google Glass® device available from Google, Inc.

FIG. 25 shows another example mobile scanning device 352. Mobile scanning device 352 of FIG. 25 is similar to mobile scanning device 350 of FIG. 24, except that location detection module 422 of FIG. 25 is different than location detection module 372 of FIG. 24. Location detection module 422 is configured to scan location indicators that include readable codes (e.g., location indicator 424) and determine a location value based on the scanned readable code. In some examples, the scanning functionality of scanning module 364 and location detection module 422 may be combined. For example, if location indicators include barcodes, mobile scanning device 352 may include barcode scanning hardware/software that may scan barcodes included on items and scan barcodes included on location indicators. In some implementations, location detection module 422 may not require user input to operate. Instead, location detection module 422 may continuously operate such that location detection module 422 detects (e.g., scans) location indicators including readable codes (e.g., barcodes) as the user of mobile scanning device 352 passes by the location indicators. Put another way, location detection module 422 may automatically detect location indicators including readable codes as a user moves mobile scanning device 352 throughout the store.

Figure 27:
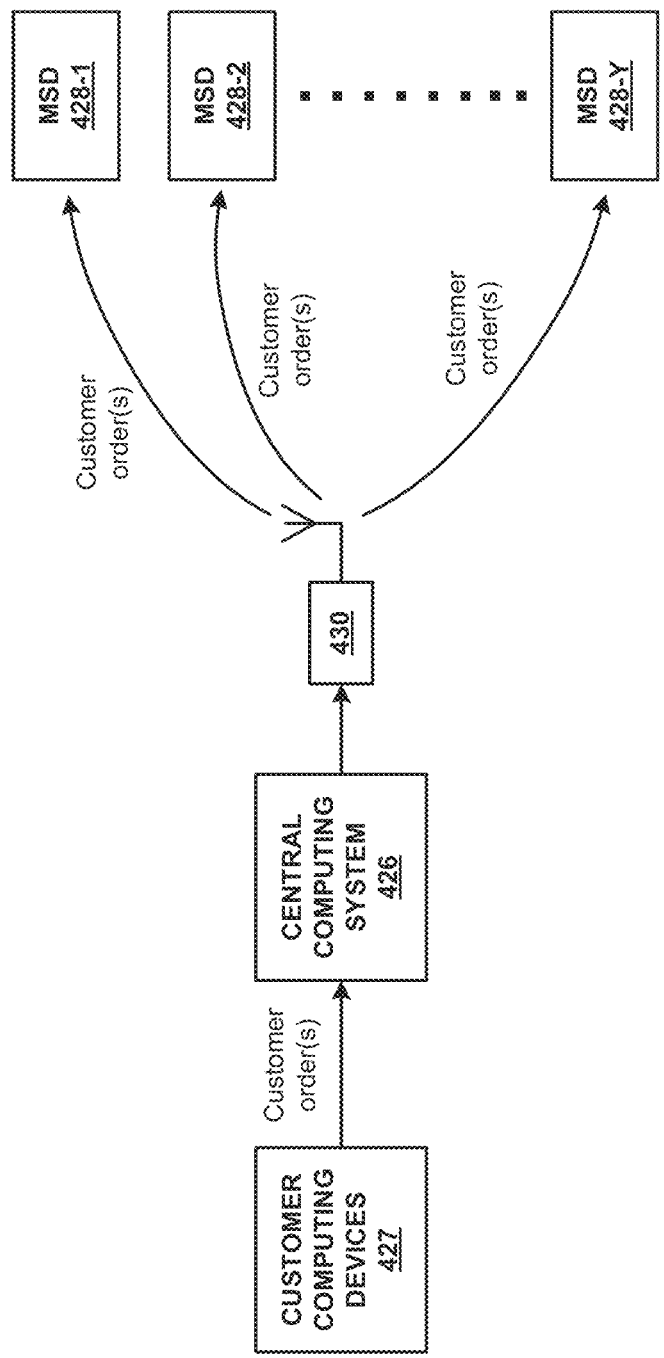
FIG. 27 shows the placement of customer orders with a central computing system and wireless transmission of the customer orders to mobile scanning devices.

As described above, customers may place customer orders with a central computing system. FIG. 27 shows the placement of customer orders with central computing system 426 using customer computing devices 427. In FIG. 27, central computing system 426 is configured to wirelessly transmit customer orders to mobile scanning devices 428-1, 428-2, . . . , 428-Y (collectively "mobile scanning devices 428") via communication system 430. Each of mobile scanning devices 428 may receive the customer orders. Each of mobile scanning devices 428 may store the received customer orders in their respective memories.

Each of mobile scanning devices 428 may also display at least some of the ordered items on their respective displays. The arrangement of items displayed on each of mobile scanning devices 428 may depend on the locations of the mobile scanning devices. Arrangement of items on a mobile scanning device is described in further detail hereinafter.

Although multiple mobile scanning devices 428 are illustrated in FIG. 27, in some examples, a store may include only a single mobile scanning device. For example, a store may include only mobile scanning device 428-1. In this example, central computing system 426 may wirelessly transmit customer orders to mobile scanning device 428-1. Mobile scanning device 428-1 may store the received customer orders in memory. Additionally, mobile scanning device 428-1 may determine a location value based a received location signal (or scanned readable code) and arrange the items (e.g., some of the items) of customer orders on the display according to the determined location value.

It is contemplated that a store may include any number of mobile scanning devices. As described above, a store may include a single mobile scanning device in some examples. In other examples, a store may include two or more mobile scanning devices. For example, a store may include 10 or more mobile scanning devices in some examples.

Figure 28A:
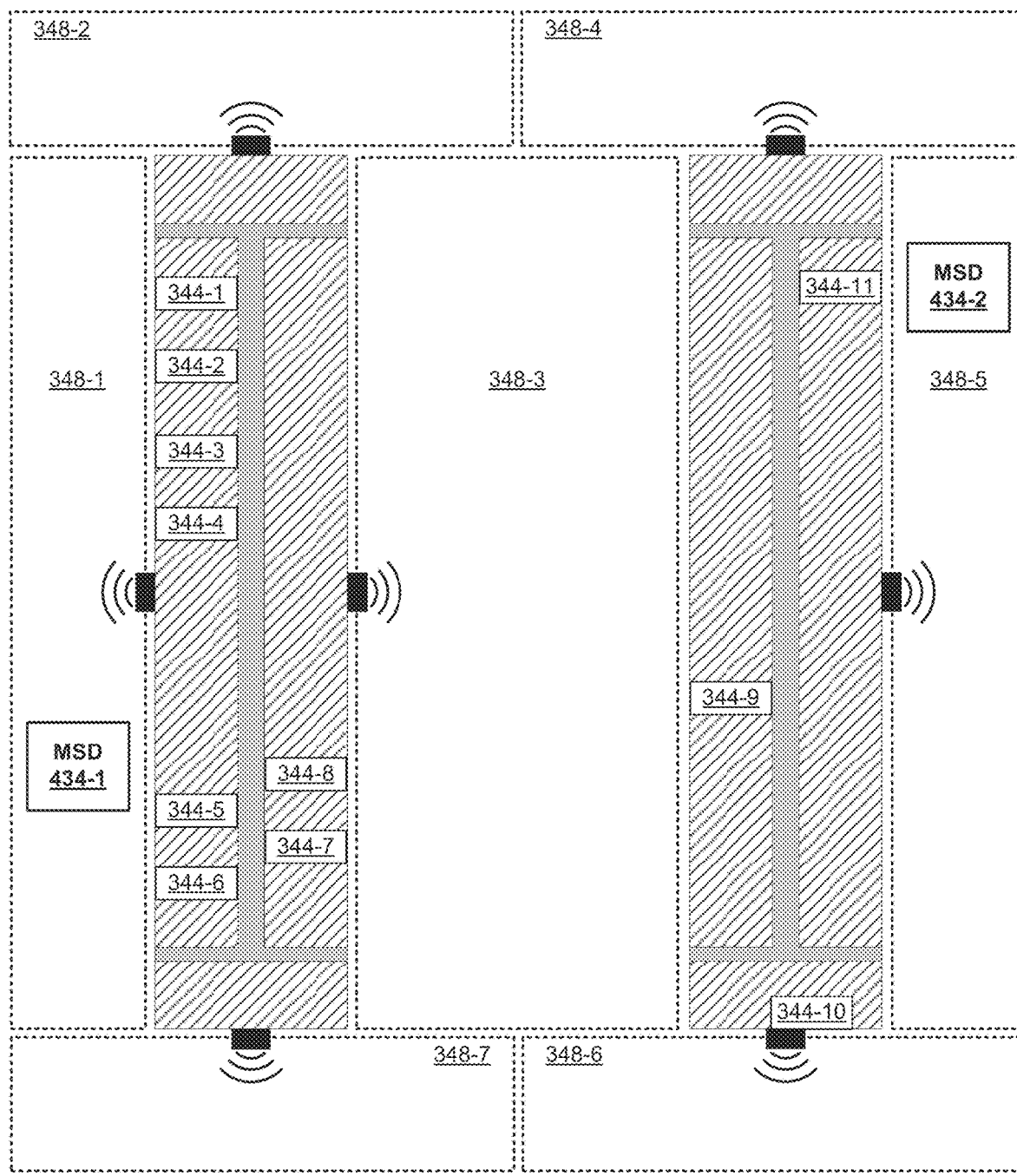

FIGS. 28A-C show how multiple mobile scanning devices may display customer orders to users. In FIG. 28A, store 432 includes two mobile scanning devices 434-1, 434-2. It can be assumed that each of mobile scanning devices 434-1, 434-2 has received one or more customer orders including items 344-1, 344-2, . . . , 344-11 (collectively "items 344") from a communication system. For example, a single customer order may have included all items 344. As another example, a first customer order may have included items 344-1, 344-2, and a second customer order may have included the remaining items 344-3, 344-4, . . . , 344-11. It may also be assumed that each of the memories of mobile scanning devices 434-1, 434-2 include items 344, a location map of store 432, and associations between items 344 and location values 348. The location map 346 of store 432 including items 344 is illustrated in FIG. 23B.

As shown in FIG. 28A, mobile scanning device 434-1 is in zone 348-1 which includes items 344-1, 344-2, . . . , 344-6. Accordingly, mobile scanning device 434-1 is likely to be nearest to items 344-1, 344-2, . . . , 344-6. According to location map 346, mobile scanning device 434-1 is near zone 348-3 including items 344-7, 344-8, 344-9. The next nearest zones including items of customer orders are zones 348-6, 348-5, which include items 344-10, 344-11. Based on the proximity of the zones described above with respect to location map 346, it may be most efficient for a user of mobile scanning device 434-1 to pick items from zone 348-1, then zone 348-3, then zone 348-6 and zone 348-5.

Mobile scanning device 434-2 is in zone 348-5, which includes item 344-11. Accordingly, mobile scanning device 434-2 is likely to be nearest to item 344-11. According to location map 346, mobile scanning device 434-2 is near zone 348-6 including item 344-10. The next nearest zones including items of customer orders are zone 348-3 and zone 348-1, which include items 344-7, 344-8, 344-9 and items 344-1, 344-2, . . . , 344-6, respectively. Based on the proximity of the zones described above with respect to location map 346, it may be most efficient for a user of mobile scanning device 434-2 to pick items from zone 348-5, then zone 348-6, zone 348-3, and zone 348-1.

FIG. 28B shows an example display 436-1 of mobile scanning device 434-1 before mobile scanning device 434-1 has picked any of items 344. FIG. 28C shows an example display 436-2 of mobile scanning device 434-2 before mobile scanning device 434-2 has picked any of items 344. In FIG. 28B, display 436-1 of mobile scanning device 434-1 has items 344 arranged such that the items nearest to mobile scanning device 434-1 are located at the top of display 436-1. In FIG. 28C, display 436-2 of mobile scanning device 434-2 has items 344 arranged such that the items nearest to mobile scanning device 434-2 are located at the top of display 436-2. The zones that include each of the items are indicated next to displays 436-1, 436-2. Items in dotted boxes under displays 436-1, 436-2 represent those items that may not fit onto displays 436-1, 436-2. Items in dotted boxes may appear on displays 436-1, 436-2 when mobile scanning devices 434-1, 434-2 are moved throughout store 432 and/or mobile scanning devices 434-1, 434-2 scan one or more of items 344. In some examples, a user may swipe displays 436-1, 436-2 to scroll down the items 344 to reveal those items that are currently not displayed.

It is contemplated that many customer orders (e.g., dozens of orders) may be placed with a store over a relatively short period of time. Each of the customer orders placed may include many items (e.g., dozens of items). Accordingly, the display of a mobile scanning device may not be able to sufficiently display all of the items that are currently ordered. Displaying those items which are likely closest to the users of mobile scanning devices, as illustrated in FIGS. 28B-28C, may allow the users to easily determine which items to pick. For example, if more than 100 items are currently ordered by customers, each mobile scanning device in a store may display 10-20 of the closest items so that the user can focus on picking those 10-20 items. In examples where more items are ordered than may be displayed on a display, the mobile scanning devices may determine an order in which to display those ordered items which are not currently displayed. For example, mobile scanning devices may arrange the items in memory based on the distances of the items from the mobile scanning devices (e.g., using a location map).

As described above, users may scan item IDs of ordered items using mobile scanning devices. In general, a user may scan an item ID using a mobile scanning device when the user picks the item off a rack. After scanning the item ID code, the user may place the item in a cart and take the item to a collection area of the store where the items of a customer order are put together for customer pickup or delivery. A mobile scanning device may communicate to other computing devices that the mobile scanning device has scanned an item. For example, a mobile scanning device may communicate to the central computing system and/or other mobile scanning devices that an item ID code has been scanned. Accordingly, the central computing system and/or the mobile scanning devices may determine which items of the current customer orders have already been picked by other mobile scanning devices.

Figure 29A:
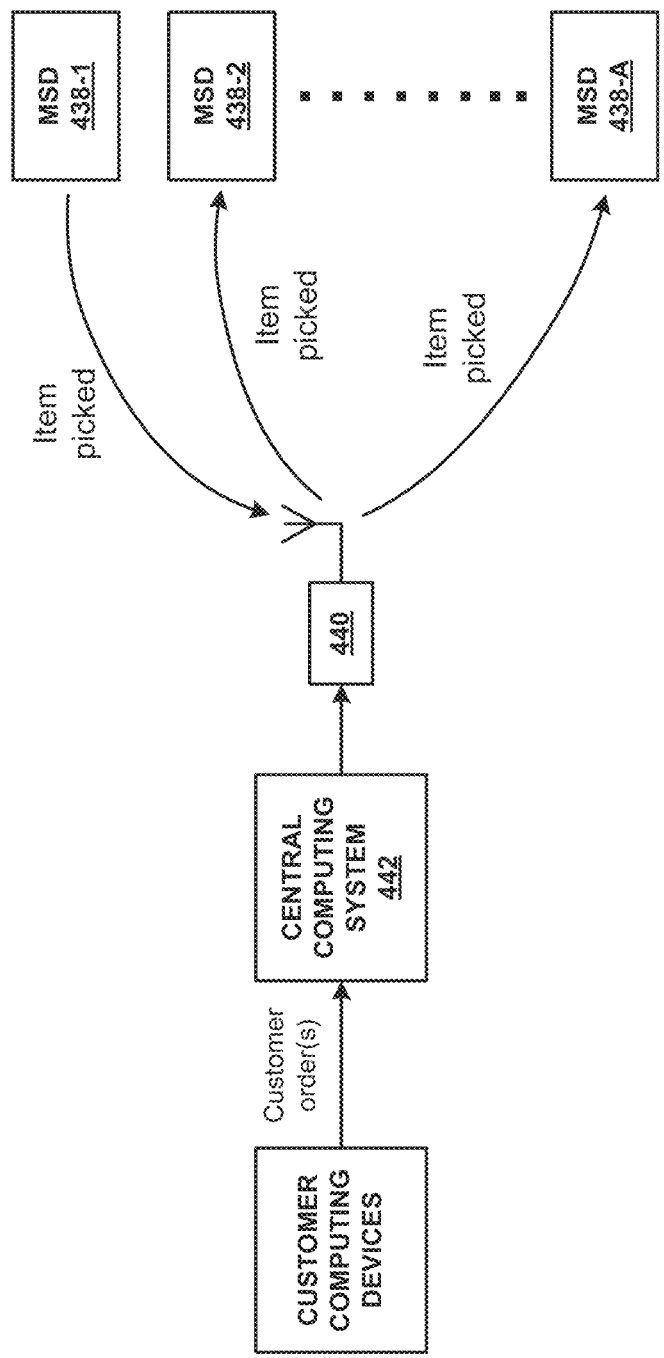
FIGS. 29A-29B show example communications between mobile scanning devices and a central computing system.
Figure 29B:
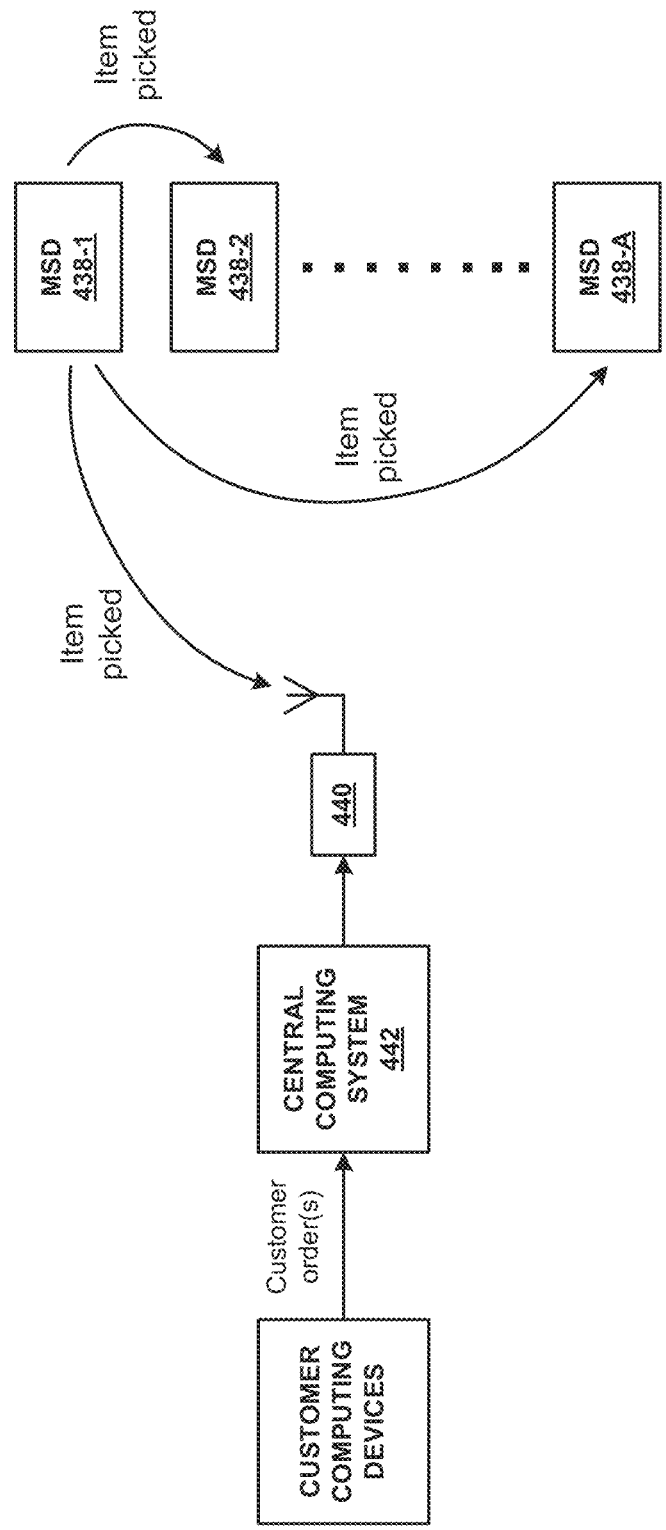

FIGS. 29A-29B show example communications between mobile scanning devices and a central computing system. In FIGS. 29A-29B, it may be assumed that mobile scanning devices 438-1, 438-2, . . . , 438-A (collectively "mobile scanning devices 438") have received customer orders for one or more items. In FIG. 29A, mobile scanning device 438-1 scans an item ID code and communicates back to communication system 440 that the item has been picked.

Communication system 440 may indicate to central computing system 442 that the item has been picked. Based on this information, central computing system 442 may update the status of the customer orders in central computing system 442 to indicate that the item has been picked. Additionally, or alternatively, central computing system 442 may indicate to mobile scanning devices 438-2, . . . , 438-A that the item has been picked. Mobile scanning devices 438 may update their memories to indicate that the item has been picked. For example, mobile scanning devices 438 may delete the item from memory and/or remove the items from their displays because users of mobile scanning devices 438 no longer need to pick the item.

In FIG. 29B, mobile scanning device 438-1 scans an item ID code and communicates back to communication system 440 and mobile scanning devices 438-2, . . . , 438-A that the item has been picked. In FIG. 29B, mobile scanning devices 438 are configured to communicate with one another, which may allow any of mobile scanning devices 438 to indicate to any other one of mobile scanning devices 438 that an item has been picked. Mobile scanning device 438-1 may also indicate to central computing system 442, via communication system 440, that the item has been picked so that central computing system 442 may keep track of which items are currently picked. Mobile scanning devices 438 may update their memories to indicate that the item has been picked. For example, mobile scanning devices 438 may delete the item from memory and/or remove the items from their displays because users of mobile scanning devices 438 no longer need to pick the item.

Figure 30A:
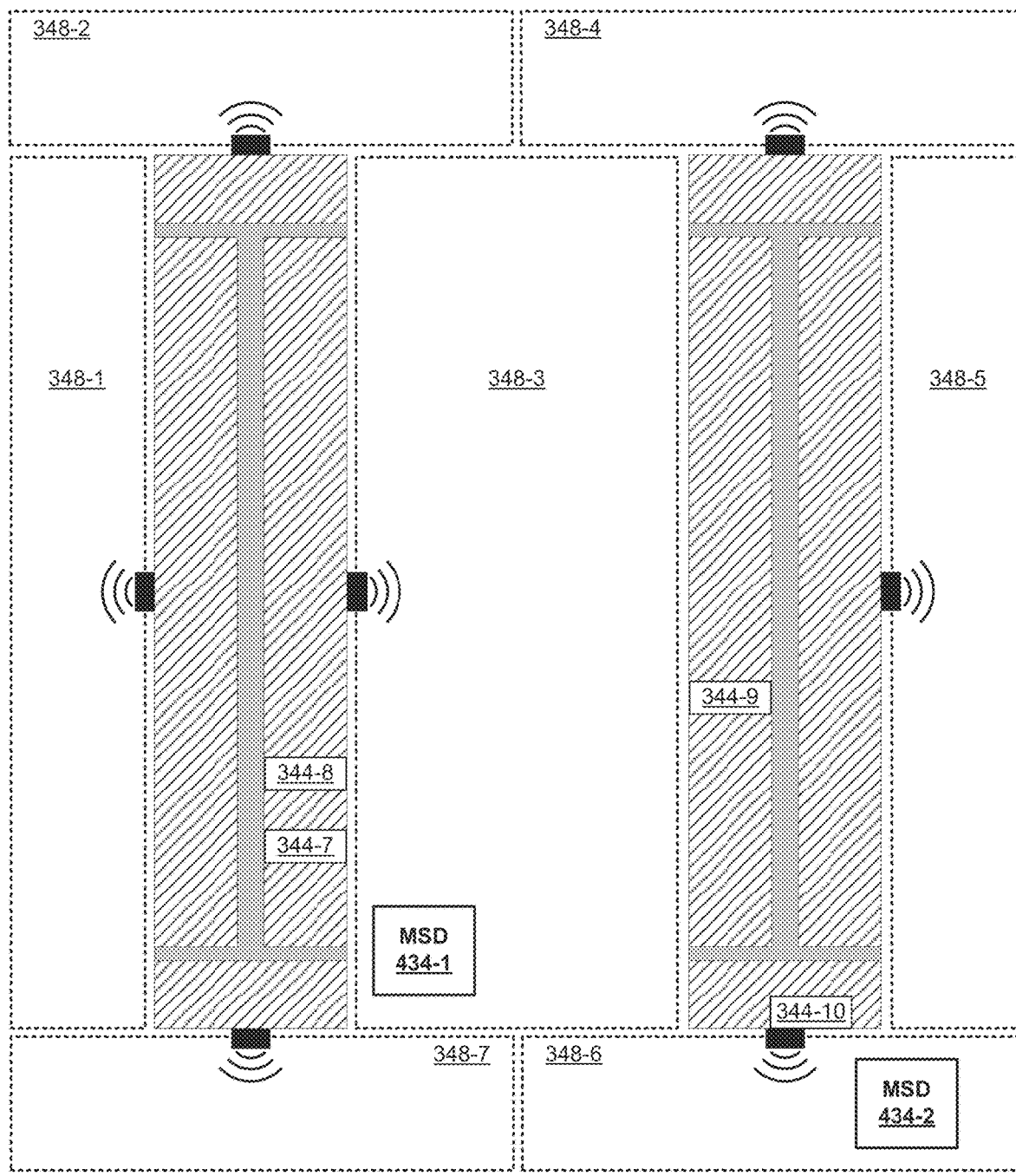

FIGS. 30A-30C show store 432 and mobile scanning devices 434-1, 434-2 of FIGS. 28A-28C after mobile scanning devices 434-1, 434-2 have moved through store 432 and picked some items. In FIG. 30A, mobile scanning device 434-1 has scanned items 344-1, . . . , 344-6 and been moved from zone 348-1 to zone 348-3. In FIG. 30A, mobile scanning device 434-2 has scanned item 344-11 and been moved from zone 348-5 to zone 348-6.

As shown in FIG. 30A, mobile scanning device 434-1 is in zone 348-3 which includes items 344-7, 344-8, 344-9. Accordingly, mobile scanning device 434-1 is likely to be nearest to items 344-7, 344-8, 344-9. According to location map 346, mobile scanning device 434-1 is near zone 348-6 including item 344-10. Based on the proximity of the zones described above with respect to location map 346, it may be most efficient for a user of mobile scanning device 434-1 to pick items from zone 348-3, then zone 348-6. In FIG. 30B, display 436-1 of mobile scanning device 434-1 has items 344-7, 344-8, 344-9, 344-10 arranged such that the items nearest to mobile scanning device 434-1 are located at the top of display 436-1, while the items farthest from mobile scanning device 434-1 (e.g., item 344-10) are located farther down display 436-1.

As shown in FIG. 30A, mobile scanning device 434-2 is in zone 348-6 which includes item 344-10. Accordingly, mobile scanning device 434-2 is likely to be near item 344-10. According to location map 346, mobile scanning device 434-2 is near zone 348-3 including items 344-7, 344-8, 344-9. Based on the proximity of the zones described above with respect to location map 346, it may be most efficient for a user of mobile scanning device 434-2 to pick items from zone 348-6 and then zone 348-3. In FIG. 30C, display 436-2 of mobile scanning device 434-2 has items 344-7, 344-8, 344-9, 344-10 arranged such that the items nearest to mobile scanning device 434-2 are located at the top of display 436-2, while the items farthest from mobile scanning device 434-2 (e.g., item 344-7, 344-8, 344-9) are located farther down the display.

Figure 31A:
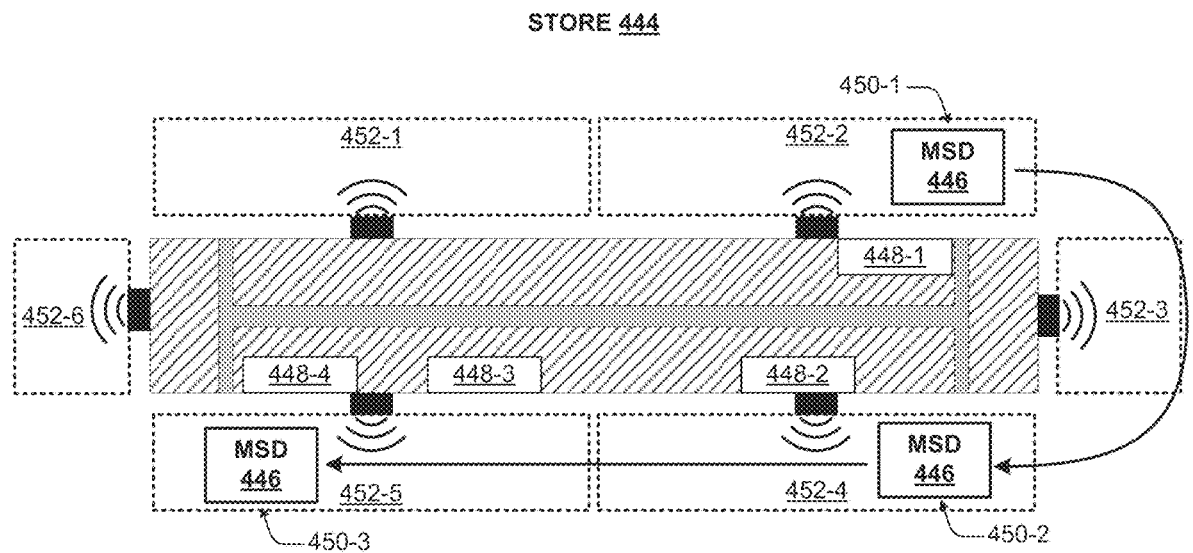
FIGS. 31A-31C show how a display of a mobile scanning device may be updated as the mobile scanning device is moved throughout a store.
Figure 31B:
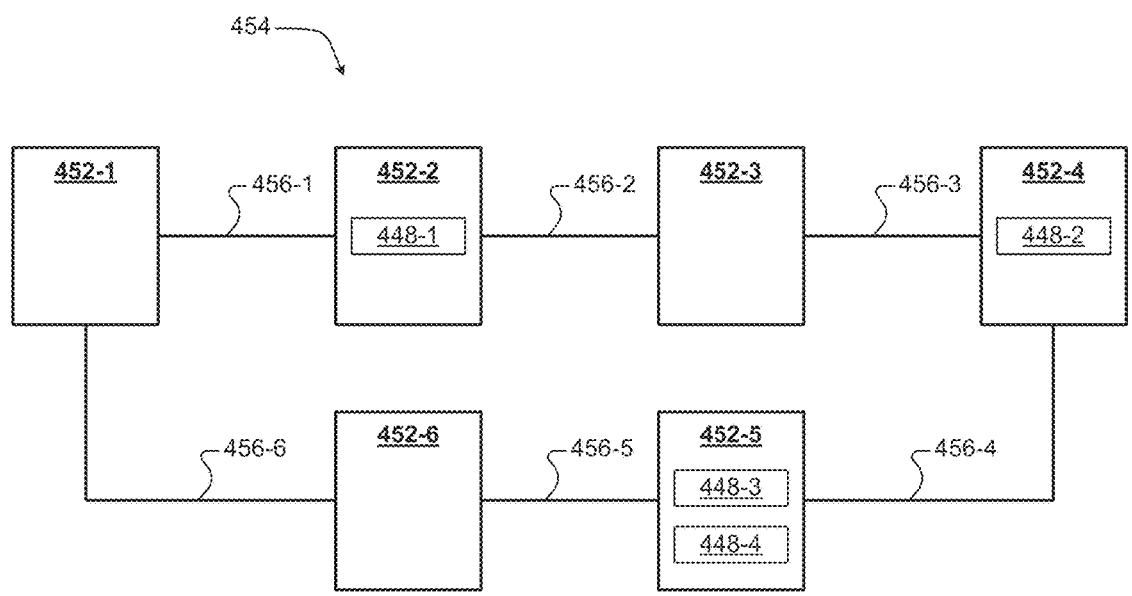
Figure 31C:
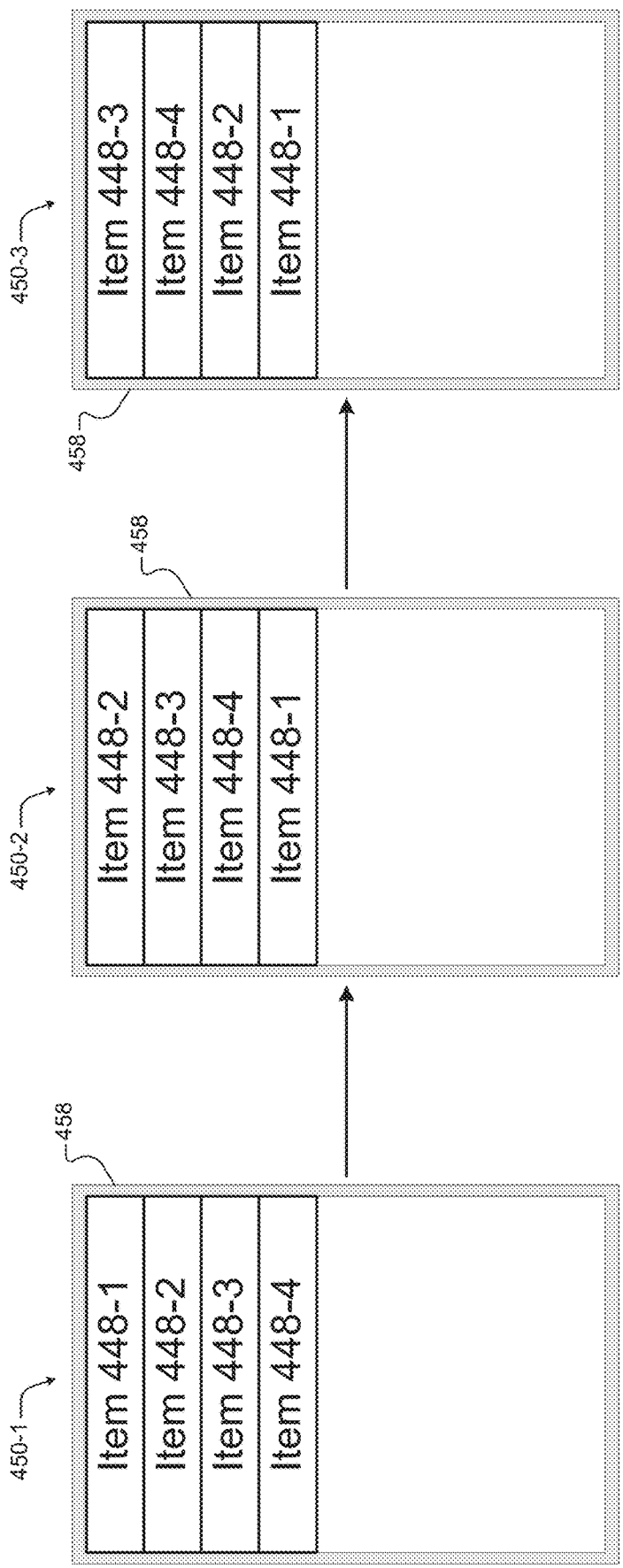

FIGS. 31A-31C show how a display of a mobile scanning device may be updated as the mobile scanning device is moved throughout a store. FIG. 31A shows a store 444 including a mobile scanning device 446. It may be assumed that mobile scanning device 446 has received a customer order including items 448-1, 448-2, 448-3, 448-4 (collectively "items 448"). In FIG. 31A, mobile scanning device 446 is moved throughout store 444 without picking items 448. Arrows show the path of mobile scanning device 446 through store 444. Initially, mobile scanning device 446 is at position 450-1 in zone 452-2. Mobile scanning device 446 then moves to position 450-2 in zone 452-4. Subsequently, mobile scanning device 446 moves to position 450-3 in zone 452-5.

FIG. 31B shows a location map 454 of store 444. Location map 454 may be stored in mobile scanning device 446 in some examples. Location map 454 includes zones 452-1, 452-2, . . . , 452-6 and junctions 456-1, 456-2, . . . , 456-6. FIG. 31C shows display 458 of mobile scanning device 446 at different positions 450-1, 450-2, 450-3 in store 444. Mobile scanning device 446 may arrange items 448 on display 458 based on location map 454. For example, mobile scanning device 446 may arrange items that are nearest to mobile scanning device 446 at the top of display 458. Mobile scanning device 446 may arrange those items that are farther from mobile scanning device 446 toward the bottom of display 458. In some circumstances (not illustrated in FIG. 31A), more items may be ordered by customers than could be displayed on display 458. In these circumstances, mobile scanning device 446 would include some of the ordered items on display 458 and, as mobile scanning device 446 is moved throughout store 444, items that were not originally displayed on display 458 may appear on display 458 as mobile scanning device 446 is moved into a zone including those items.

Initially, mobile scanning device 446 is located at position 450-1. Mobile scanning device 446 may determine location value 452-2 in zone 452-2. According to location map 454, item 448-1 is located in zone 452-2. Accordingly, as illustrated in FIG. 31C, mobile scanning device 446 may display item 448-1 at the top of display 458. Mobile scanning device 446 may determine that item 448-2 is the next nearest ordered item since item 448-2 is two junctions 456-2, 456-3 from zone 452-2. Accordingly, item 448-2 may be displayed below item 448-1 on display 458 when mobile scanning device 446 is at position 450-1. Items 448-3, 448-4, which are located farthest from zone 452-2 may be displayed at the bottom of the items displayed on display 458 since those items are farthest from zone 452-2.

As illustrated in FIG. 31A, mobile scanning device 446 is moved from position 450-1 to position 450-2. Mobile scanning device 446 may determine location value 452-4 at position 450-2. In zone 452-4, mobile scanning device 446 may determine that item 448-2 is nearest to mobile scanning device 446. Mobile scanning device 446 may also determine that items 448-3, 448-4 are the next nearest ordered items because zone 452-5 is adjacent to zone 452-4. Additionally, mobile scanning device 446 may determine that item 448-1 is farthest from mobile scanning device 446. Accordingly, as illustrated in FIG. 31C, items 448-2, 448-3, 448-4, 448-1 are arranged from the top of display 458 to the bottom of display 458 when mobile scanning device 446 is at position 450-2.

As illustrated in FIG. 31A, mobile scanning device 446 is moved from position 450-2 to position 450-3. Mobile scanning device 446 may determine location value 452-5 at position 450-3. In zone 452-5, mobile scanning device 446 may determine that items 448-3, 448-4 are nearest to mobile scanning device 446. Mobile scanning device 446 may also determine that item 448-2 is the next nearest ordered item because zone 452-4 is adjacent to zone 452-5. Additionally, mobile scanning device 446 may determine that item 448-1 is farthest from mobile scanning device 446. Accordingly, as illustrated in FIG. 31C, items 448-3, 448-4, 448-2, 448-1 are arranged from the top of display 458 to the bottom of display 458 when mobile scanning device 446 is at position 450-3.

Although a mobile scanning device may arrange items nearest to the mobile scanning device near the top of the display, it is contemplated that items nearest to the mobile scanning device may be indicated on the display in another manner. For example, a mobile scanning device may arrange the nearest items near the bottom of the display. In other examples, the mobile scanning device may display the nearest items in bold font. In other examples, the mobile scanning device may display the nearest items in larger font. In still other examples, the mobile scanning device may display the nearest items in different colors.

Figure 32A:
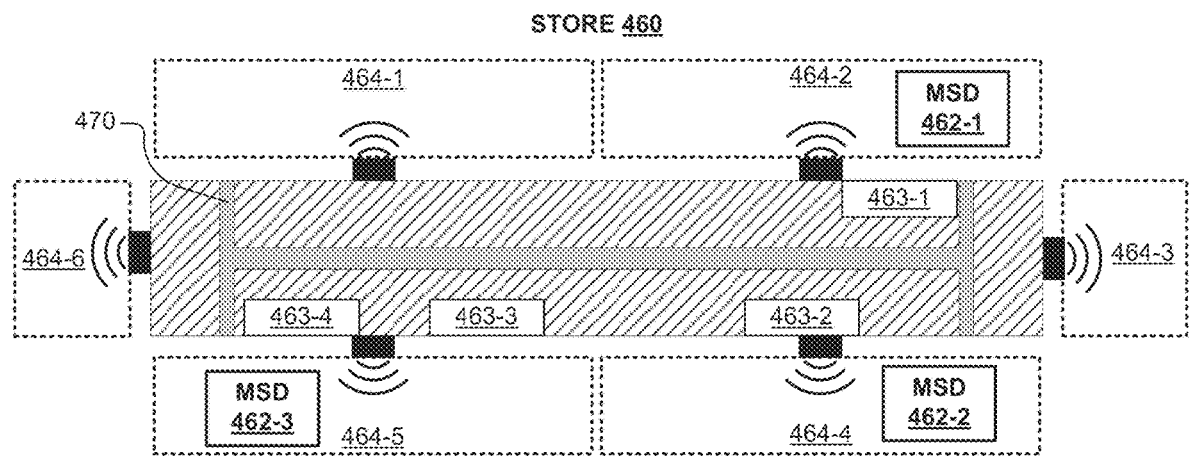
FIGS. 32A-32E show displays of multiple mobile scanning devices and how the displays are updated when items are picked.

FIGS. 32A-32E show displays of multiple mobile scanning devices and how the displays are updated when items are picked. FIG. 32A shows a store 460 including mobile scanning devices 462-1, 462-2, 462-3. It may be assumed that mobile scanning devices 462-1, 462-2, 462-3 have received a customer order including items 463-1, 463-2, 463-3, 463-4 (collectively "items 463"). In FIGS. 32A-32E, it may be assumed that each of mobile scanning devices 462-1, 462-2, 462-3 is maintained in the zones illustrated in FIG. 32A. For example, mobile scanning device 462-1 is maintained in zone 464-2. Mobile scanning device 462-2 is maintained in zone 464-4. Mobile scanning device 462-3 is maintained in zone 464-5.

Figure 32B:
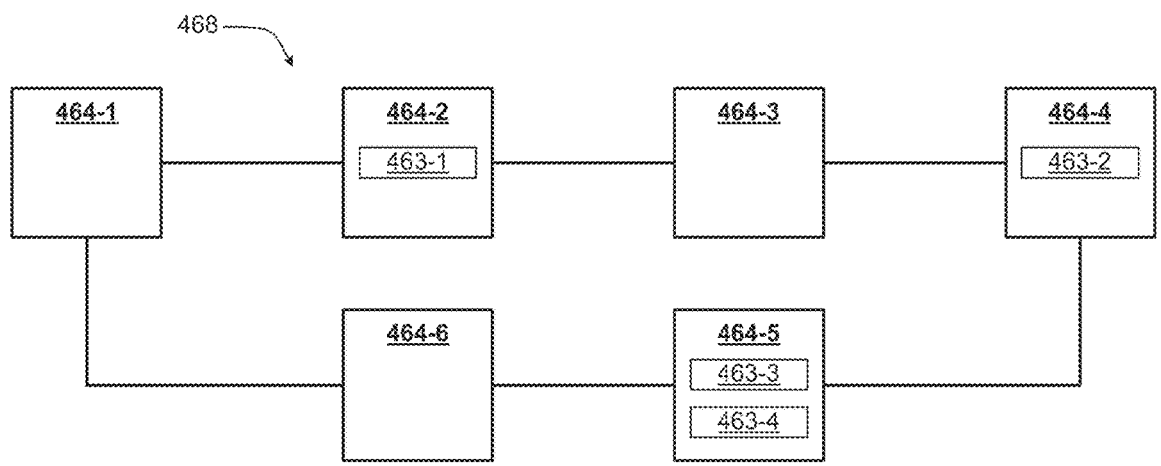

FIG. 32B shows a location map 468 before any of items 463 are scanned. FIG. 32D shows displays of each of mobile scanning devices 462-1, 462-2, 462-3 before any of items 463 are scanned. Referring back to FIG. 32A, mobile scanning device 462-2 may scan the item ID code of item 463-2. For example, a user may pick item 463-2 from rack 470, scan a barcode on item 463-2 using mobile scanning device 462-2, and place item 463-2 into a cart. Mobile scanning device 462-2 may transmit data to other mobile scanning devices 462-1, 462-3 indicating that item 463-2 has been picked. For example, mobile scanning device 462-2 may transmit an indication to the communication system that item 463-2 has been picked. The communication system may then indicate to mobile scanning devices 462-1, 462-3 that item 463-2 has been picked. In response to such an indication, mobile scanning devices 462-1, 462-3 may remove item 463-2 from their displays. In examples where mobile scanning device 462-2 may directly communicate with mobile scanning devices 462-1, 462-3, mobile scanning device 462-2 may wirelessly transmit data to other mobile scanning devices 462-1, 462-3 indicating that item 463-2 has been picked. In response to such an indication from mobile scanning device 462-2, mobile scanning devices 462-1, 462-3 may remove item 463-2 from their displays.

Figure 32C:
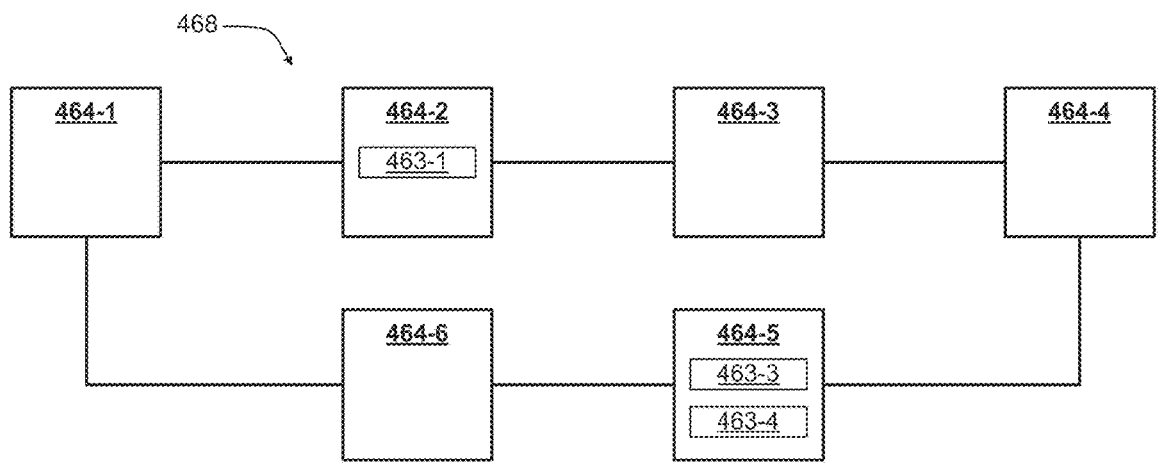
Figure 32D:
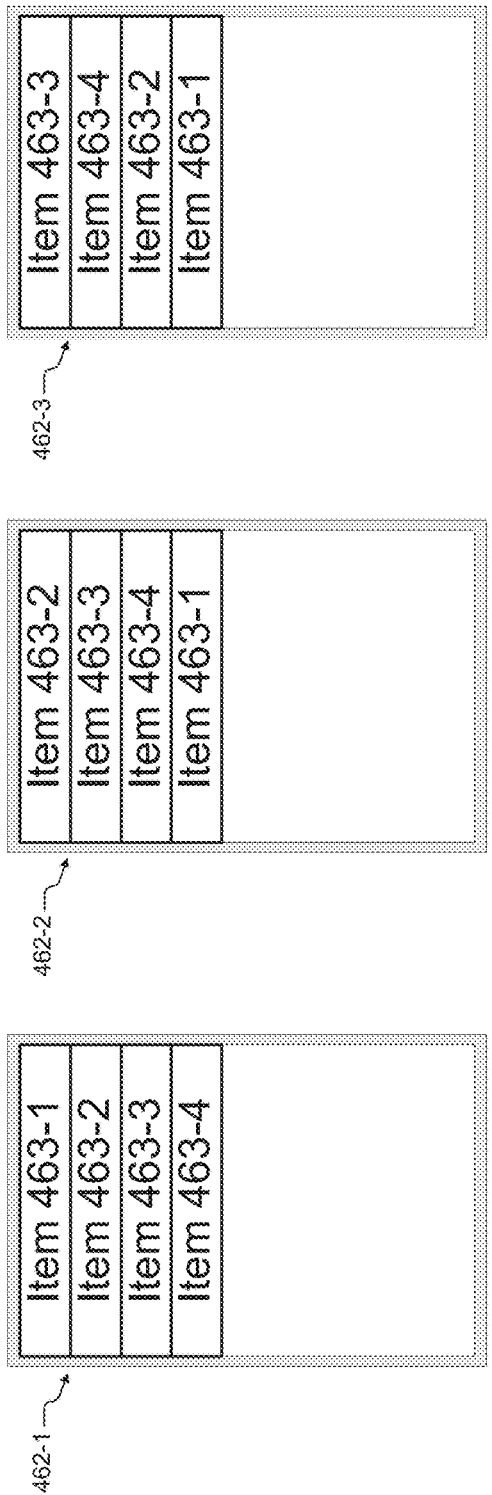
Figure 32E:
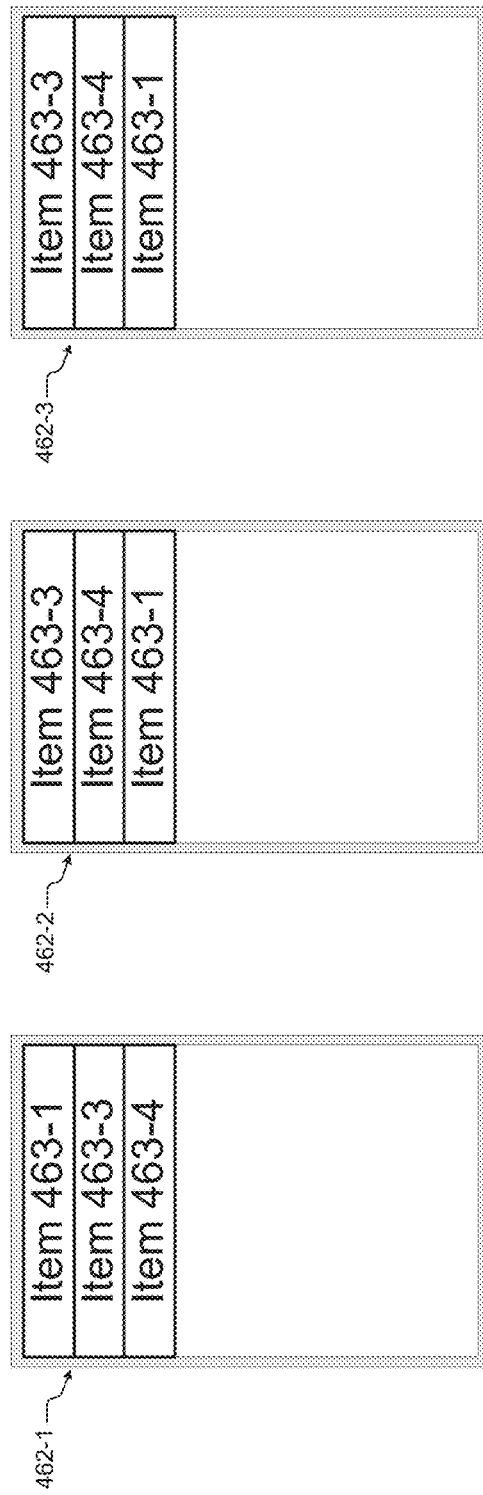

FIG. 32C shows an updated location map 468 in which item 463-2 has been removed after item 463-2 has been picked. Location map 468 of FIG. 32C including items 463-1, 463-3, 463-4 may be representative of a location map included in mobile scanning devices 462-1, 462-2, 462-3 after mobile scanning devices 462-1, 462-3 are notified that item 463-2 has been picked. For example, location map 468 of FIG. 32C may represent the location map of mobile scanning device 462-2 after mobile scanning device 462-2 scans item 463-2. Similarly, location map 468 of FIG. 32C may represent the location maps of mobile scanning devices 462-1, 462-3 after mobile scanning devices 462-1, 462-3 have received indications that item 463-2 has been picked. FIG. 32E shows updated displays of mobile scanning devices 462-1, 462-2, 462-3 in which mobile scanning devices 462-1, 462-2, 462-3 have removed item 463-2 from their displays.

Various examples have been described. These and other examples are within the scope of the following claims.

What is claimed is:

1. A system comprising:
   N location indicators for arrangement throughout a store that includes a plurality of stocked items for picking according to one or more electronic customer orders, wherein each of the N location indicators is configured to transmit a different location signal;
   a central computing system configured to wirelessly transmit the electronic customer orders; and
   a mobile scanning device comprising a display, the mobile scanning device configured to:
      wirelessly receive a first electronic customer order and a second electronic customer order from the central computing system, wherein the first electronic customer order comprises a first set of ordered items indicating which of the stocked items are to be picked, and wherein the second electronic customer order comprises a second set of ordered items indicating which of the stocked items are to be picked;
      detect one or more of the N location signals;
      arrange the first set of ordered items and the second set of ordered items on the display based on which of the one or more location signals are detected;
      scan a first item identification code included with a first stocked item corresponding to an item included in at least one of the first set of ordered items and the second set of ordered items; and
      wirelessly transmit data to the central computing system indicating that the first item identification code has been scanned.

2. The system of claim 1, wherein the mobile scanning device is configured to intermix the items of the first and second sets of ordered items on the display based on which of the one or more location signals are detected.

3. The system of claim 1, wherein the mobile scanning device is configured to receive the first electronic customer order and the second electronic customer order at the same time.

4. The system of claim 1, wherein the mobile scanning device is configured to receive the first electronic customer order and then subsequently receive the second electronic customer order at a later time.

5. The system of claim 4, wherein the mobile scanning device is configured to:
   receive the first electronic customer order;
   arrange the first set of ordered items on the display based on which of the one or more location signals are detected;
   receive the second electronic customer order after the first electronic customer order;
   add the second set of ordered items on the display in response to receipt of the second electronic customer order; and
   arrange the second set of ordered items and the first set of ordered items on the display based on which of the one or more locations signals are detected.

6. The system of claim 1, wherein the mobile scanning device is a first mobile scanning device comprising a first display, wherein the system further comprises a second mobile scanning device comprising a second display, and wherein the second mobile scanning device is configured to receive the first electronic customer order and the second electronic customer order from the central computing system.

7. The system of claim 6, wherein the second mobile scanning device is configured to receive the first electronic customer order and the second electronic customer order from the central computing system at the same time that the first mobile scanning device receives the first electronic customer order and the second electronic customer order.

8. The system of claim 6, wherein the second mobile scanning device is configured to:
 detect a different location signal than the one or more location signals detected by the first mobile scanning device; and
 arrange the first and second sets of ordered items on the second display in a different arrangement based on the detected different location signal.

9. The system of claim 6, wherein the second mobile scanning device is configured to:
 receive an indication that the first item identification code has been scanned; and
 remove the first stocked item from the second display in response to receipt of the indication that the first item identification code has been scanned.

10. The system of claim 6, wherein the central computing system is configured to:
 receive a third electronic customer order; and
 transmit the third electronic customer order to the first mobile scanning device.

11. A system comprising:
 N location indicators for arrangement throughout a store that includes a plurality of stocked items for picking according to one or more electronic customer orders, wherein each of the N location indicators includes a different readable code, wherein a first location indicator of the N location indicators includes a first readable code, and wherein a second location indicator of the N location indicators includes a second readable code;
 a central computing system configured to wirelessly transmit the electronic customer orders; and
 a mobile scanning device comprising a display, the mobile scanning device configured to:
  wirelessly receive a first electronic customer order and a second electronic customer order from the central computing system, wherein the first electronic customer order comprises a first set of ordered items indicating which of the stocked items are to be picked, and wherein the second electronic customer order comprises a second set of ordered items indicating which of the stocked items are to be picked;
  scan the first readable code;
  determine a first location value based on the scanned first readable code;
  scan the second readable code;
  determine a second location value based on the scanned second readable code;
  arrange the first set of ordered items and the second set of ordered items on the display based on which of the first and second location values is determined;
  scan a first item identification code included with a first stocked item corresponding to an item included in at least one of the first set of ordered items and the second set of ordered items; and
  wirelessly transmit data to the central computing system indicating that the first item identification code has been scanned.

12. The system of claim 11, wherein the mobile scanning device is configured to intermix the items of the first and second sets of ordered items on the display based on which of the first and second location values is determined.

13. The system of claim 11, wherein the mobile scanning device is configured to receive the first electronic customer order and the second electronic customer order at the same time.

14. The system of claim 11, wherein the mobile scanning device is configured to receive the first electronic customer order and then subsequently receive the second electronic customer order at a later time.

15. The system of claim 14, wherein the mobile scanning device is configured to:
 receive the first electronic customer order;
 arrange the first set of ordered items on the display based on which of the first and second location values is determined;
 receive the second electronic customer order after the first electronic customer order;
 add the second set of ordered items on the display in response to receipt of the second electronic customer order; and
 arrange the second set of ordered items and the first set of ordered items on the display based on which of the first and second location values is determined.

16. The system of claim 11, wherein the mobile scanning device is a first mobile scanning device comprising a first display, wherein the system further comprises a second mobile scanning device comprising a second display, and wherein the second mobile scanning device is configured to receive the first electronic customer order and the second electronic customer order from the central computing system.

17. The system of claim 16, wherein the second mobile scanning device is configured to receive the first electronic customer order and the second electronic customer order from the central computing system at the same time that the first mobile scanning device receives the first electronic customer order and the second electronic customer order.

18. The system of claim 16, wherein the second mobile scanning device is configured to:
 scan a third readable code that is different than the first readable code and the second readable code;
 determine a third location value based on the scanned third readable code; and
 arrange the first and second sets of ordered items on the second display in a different arrangement than the first display based on the determined third location value.

19. The system of claim 16, wherein the second mobile scanning device is configured to:
 receive an indication that the first item identification code has been scanned; and
 remove the first stocked item from the second display in response to receipt of the indication that the first item identification code has been scanned.

20. The system of claim 16, wherein the central computing system is configured to:
  receive a third electronic customer order; and
  transmit the third electronic customer order to the first mobile scanning device.

* * * * *